US012684580B2

(12) United States Patent
Rastegardoost et al.

(10) Patent No.: US 12,684,580 B2
(45) Date of Patent: Jul. 14, 2026

(54) WIRELESS COMMUNICATIONS FOR SCHEDULING TRANSMISSIONS

(71) Applicant: Comcast Cable Communications, LLC, Philadelphia, PA (US)

(72) Inventors: Nazanin Rastegardoost, McLean, VA (US); Esmael Dinan, McLean, VA (US); Hyoungsuk Jeon, Centreville, VA (US); Yunjung Yi, Vienna, VA (US); Hua Zhou, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 231 days.

(21) Appl. No.: 17/091,652

(22) Filed: Nov. 6, 2020

(65) Prior Publication Data

US 2021/0144743 A1 May 13, 2021

Related U.S. Application Data

(60) Provisional application No. 62/932,434, filed on Nov. 7, 2019.

(51) Int. Cl.

| | |
|---|---|
| *H04L 5/00* | (2006.01) |
| *H04L 1/00* | (2006.01) |
| *H04L 1/1812* | (2023.01) |
| *H04W 72/044* | (2023.01) |
| *H04W 72/0446* | (2023.01) |
| *H04W 72/0453* | (2023.01) |
| *H04W 72/23* | (2023.01) |
| *H04W 72/50* | (2023.01) |
| *H04W 76/11* | (2018.01) |

(52) U.S. Cl.
CPC ........... *H04W 72/23* (2023.01); *H04L 1/0003* (2013.01); *H04L 1/1819* (2013.01); *H04W 72/0446* (2013.01); *H04W 72/0453* (2013.01); *H04W 72/0466* (2013.01); *H04W 72/535* (2023.01); *H04W 76/11* (2018.02)

(58) Field of Classification Search
None
See application file for complete search history.

(56) References Cited

U.S. PATENT DOCUMENTS

| | | | | |
|---|---|---|---|---|
| 10,567,110 | B2 * | 2/2020 | Dinan | ..................... H04L 1/001 |
| 10,904,898 | B2 * | 1/2021 | Nam | ..................... H04L 1/1896 |
| 12,200,714 | B2 * | 1/2025 | Bergman | .............. H04L 5/0055 |
| 2009/0257408 | A1 | 10/2009 | Zhang et al. | |
| 2017/0223675 | A1 * | 8/2017 | Dinan | ..................... H04L 5/005 |
| 2019/0053254 | A1 * | 2/2019 | Zhang | ................... H04W 72/23 |

(Continued)

OTHER PUBLICATIONS

Ericsson: "PDCCH Enhancements for NR URLLC", 3GPP Draft; France vol. RAN WG1, No. Xi'an, China; Apr. 8, 2019-Apr. 12, 2019 Apr. 3, 2019.

(Continued)

*Primary Examiner* — Sithu Ko
(74) *Attorney, Agent, or Firm* — Banner & Witcoff, Ltd.

(57) ABSTRACT

Wireless communications may comprise control information for scheduling transmission. Control information may indicate a scheduling mode for transmission based on at least one of a field and/or a radio network temporary identifier (RNTI). The scheduling mode may comprise repetition of a single-transport block or transmission of different transport blocks.

18 Claims, 34 Drawing Sheets

(56) References Cited

U.S. PATENT DOCUMENTS

| | | | | | |
|---|---|---|---|---|---|
| 2020/0037314 | A1* | 1/2020 | Xiong | | H04L 5/0091 |
| 2020/0053750 | A1* | 2/2020 | Vos | | H04W 72/0446 |
| 2020/0137780 | A1 | 4/2020 | Kim et al. | | |
| 2020/0351934 | A1* | 11/2020 | Khoshnevisan | | H04L 5/0053 |
| 2020/0413427 | A1* | 12/2020 | Khoshnevisan | | H04L 5/0094 |
| 2021/0212105 | A1* | 7/2021 | Takeda | | H04W 72/23 |
| 2021/0219329 | A1* | 7/2021 | Zhou | | H04W 72/1257 |
| 2022/0053523 | A1* | 2/2022 | Jia | | H04W 72/0453 |
| 2022/0174667 | A1* | 6/2022 | Lei | | H04W 72/23 |
| 2022/0338179 | A1* | 10/2022 | Kumagai | | H04W 72/23 |

OTHER PUBLICATIONS

NTT Docomo et al: "Maintenance for DL/UL data scheduling and HARQ procedure", 3GPP Draft; France, Oct. 12, 2018.
Qualcomm Incorporated: "PDCCH Enhancements for eURLLC", 3GPP Draft; France vol. RAN WG1, No. Chongqing, China; Oct. 14, 2019- Oct. 20, 2019 Oct. 8, 2019.
Feb. 5, 2021—Extended European Search Report—20206191.7.
3GPP TS 36.212 V15.4.0 (Dec. 2018), Technical Specification, 3rd Generation Partnership Project; Technical Specification Group Radio Access Network; Evolved Universal Terrestrial Radio Access (E-UTRA); Multiplexing and Channel Coding (Release 15).
3GPP TS 36.213 V15.4.0 (Dec. 2018), Technical Specification, 3rd Generation Partnership Project; Technical Specification Group Radio Access Network; Evolved Universal Terrestrial Radio Access (E-UTRA); Physical Layer Procedures (Release 15), Sections 8 and 9.
3GPP TS 36.214 V15.3.0 (Sep. 2018), Technical Specification, 3rd Generation Partnership Project; Technical Specification Group Radio Access Network; Evolved Universal Terrestrial Radio Access (E-UTRA); Physical Layer Procedures (Release 15).
3GPP TS 36.321 V15.4.0 (Dec. 2018), Technical Specification, 3rd Generation Partnership Project; Technical Specification Group Radio Access Network; Evolved Universal Terrestrial Radio Access (E-UTRA); Medium Access Control (MAC) protocol specification (Release 15).
3GPP TS 36.331 V15.4.0 (Dec. 2018), Technical Specification, 3rd Generation Partnership Project; Technical Specification Group Radio Access Network; Evolved Universal Terrestrial Radio Access (E-UTRA); Radio Resource Control (RRC); Protocol specification (Release 15).
3GPP TS 38.212 V15.7.0 (Sep. 2019), Technical Specification, 3rd Generation Partnership Project; Technical Specification Group Radio Access Network; NR; Multiplexing and channel coding (Release 15).
3GPP TS 38.213 V15.7.0 (Sep. 2019), Technical Specification, 3rd Generation Partnership Project; Technical Specification Group Radio Access Network; NR; Physical layer procedures for control (Release 15).
3GPP TS 38.214 V15.7.0 (Sep. 2019), Technical Specification, 3rd Generation Partnership Project; Technical Specification Group Radio Access Network; NR; Physical layer procedures for control (Release 15).
3GPP TS 38.321 V15.7.0 (Sep. 2019), Technical Specification, 3rd Generation Partnership Project; Technical Specification Group Radio Access Network; NR; Medium Access Control (MAC) protocol specification (Release 15).
3GPP TS 38.331 V15.7.0 (Sep. 2019), Technical Specification, 3rd Generation Partnership Project; Technical Specification Group Radio Access Network; NR; Radio Resource Control (RRC) protocol specification (Release 15).
3GPP TS 38.889 V16.0.0 (Dec. 2018), Technical Specification, 3rd Generation Partnership Project; Technical Specification Group Radio Access Network; Study on NR-based access to unlicensed spectrum (Release 16).
3GPP TSG RAN WG1 Meeting #97, Reno, USA, May 13-17, 2019, Title: RAN1 Chairman's Notes.

3GPP TSG RAN WG1 Meeting #98, Prague, CZ, Aug. 26-30, 2019, Title: RAN1 Chairman's Notes.
3GPP TSG RAN WG1 Meeting #98, Prague, CZ, Aug. 26-30, 2019, Title: RAN1 Chairman's Notes, Section 7.2.2.
R1-1901357 3GPP TSG RAN WG1 Meeting AH1901, Taipei, Taiwan, Jan. 21-Jan. 25, 2019, Source: Huawei, Title: Feature lead summary of HARQ enhancements for NR-U.
R1-1901677 3GPP TSG RAN WG1 Meeting #96, Athens, Greece, Feb. 25-Mar. 1, 2019, Source: vivo, Title: Discussion on HARQ operation for NR-U.
R1-1903423 3GPP TSG RAN WG1 Meeting #96, Athens, Greece, Feb. 25-Mar. 1, 2019, Source: Huawei, Title: Feature lead summary of HARQ enhancements for NR-U.
R1-1903476 3GPP TSG RAN WG1 Meeting #96, Athens, Greece, Feb. 25-Mar. 1, 2019, Source: vivo, Title: Outcome of offline discussion on Configured grant enhancement.
R1-1905649 3GPP TSG RAN WG1 Meeting #96bis, Xi'an, China, Apr. 8-12, 2019, Source: Huawei, Title: Feature lead summary of HARQ enhancements for NR-U.
R1-1905792 3GPP TSG RAN WG1 Meeting #96bis, Xi'an, China, Apr. 8-12, 2019, Source: vivo, Title: Outcome of offline discussion on Configured grant enhancement.
R1-1908208 3GPP TSG RAN WG1 Meeting #98, Prague, Czech Republic, Aug. 26-30, 2019, Source: ZTE, Sanechips, Title: Discussion on configured grant for NR-U.
R1-1909247 3GPP TSG RAN WG1 Meeting #98, Prague, Czech Republic, Aug. 26-30, 2019, Source: Qualcomm Incorporated, Title: Enhancements to Scheduling and HARQ operation for NR-U.
R1-1909248 3GPP TSG RAN WG1 Meeting #98, Prague, Czech Republic, Aug. 26-30, 2019, Source: Qualcomm Incorporated, Title: Enhancements to configured grants in NR unlicensed.
R1-1909627 3GPP TSG RAN WG1 Meeting #98, Prague, Czech Republic, Aug. 26-30, 2019, Source: vivo, Title: Summary of offline discussion on Configured grant enhancement.
R1-1909976 3GPP TSG RAN WG1 Meeting #98bis, Chongqing, China, Oct. 14-18, 2019, Source: ZTE Sanechips, Title: Discussion on scheduling and HARQ for NR-U.
R1-1910156 3GPP TSG RAN WG1 Meeting #98bis, Chongqing, China, Oct. 14-20, 2019, Source: Lenovo, Motorola Mobility, Title: HARQ enhancement for NR-U.
R1-1910206 3GPP TSG RAN WG1 Meeting #98bis, Chongqing, China, Oct. 14-20, 2019, Source: vivo, Title: Discussion on HARQ operation for NR-U.
R1-1910207 3GPP TSG RAN WG1 Meeting #98bis, Chongqing, China, Oct. 14-20, 2019, Source: vivo, Title: Discussion on the enhancements to configured grants.
R1-1910559 3GPP TSG RAN WG1 Meeting #98bis, Chongqing, China, Oct. 14-20, 2019, Source: vivo, Title: Feature lead summary on Configured grant enhancement.
R1-1910959 3GPP TSG RAN WG1 Meeting #98bis, Chongqing, China, Oct. 14-20, 2019, Source: Apple Inc., Title: Configuration grant enhancement.
R1-1911001 3GPP TSG RAN WG1 Meeting #98bis, Chongqing, China, Oct. 14-20, 2019, Source: Panasonic, Title: Configured grant enhancements for NR-U.
R1-1911163 3GPP TSG RAN WG1 Meeting #98bis, Chongqing, China, Oct. 14-20, 2019, Source: NTT Docomo, Inc., Title: Configured grant enhancements for NR-U.
R1-1904742 3GPP TSG RAN WG1 Meeting #105bis, Xi'an, China, Apr. 8-12, 2019, Source: Ericsson, Title: Report of Email Discussion [105#51][NR-U] Configured Grants (Ericsson).
R2-1911007 3GPP TSG RAN WG1 Meeting #107, Prague, Czech Republic, Aug. 26-30, 2019, Source: LG Electronics Inc., Title: Report on email discussion [106#51] [NR-U] Configured Grant.
R2-1914134 3GPP TSG RAN WG1 Meeting #107bis, Source: RAN2 Session Chair (InterDigital), Title: Session minutes for NR-U, Power Savings, NTN and 2-step RACH.
R1-1908387 3GPP TSG RAN WG1 Meeting #98, Prague, Czech Republic, Aug. 26-30, 2019, Source: MediaTek Inc., Title: Enhancements to HARQ for NR-U operation.
R1-1908627 3GPP TSG RAN WG1 Meeting #98, Prague, Czech Republic, Aug. 26-30, 2019, Source: Intel Corporation, Title: Enhancements to configured grants for NR-unlicensed.

(56) References Cited

OTHER PUBLICATIONS

R1-1909301 3GPP TSG RAN WG1 Meeting #98, Prague, Czech Republic, Aug. 26-30, 2019, Source: Ericsson, Title: Configured grant enhancement.

R1-1909496 3GPP TSG RAN WG1 Meeting #98, Prague, Czech Republic, Aug. 26-30, 2019, Source: Huawei, Title: Feature lead summary of HARQ enhancements for NR-U.

Nov. 5, 2025—European Office Action—EP App. 20206191.7.

R1-1904122 3GPP TSG-RAN WG1 Meeting #96bis, Xi'an, China, Apr. 8-12, 2019, Source: Ericsson, Title: PDCCH Enhancements for NR URLLC.

R1-1811375 3GPP TSG-RAN WG1 Meeting #94bis, Chengdu, China, Oct. 8-12, 2018, Source: NTT Docomo, Inc., Title: Maintenance for DL/UL data scheduling and HARQ procedure.

R1-1911118 3GPP TSG-RAN WG1 Meeting #98b, Chongqing, China, Oct. 14-20, 2019, Source: Qualcomm Incorporated, Title: PDCCH Enhancements for eURLLC and HARQ procedure.

* cited by examiner

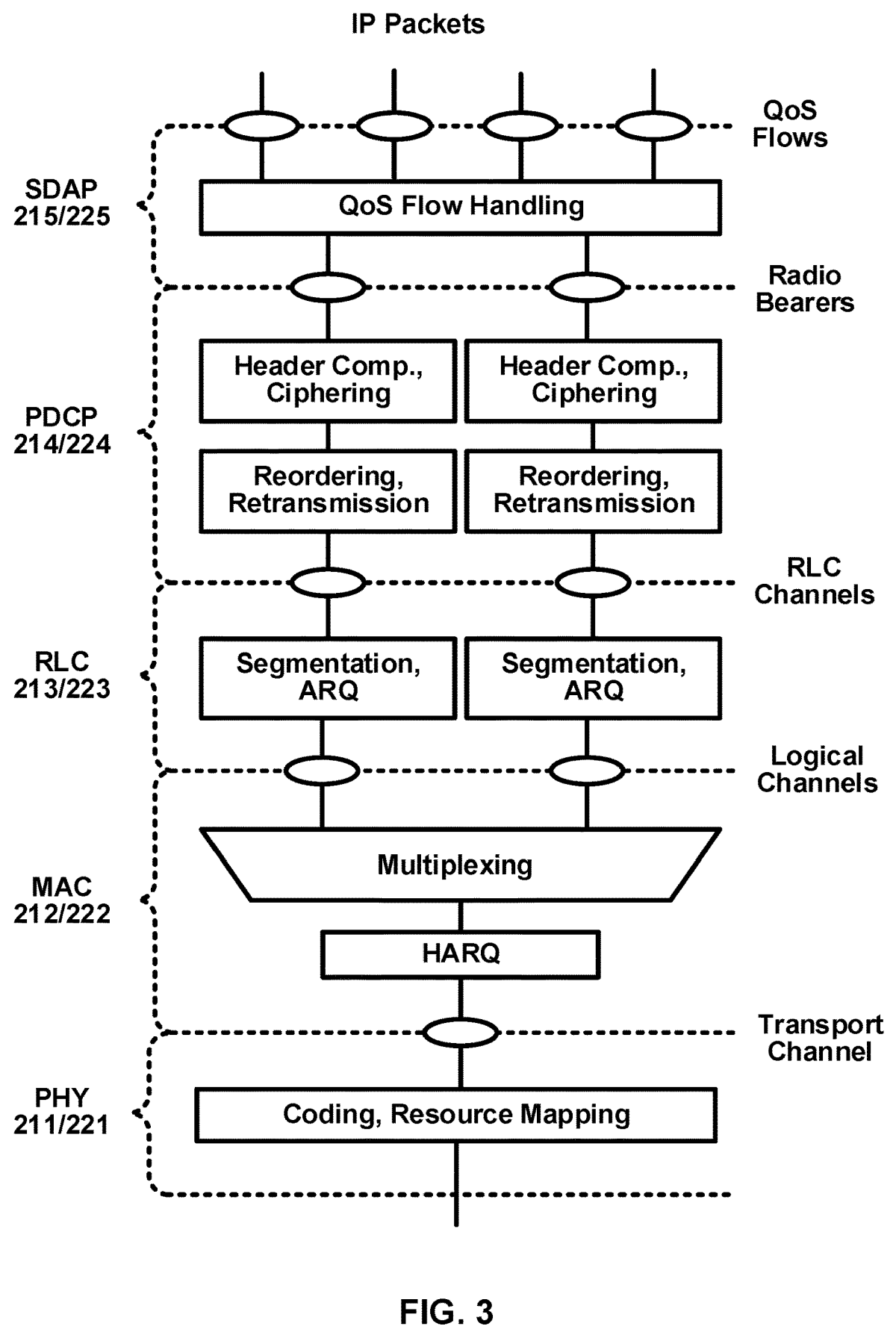

IP Packets

QoS Flows

SDAP 215/225

QoS Flow Handling

Radio Bearers

PDCP 214/224

| Header Comp., Ciphering | Header Comp., Ciphering |
| Reordering, Retransmission | Reordering, Retransmission |

RLC Channels

RLC 213/223

| Segmentation, ARQ | Segmentation, ARQ |

Logical Channels

MAC 212/222

Multiplexing

HARQ

Transport Channel

PHY 211/221

Coding, Resource Mapping

FIG. 3

Uplink

Downlink

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Time

Frequency

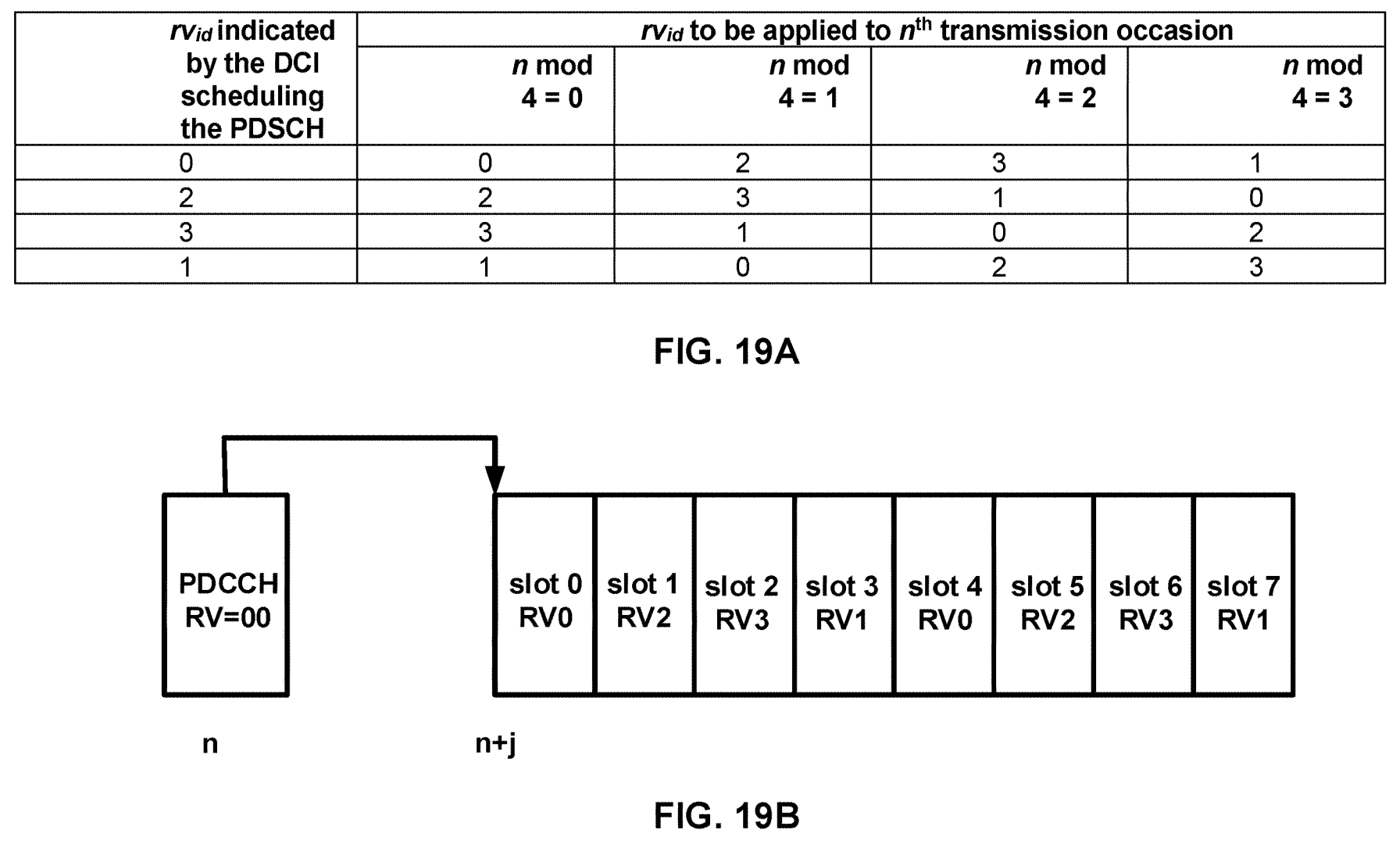

| $rv_{id}$ indicated by the DCI scheduling the PDSCH | $rv_{id}$ to be applied to $n^{th}$ transmission occasion | | | |
|---|---|---|---|---|
| | $n \bmod 4 = 0$ | $n \bmod 4 = 1$ | $n \bmod 4 = 2$ | $n \bmod 4 = 3$ |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

FIG. 19A

| slot 0 RV0 | slot 1 RV2 | slot 2 RV3 | slot 3 RV1 | slot 4 RV0 | slot 5 RV2 | slot 6 RV3 | slot 7 RV1 |

PDCCH RV=00 n       n+j

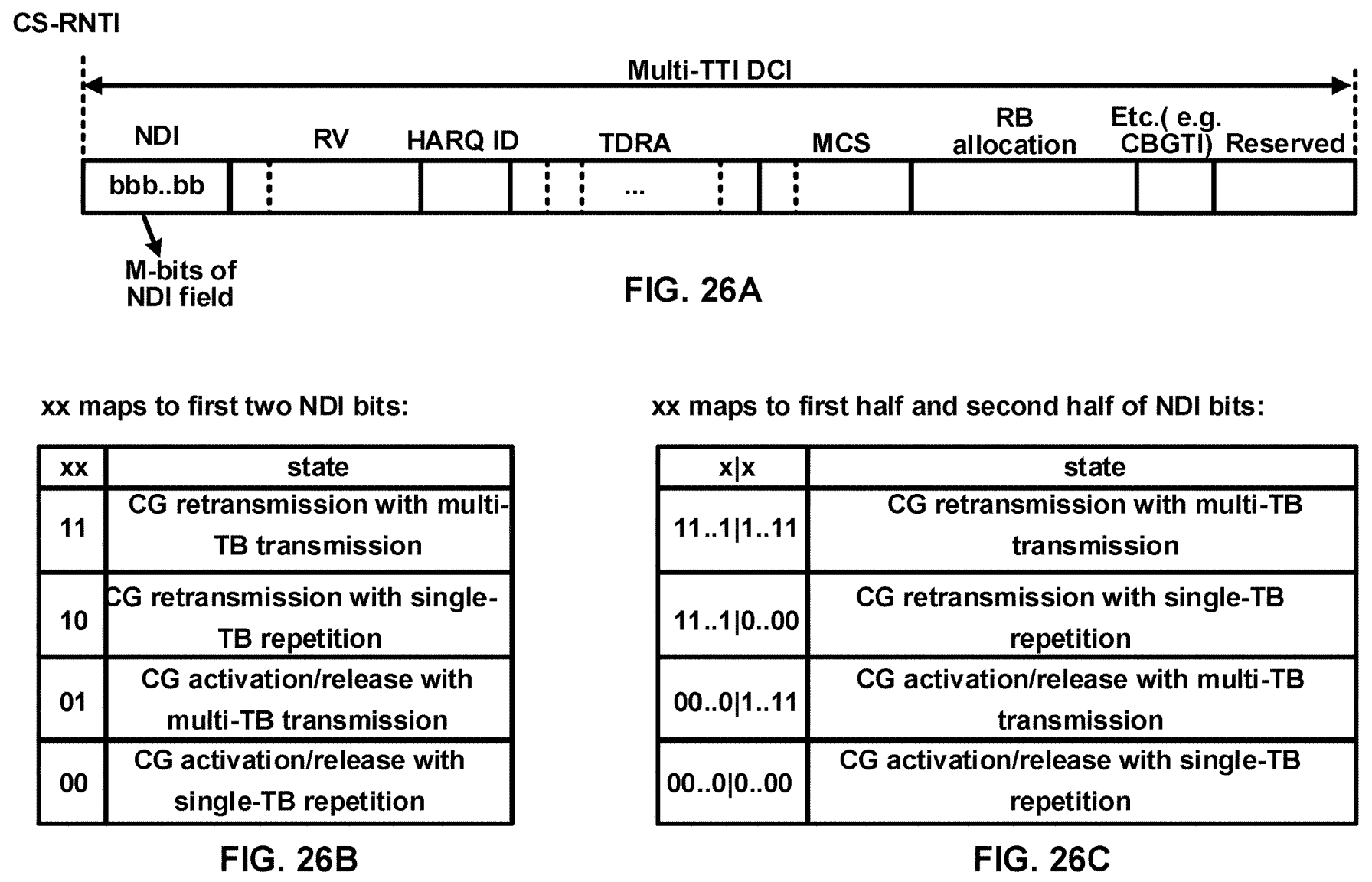

Multi-TTI DCI

CS-RNTI

| NDI | RV | HARQ ID | TDRA | MCS | RB allocation | Etc.(e.g. CBGTI) | Reserved |
|-----|----|---------|----|-----|---------------|------------------|----------|
| bbb..bb | : | | ... | ··· | | | |

M-bits of NDI field

FIG. 26A xx maps to first two NDI bits:

| xx | state |
|----|-------|
| 11 | CG retransmission with multi-TB transmission |
| 10 | CG retransmission with single-TB repetition |
| 01 | CG activation/release with multi-TB transmission |
| 00 | CG activation/release with single-TB repetition |

FIG. 26B xx maps to first half and second half of NDI bits:

| x\|x | state |
|------|-------|
| 11..1\|1..11 | CG retransmission with multi-TB transmission |
| 11..1\|0..00 | CG retransmission with single-TB repetition |
| 00..0\|1..11 | CG activation/release with multi-TB transmission |
| 00..0\|0..00 | CG activation/release with single-TB repetition |

FIG. 26C

WIRELESS COMMUNICATIONS FOR SCHEDULING TRANSMISSIONS

CROSS-REFERENCE TO RELATED APPLICATIONS

This application claims the benefit of U.S. Provisional Application No. 62/932,434, filed on Nov. 7, 2019. The above-referenced application is hereby incorporated by reference in its entirety.

BACKGROUND

In wireless communication systems, a base station may send downlink control information (DCI) for a grant that allows a wireless device to transmit/send transport blocks.

SUMMARY

The following summary presents a simplified summary of certain features. The summary is not an extensive overview and is not intended to identify key or critical elements.

Wireless communications may comprise control information for scheduling various types of transmissions. The transmission of data and/or control information may be scheduled (e.g., using DCI). The control information may be used to schedule transmissions in various high data rate environments (e.g., an unlicensed frequency band). For communication systems requiring high data rates, the control information may indicate one of a plurality of types of transmissions (e.g., multiple physical uplink shared channel (PUSCH) transmissions, the repetition of a single transport block, and/or the contiguous transmission of multiple different transport blocks, etc.). The type of transmission may be determined based on, for example, one or more fields of the control information and/or an element used to identify an operational mode for a wireless device that receives the control information (e.g., a radio network temporary identifier (RNTI)).

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 3 shows example of protocol layers.

FIG. 6 shows example radio resource control (RRC) states and RRC state transitions.

FIG. 7 shows an example configuration of a frame.

FIG. 19A shows example RVs for transmission of uplink data.

FIG. 19B shows an example determination of RVs of a transport block.

FIG. 24A, FIG. 24B, and FIG. 24C show examples of multi-TTI DCI for scheduling multi-TB transmissions.

FIG. 25A, FIG. 25B, and FIG. 25C show examples of multi-TTI DCI for scheduling single-TB repetition.

FIG. 26A shows an example of multi-TTI DCI.

FIG. 26B shows an example state table for scheduling modes.

FIG. 26C shows an example state table for scheduling modes.

DETAILED DESCRIPTION

Figures 1A, 1B:
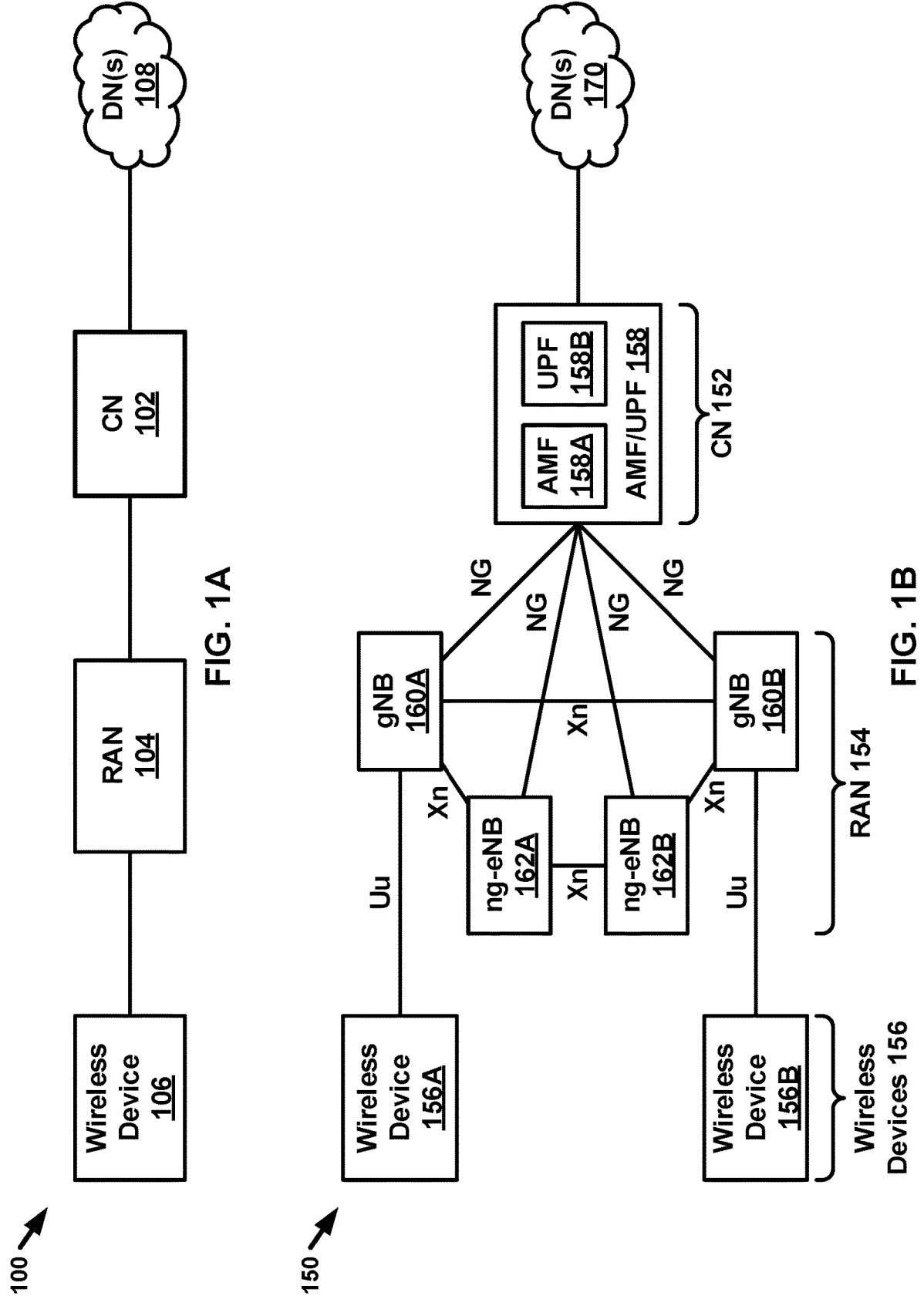
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to transmission scheduling.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG.

1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
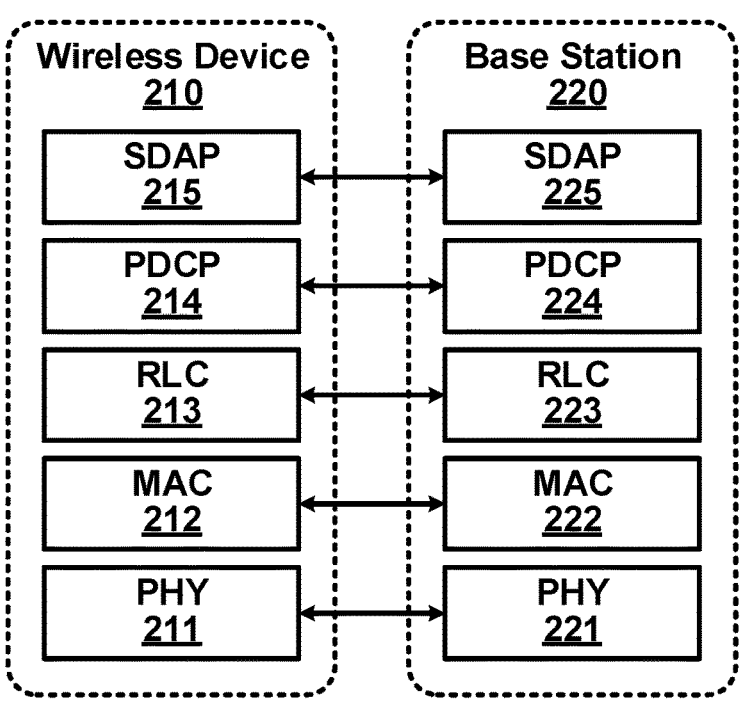
FIG. 2A shows an example user plane.
Figure 2B:
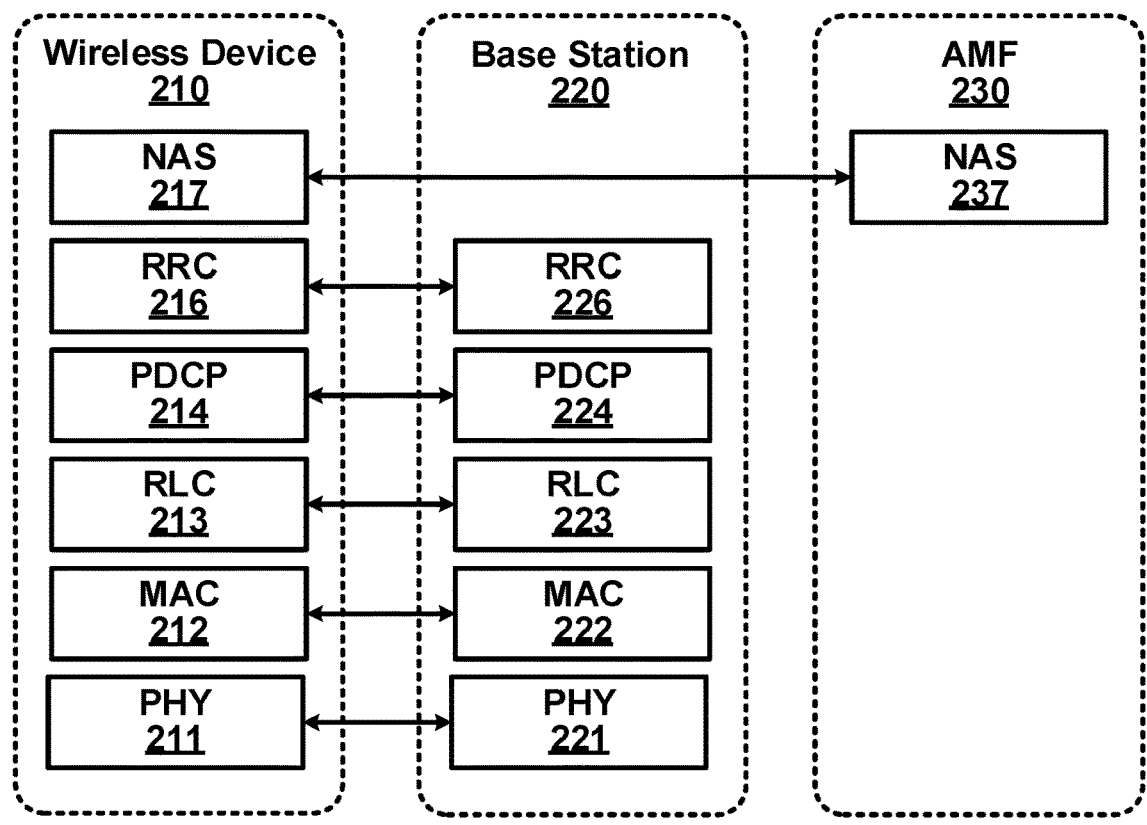
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be sent/transmitted over the air interface, ciphering/deciphering to prevent unauthorized decoding of data sent/transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figures 4A, 4B:
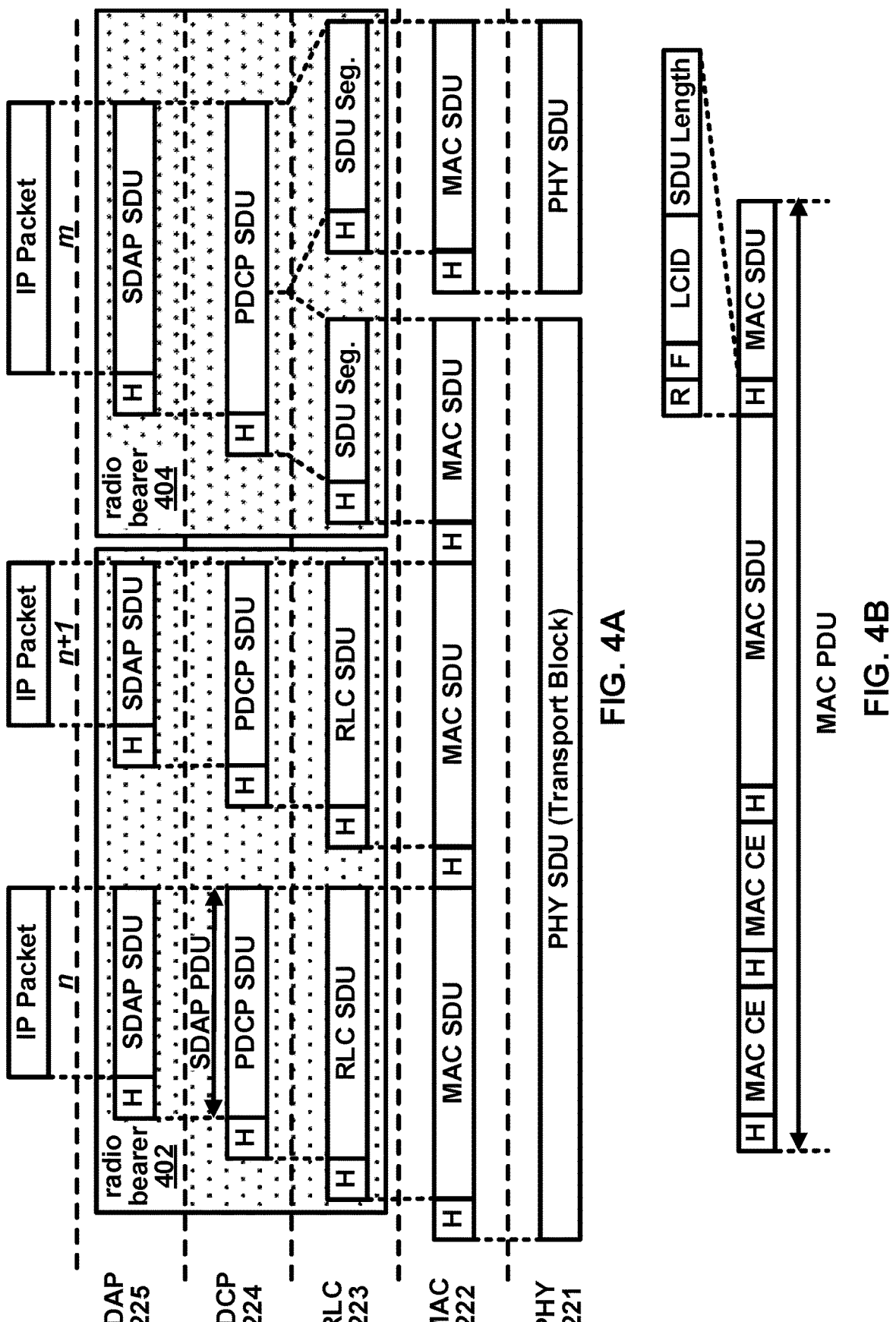
FIG. 4A shows an example downlink data flow for a user plane configuration.
FIG. 4B shows an example format of a Medium Access Control (MAC) subheader in a MAC Protocol Data Unit (PDU).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figures 5A, 5B:
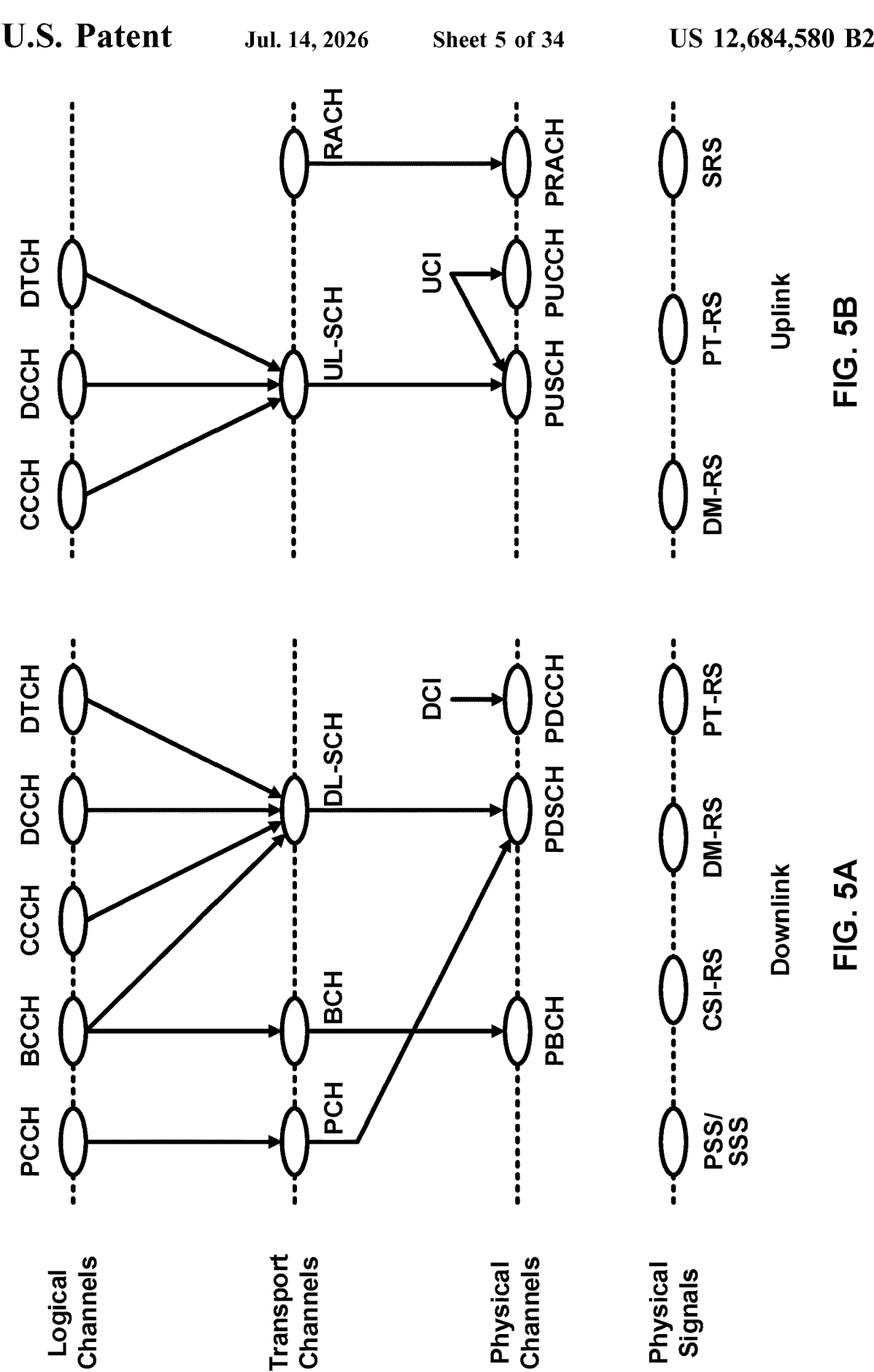
FIG. 5A shows an example mapping for downlink channels.
FIG. 5B shows an example mapping for uplink channels.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
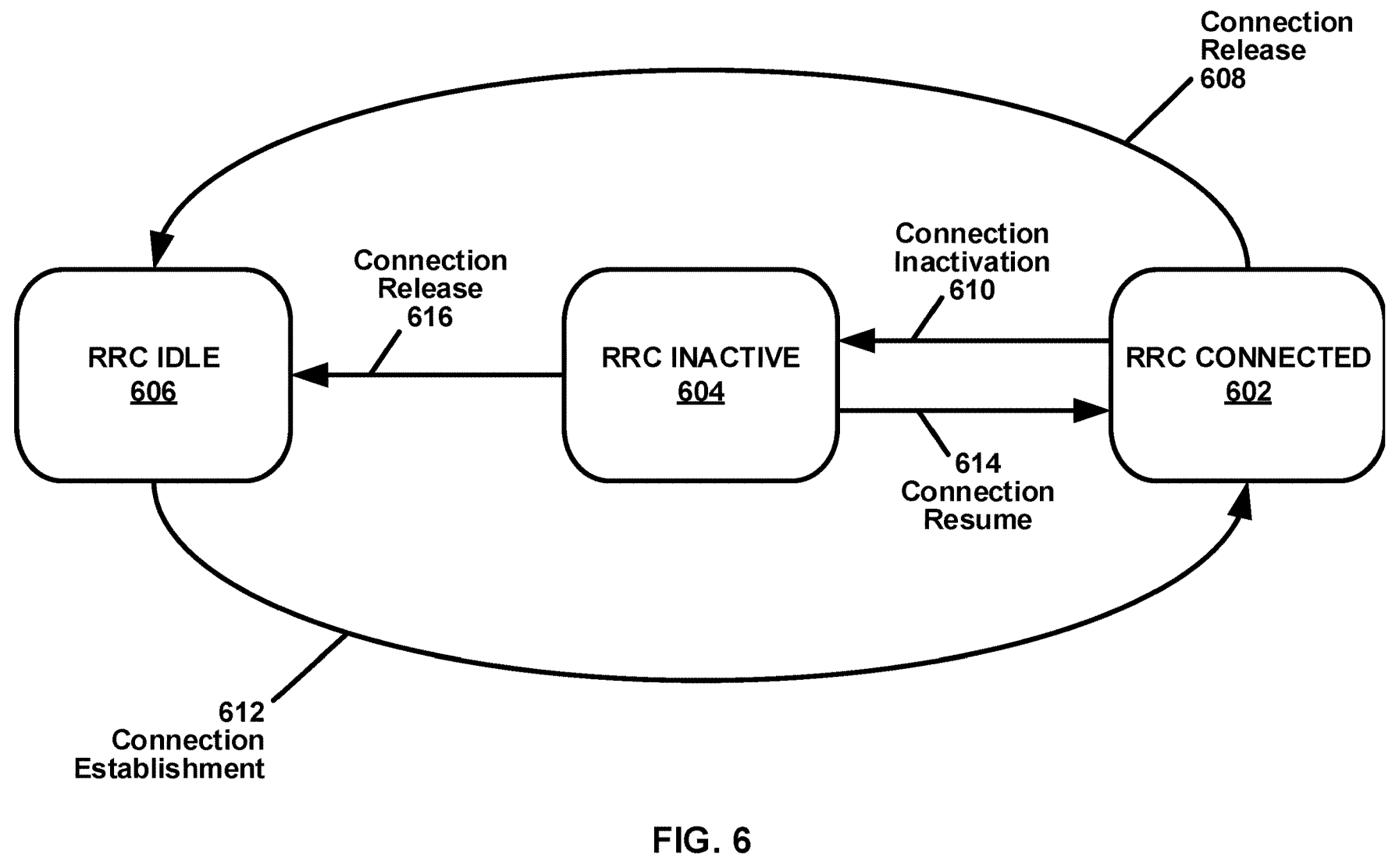

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_I-NACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
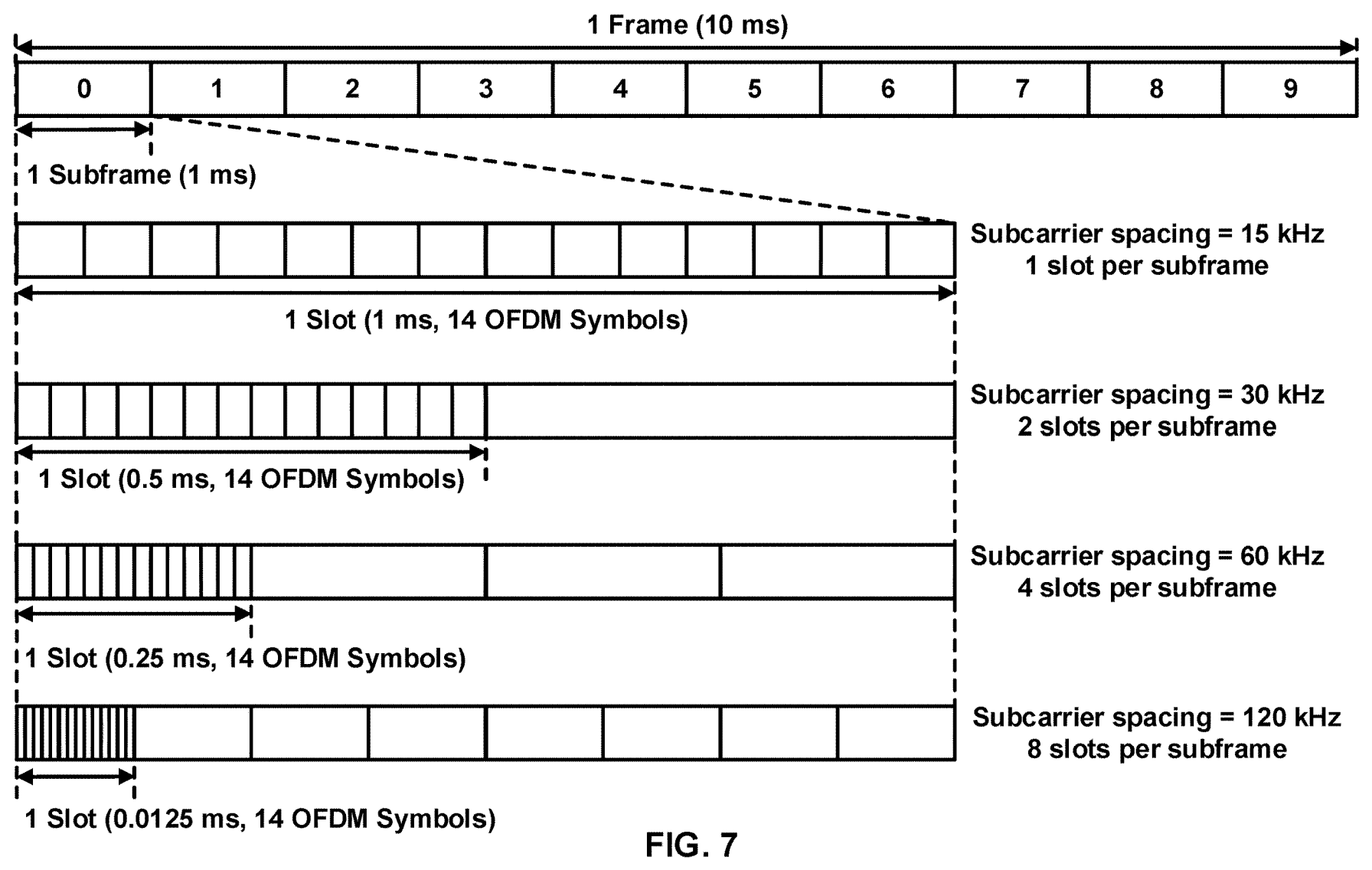

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
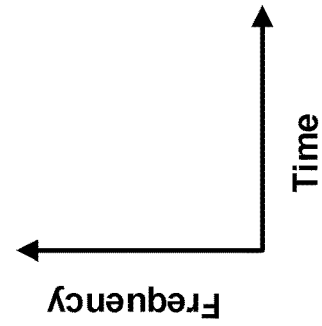
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after (e.g., based on or in response to) receiving DCI indicating the second BWP as an active BWP. A wireless device may switch an active BWP from a first BWP to a second BWP, for example, after (e.g., based on or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
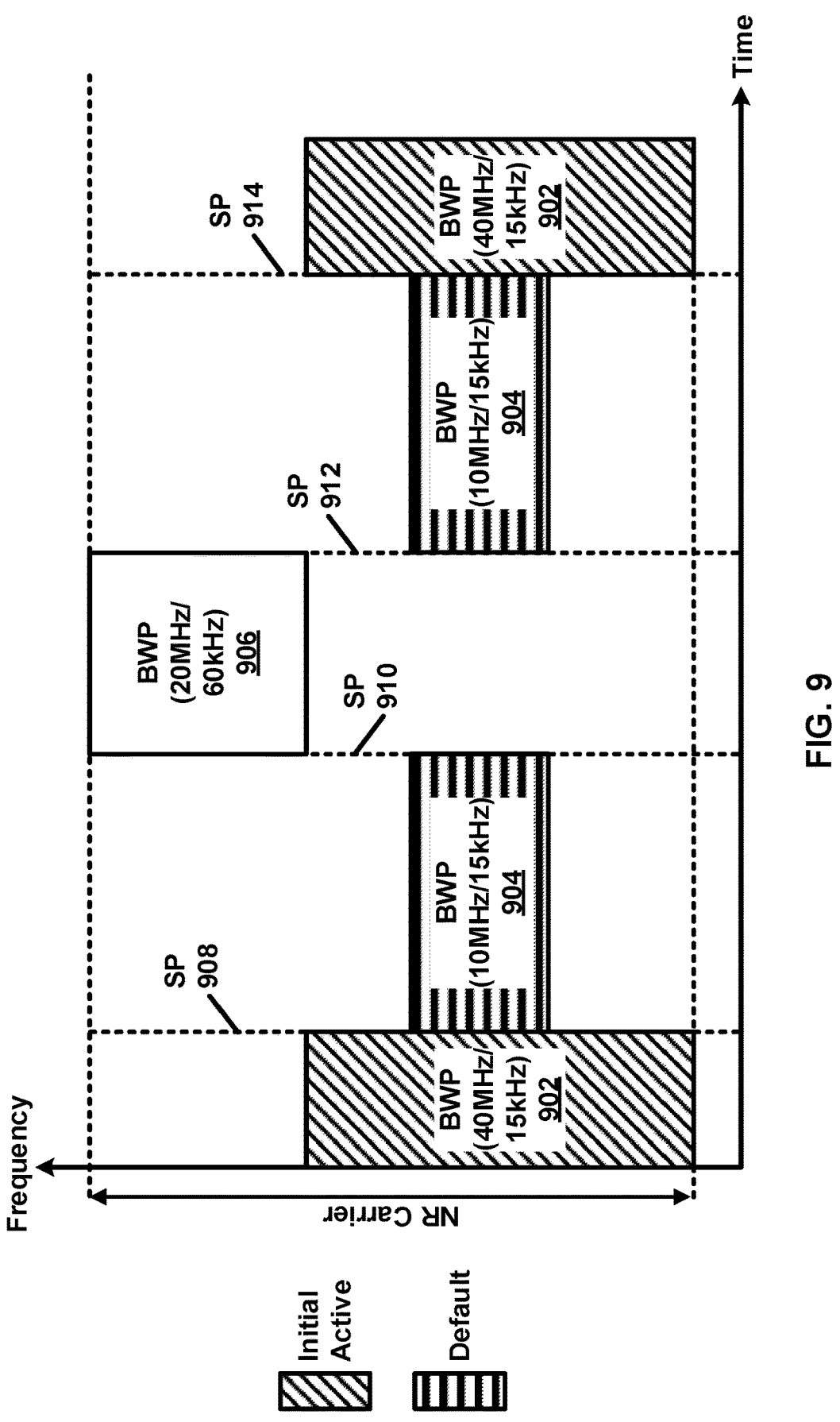
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after (e.g., based on or in response to) an expiry of a BWP inactivity timer (e.g., indicating switching to the default BWP). The switching at the switching point 908 may occur, for example, after (e.g., based on or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after (e.g., based on or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
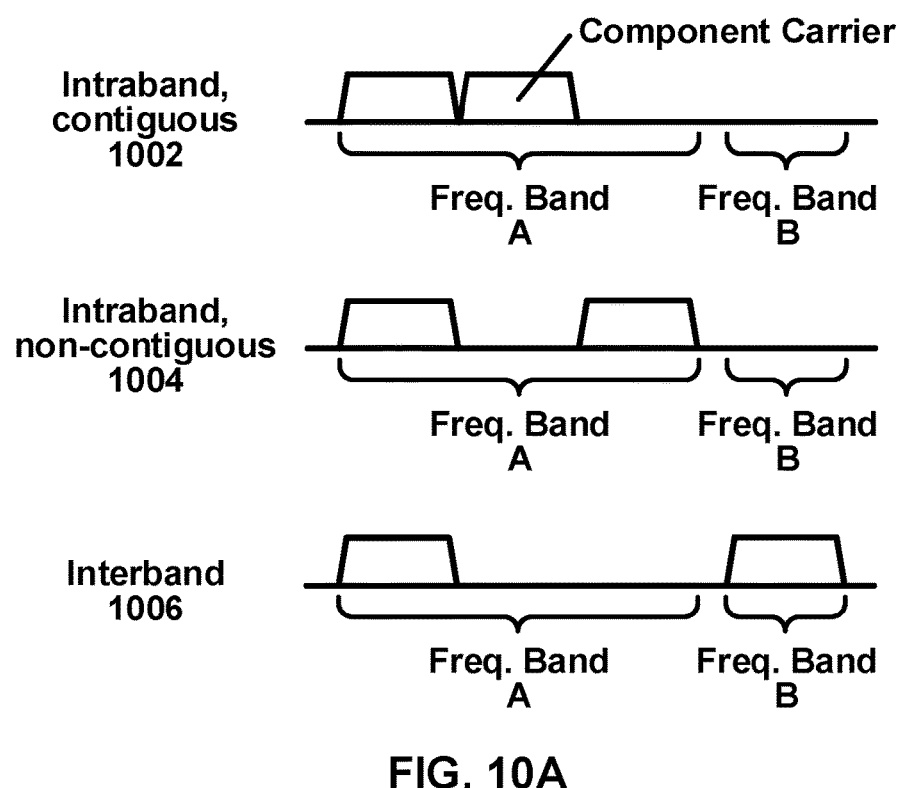
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after (e.g., based on or in response to) an an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling.

Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
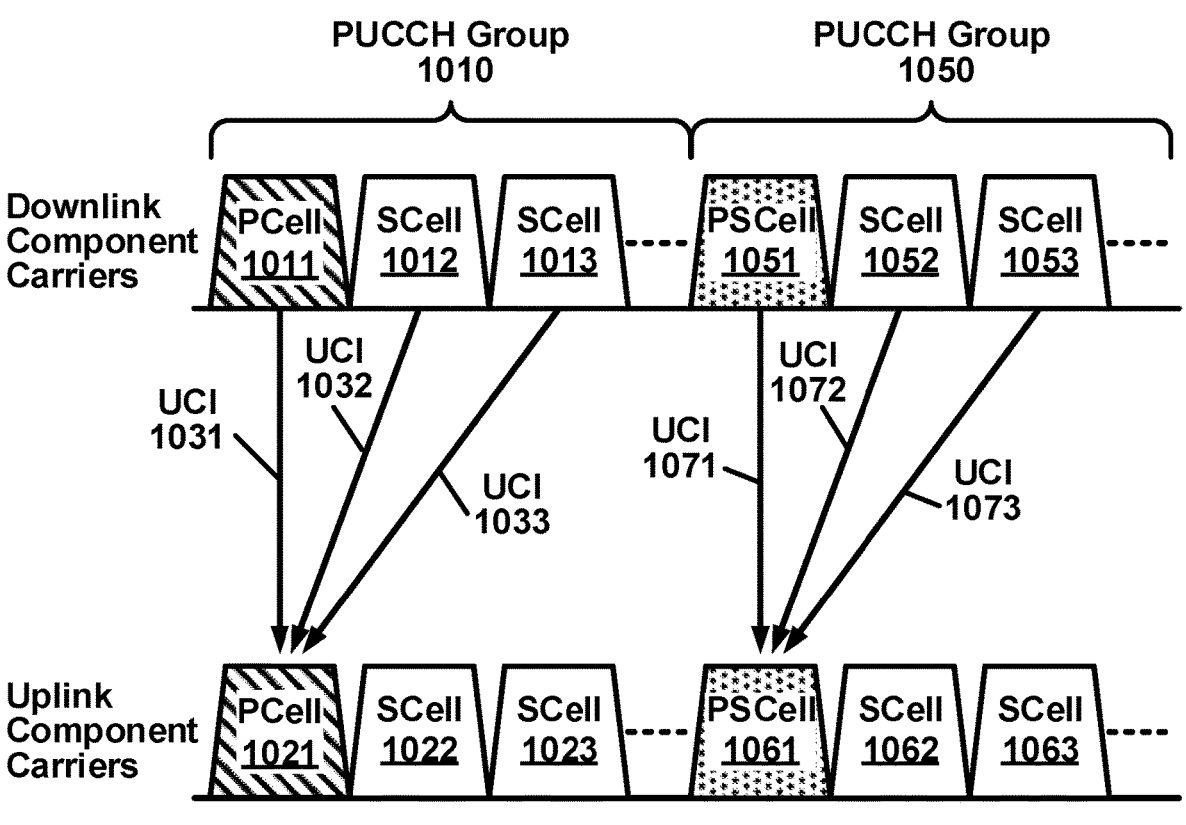
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
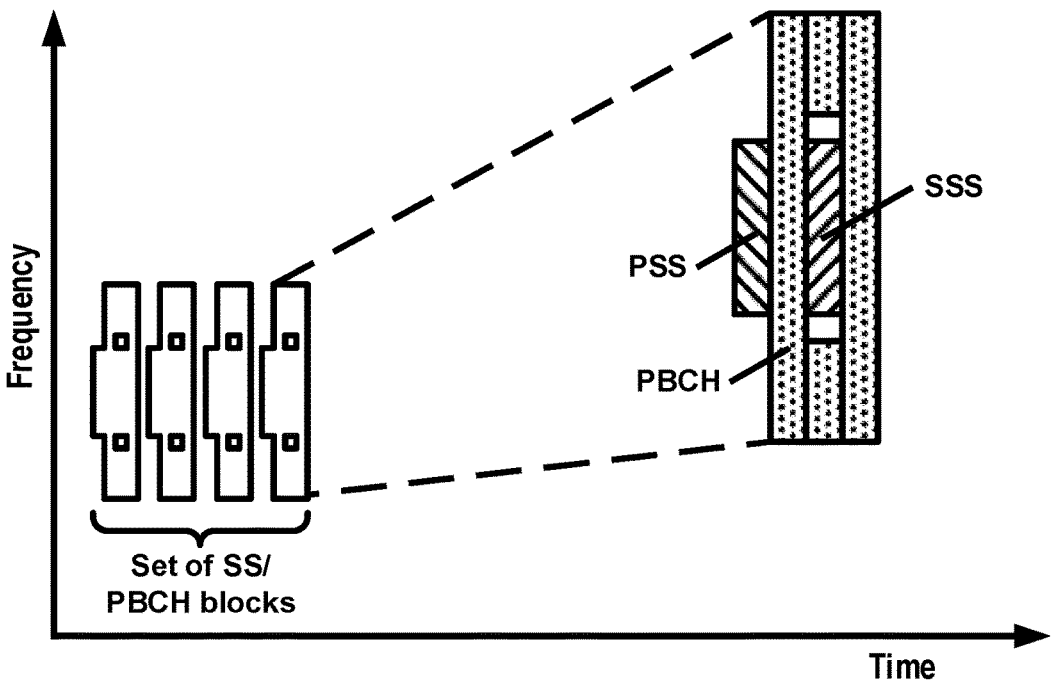
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
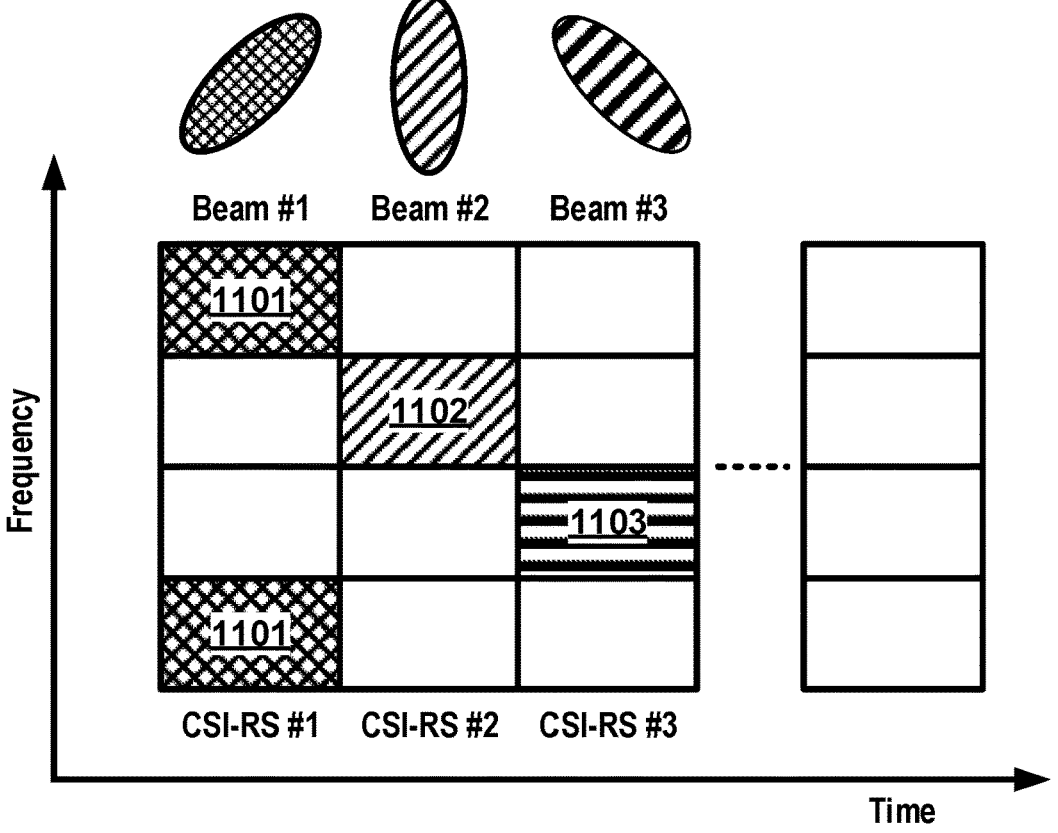
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi colocation (QCL) parameters (e.g., QCL-scramblingidentity, crs-portscount, mbsfn-subframeconfiglist, csi-rs-con-figZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to send/transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

Figures 12A, 12B:
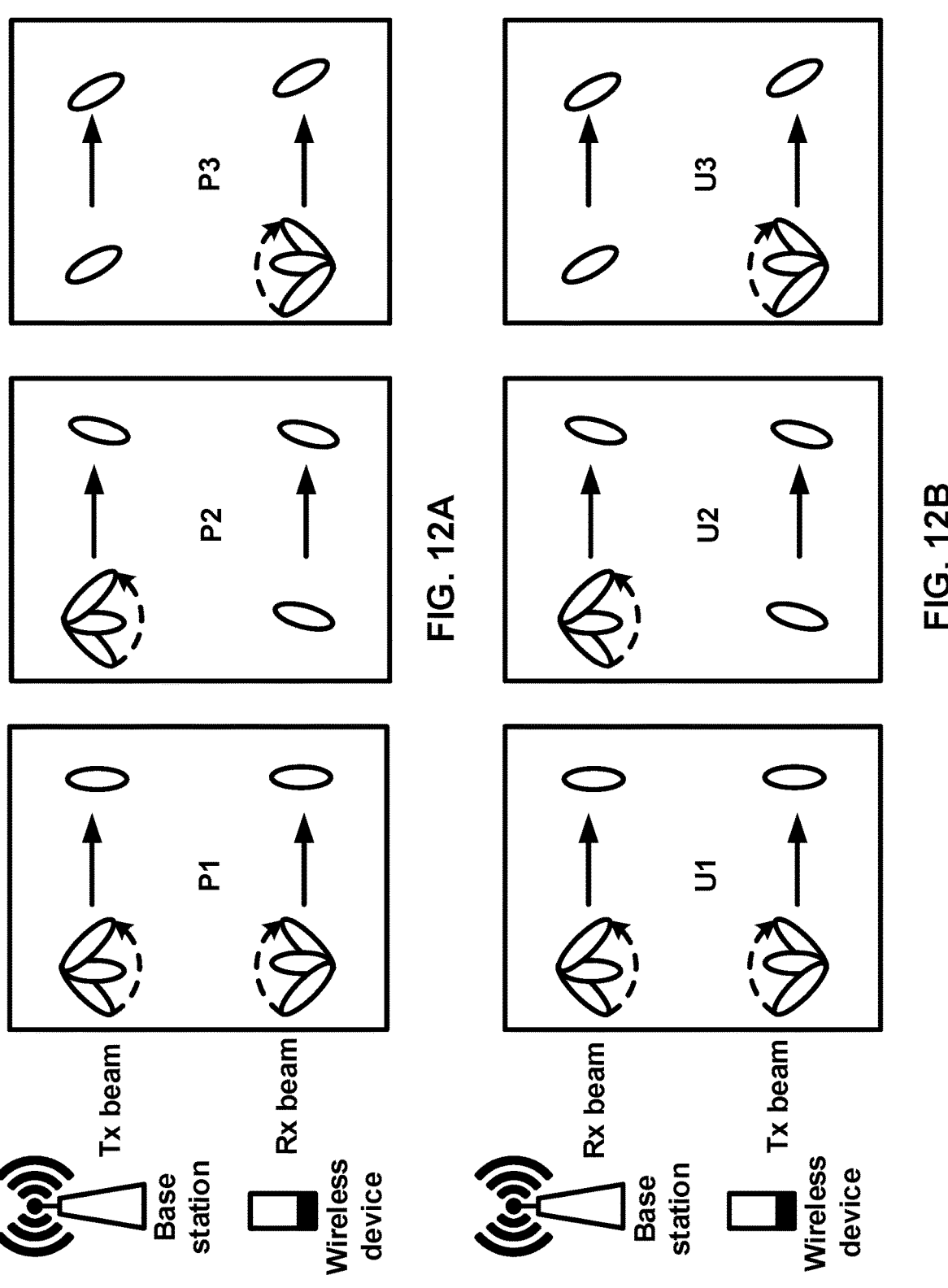
FIG. 12A shows examples of downlink beam management procedures.
FIG. 12B shows examples of uplink beam management procedures.

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figures 13A, 13B, 13C:
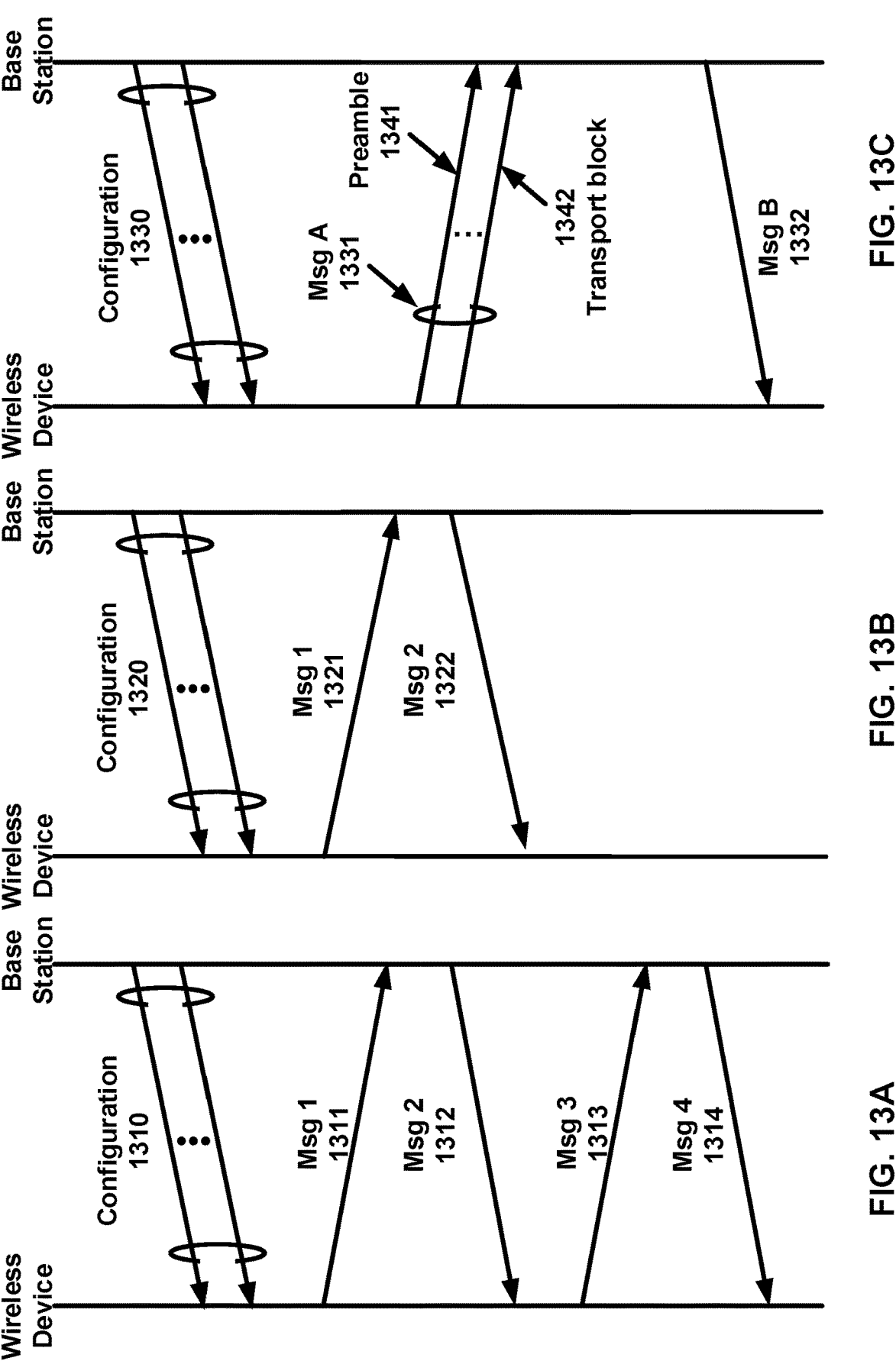
FIG. 13A shows an example four-step random access procedure.
FIG. 13B shows an example two-step random access procedure.
FIG. 13C shows an example two-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-Config-Index). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-Occa-sionList) may indicate an association between the PRACH occasions and the one or more reference signals.

The wireless device may perform a preamble retransmission, for example, if no response is received after (e.g., based on or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTrans-Max) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after (e.g., based on or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., $0 \leq s\_id < 14$), t_id may be an index of a first slot of the PRACH occasion in a system frame (e.g., $0 \leq t\_id < 80$), f_id may be an index of the PRACH occasion in the frequency domain (e.g., $0 \leq f\_id < 8$), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after (e.g., based on or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after (e.g., based on or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI), fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, (e.g., based on or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after (e.g., based on or in response to) sending/transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after (e.g., based on or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
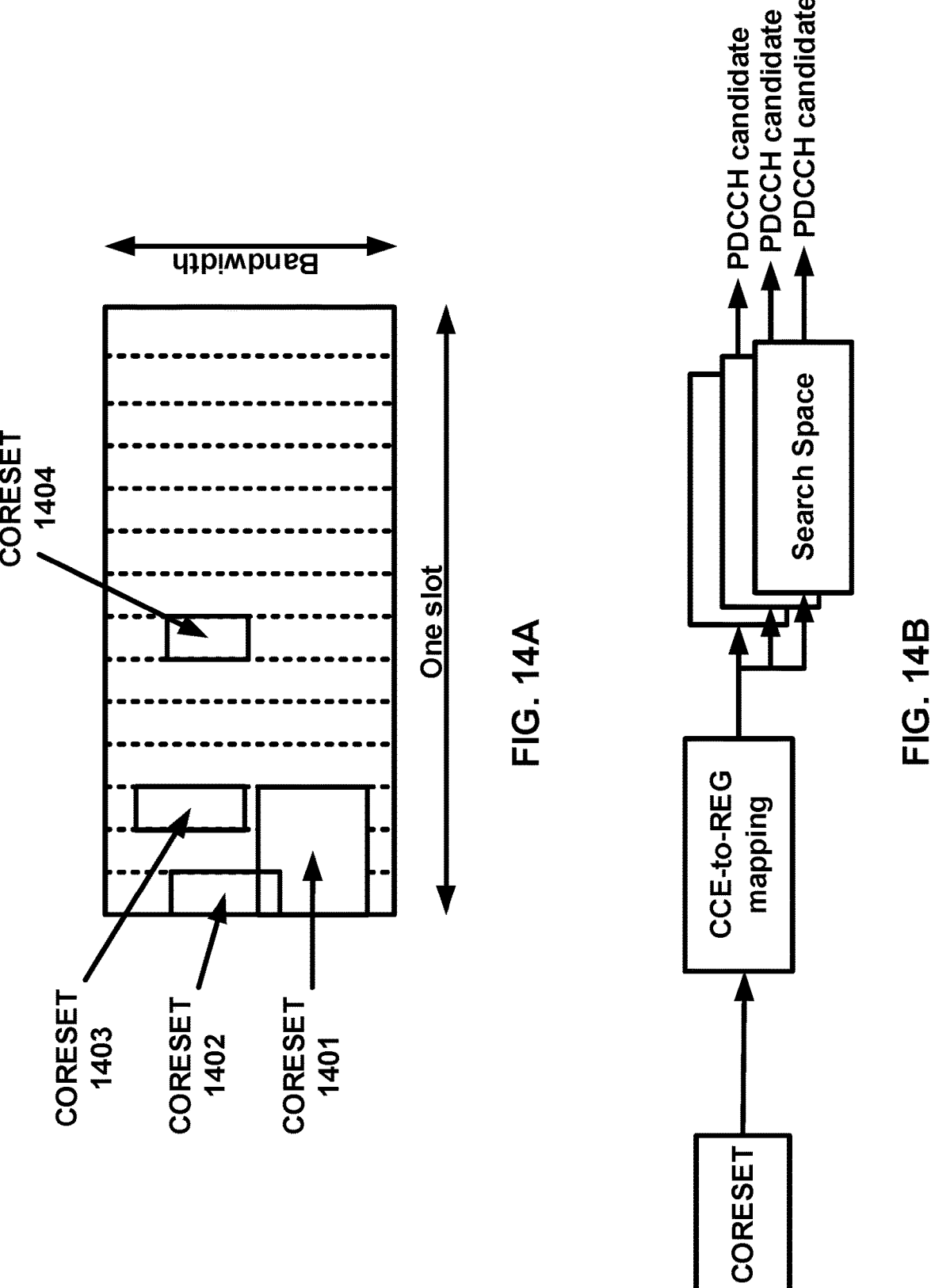
FIG. 14A shows an example of control resource set (CORESET) configurations.
FIG. 14B shows an example of a control channel element to resource element group (CCE-to-REG) mapping.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after (e.g., based on or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after (e.g., based on or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
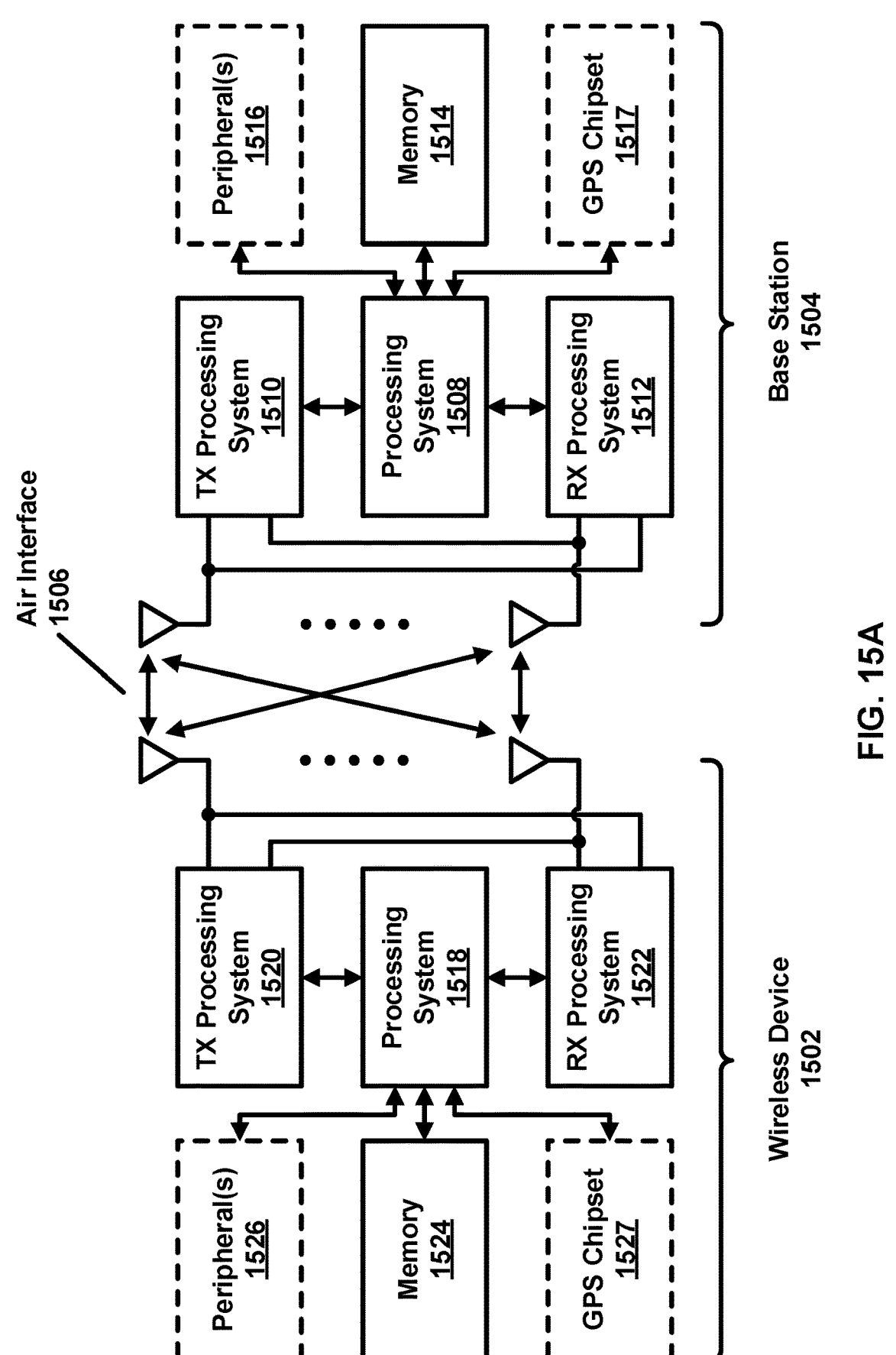
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a micro-controller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
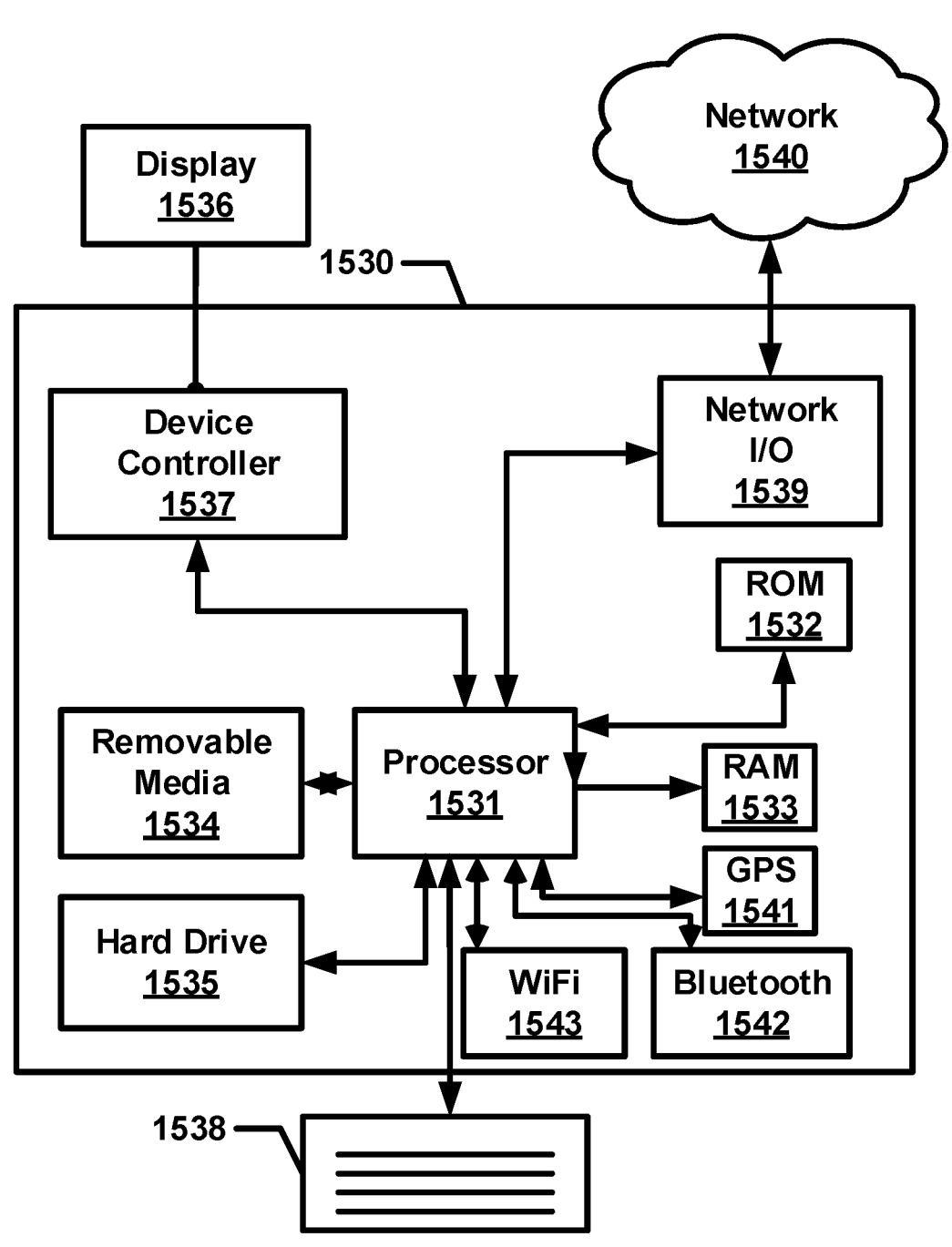
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figures 16A, 16B, 16C, 16D:
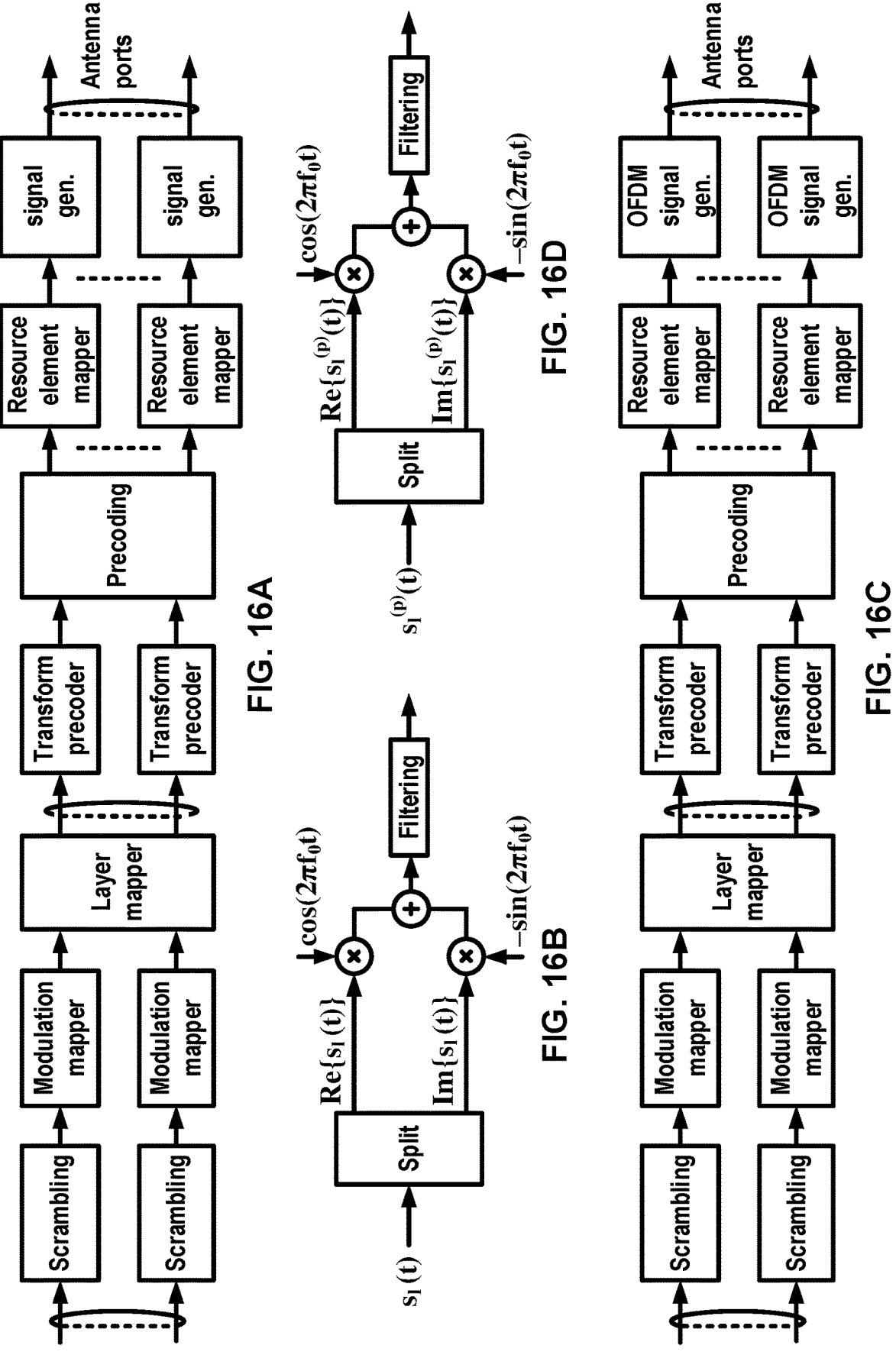
FIG. 16A, FIG. 16B, FIG. 16C, and FIG. 16D show examples of uplink and downlink signal transmission.

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency.

The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running. A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

The quantity of data traffic carried over cellular networks is expected to increase in future. The number of users/devices is increasing, and each user/device accesses an increasing number and variety of services (e.g. video delivery, large files, images). Increased data traffic may require high network capacity and provisioning of very high data rates to meet customer expectations on interactivity and responsiveness. More spectrum may be needed for cellular operators to meet the increasing demand. It may be beneficial that more spectrum be made available for deploying macro cells as well as small cells for cellular systems to service high data rates and provide seamless mobility.

Wireless communications may use complimentary access technology. Complementary access technology may comprise a combination of two or more access technologies. At least some types of wireless communications (e.g., compatible with 3GPP Release 16, earlier/later 3GPP releases or generations, and/or other access technology) may be enabled with interworking solutions that may allow usage of resources (e.g., an unlicensed spectrum) corresponding to other type(s) of wireless communications (e.g., WLAN, and/or other access technology). Complementary access technology that utilizes unlicensed spectrum may be deployed to meet wireless traffic usage and/or growth. Unlicensed spectrum, if available, may be an effective complement to licensed spectrum and/or may help in addressing high traffic in at least some scenarios (e.g., in areas that may be serviced by hotspots and/or other access points). For example, licensed assisted access (LAA) and/or new radio on unlicensed band(s) (NR-U) may enable the use of unlicensed spectrum for wireless communications (e.g., using 3GPP Release 16, earlier/later 3GPP releases or generations, LTE access technology, and/or other access technology). Usage of unlicensed spectrum may optimize network efficiency and improve network capacity, among other advantages.

A wireless device may use a listen-before-talk (LBT) procedure for communication in a cell configured in an unlicensed band (e.g., which may be referred to as an LAA cell and/or a NR-U cell) and/or a licensed band. An LAA cell and/or NR-U cell may refer to any cell operating in unlicensed band. The cell may operate as a non-standalone cell comprising an anchor cell operating in licensed band, or may operate as a standalone cell without an anchor cell in licensed band. The LBT procedure may comprise a clear channel assessment (CCA). Equipment (e.g., wireless devices and/or other computing devices) may perform a CCA, for example, before using a channel in an LBT procedure. The CCA may utilize at least energy detection to determine presence or absence of other signals on a channel. The presence of other signals on the channel (e.g., an indication of a signal power level above a threshold) may indicate that the channel is occupied. The absence of other signals on the channel (e.g., an indication of a signal power level below a threshold) may indicate that the channel is clear. Usage of LBT may vary based on country-specific, regional-specific, and/or other area regulations and/or requirements. For example, European and Japanese regulations mandate the usage of LBT in the unlicensed bands (e.g., in the 5 GHz unlicensed band). Carrier sensing using LBT may be used for fair sharing of an unlicensed spectrum.

Discontinuous transmission on an unlicensed carrier may be enabled with a limited maximum transmission duration. Some functions may be supported by one or more signals sent (e.g., transmitted), for example, during (e.g., at the beginning of) a discontinuous downlink transmission in the unlicensed band. Channel reservation may be enabled by transmission of signals, by an NR-U node, for example, based on (e.g., after) gaining channel access via a successful LBT procedure. Channel reservation may enable other nodes to determine that the channel is occupied based on receiving the transmitted signal with energy that is above a certain threshold. Procedures (e.g., functions) that may be supported by one or more signals for operation in unlicensed band with discontinuous downlink transmission may comprise one or more of the following: detection of the downlink transmission in an unlicensed band (including cell identification) by wireless devices, time and frequency synchronization of a wireless devices, etc.

Downlink transmission and frame structure design for operation in an unlicensed band may employ subframe, (mini-)slot, and/or symbol boundary alignment according to timing relationships across serving cells aggregated by carrier aggregation. Base station transmissions may or may not start at the subframe, (mini-)slot, and/or symbol boundary. Unlicensed cell operation (e.g., LAA and/or NR-U) may support sending PDSCH transmissions, for example, even if all OFDM symbols are not available for transmission in a subframe according to an LBT procedure. Delivery of necessary control information for the PDSCH transmissions may be supported.

An LBT procedure may be performed for various wireless communications. An LBT procedure may be used, for example, for coexistence (e.g., fair and friendly coexistence) of wireless communications (e.g., using multiple different access technologies, such as an LTE access technology, an NR access technology, and/or any other access technology) with communications in unlicensed spectrum (e.g., communications corresponding to other operators and/or other access technologies). LBT procedures on a node attempting to transmit on a carrier (or a channel) in an unlicensed spectrum may require the node to perform a CCA to determine if the channel is free for use. An LBT procedure may comprise at least wireless signal energy detection to determine if the channel is being used. Regulatory requirements in some regions (e.g., Europe) may specify an energy detection threshold such that if a measured energy on a carrier (or a channel) is greater than this threshold, the node may assume that the channel is not free (e.g., the channel is being used by other node(s)). A node may optionally use a lower threshold for energy detection than that specified by regulatory requirements. Some communications (e.g., NR-U communications) may adaptively change the energy detection threshold. For example, communications (e.g., NR-U communications) may adaptively lower the energy detection threshold from an upper bound. Adaptation of a threshold may comprise static and/or semi-static determination of the threshold. Category 4 LBT procedures and/or other type of LBT procedures may be used.

Various example LBT procedures may be used. An LBT procedure may not be used by a transmitting entity, for example, for transmission of some signals, in at least some implementation scenarios, in at least some situations, and/or for transmission in at least some frequencies. Category 1 LBT procedure (CAT1, e.g., no LBT procedure) may be used in one or more cases. A wireless device may perform an uplink transmission without an LBT procedure in a channel in an unlicensed band, for example, if the channel is held by a base station for downlink transmissions, and the wireless device takes over the channel for uplink transmission. Category 2 LBT procedure (CAT2, e.g., LBT procedure without random back-off) may be used. A duration of time for which a channel is to be sensed to be idle (e.g., by a wireless device, by a base station) before a transmitting entity may send/transmit data may be deterministic. A base station may send/transmit an uplink grant indicating a type of LBT (e.g., CAT2 LBT) to a wireless device. CAT1 LBT and CAT2 LBT may be employed for channel occupancy time (COT) sharing. For example, a base station may send/transmit an uplink grant (or a wireless device may send/transmit uplink control information) comprising a type of LBT. For example, CAT1 LBT and/or CAT2 LBT in the uplink grant (or uplink control information) may indicate, to a receiving device (e.g., a base station, and/or a wireless device) to trigger COT sharing. Category 3 LBT procedure (CAT3, e.g., an LBT procedure with random back-off with a contention window of fixed size) may be used. The LBT procedure may have the following procedure as at least one of its components. A transmitting entity (e.g., a wireless device, a base station) may select a random number N within a contention window. A size of the contention window may be specified by the minimum and maximum value of N. A size of the contention window may be fixed. The random number N may be used in the LBT procedure to determine the duration of time that the channel is to be sensed to be idle before the transmitting entity may send/transmit data in the channel. Category 4 LBT procedure (CAT4, e.g., an LBT procedure with random back-off with a contention window of variable size) may be used. A transmitting entity (e.g., a wireless device, a base station) may select a random number N within a contention window. The size of contention window may be specified by a minimum and maximum value of N. The transmitting entity may vary the size of the contention window and select the random number N within the contention window. The random number N may be used in the LBT procedure to determine a duration of time that the channel is to be sensed to be idle before the transmitting entity may send/transmit data in the channel.

A wireless device may use an uplink LBT procedure for uplink transmissions on an unlicensed band. The uplink LBT procedure may be different from a downlink LBT procedure. The uplink LBT procedure and the downlink LBT procedure may use different LBT protocols and/or parameters. For example, the uplink LBT procedure may be based on scheduled access that may affect a wireless device's channel contention opportunities. Other considerations motivating a different uplink LBT procedure include, but are not limited to, multiplexing of multiple wireless devices in a time period (e.g., subframe, slot, and/or mini-slot).

Downlink (DL) transmission burst(s) may be a continuous (unicast, multicast, broadcast, and/or combination thereof) transmission by a base station (e.g., to one or more wireless devices) on a component carrier (CC). Uplink (UL) transmission burst(s) may be a continuous transmission from one or more wireless devices to a base station on a CC. DL transmission burst(s) and/or UL transmission burst(s) on a CC in an unlicensed spectrum may be scheduled in a TDM manner over a same unlicensed carrier. Switching between DL transmission burst(s) and UL transmission burst(s) may require an LBT procedure (e.g., CAT1 LBT, CAT2 LBT, CAT3 LBT, and/or CAT4 LBT). An instant in time may comprise a DL transmission burst and/or an UL transmission burst.

Channel occupancy time (COT) sharing may be employed (e.g., in NR-U or other protocols). COT sharing may be a procedure by which one or more wireless devices share a channel that is sensed as idle by at least one of the one or more wireless devices. One or more first devices may occupy a channel based on an LBT procedure (e.g., the channel may be sensed as idle based on CAT4 LBT) and one or more second devices may share the channel based on an LBT procedure (e.g., 25 us LBT) within a maximum COT (MCOT) limit. The MCOT limit may be defined per priority class, logical channel priority, and/or may be wireless device-specific. COT sharing may allow a concession for UL in unlicensed band. A base station may transmit/send an UL grant to a wireless device for a UL transmission. A base station may occupy a channel and send/transmit, to one or more wireless devices, a control signal indicating that the one or more wireless devices may use the channel. The control signal may comprise an UL grant and/or a particular LBT procedure type (e.g., CAT1 LBT and/or CAT2 LBT). The one or more wireless device may determine COT sharing based at least on the UL grant and/or the particular LBT procedure type. The wireless device may perform UL transmission(s) with dynamic grant and/or configured grant (e.g., Type 1, Type 2, autonomous UL) with a particular LBT procedure (e.g., CAT2 LBT, such as 25 us LBT) in the configured period, for example, if a COT sharing is triggered. A COT sharing may be triggered by a wireless device. A wireless device performing UL transmission(s) based on a configured grant (e.g., Type 1, Type 2, autonomous UL) may transmit/send an UL control information indicating the COT sharing (UL-DL switching within a (M)COT). A starting time of DL transmission(s) in the COT sharing triggered by a wireless device may be indicated in one or more ways. One or more parameters in the UL control information indicate the starting time. Resource configuration(s) of configured grant(s) configured/activated by a base station may indicate the starting time. A base station may be allowed to perform DL transmission(s) based on (e.g., after or in response to) UL transmission(s) on the configured grant (e.g., Type 1, Type 2, and/or autonomous UL). There may be a delay (e.g., at least 4 ms) between the UL grant and the UL transmission. The delay may be predefined, semi-statically configured (via an RRC message) by a base station, and/or dynamically indicated (e.g., via an UL grant) by a base station. The delay may not be accounted in the COT duration.

Single and multiple DL to UL switching and UL to DL switching within a shared COT may be supported. Example LBT requirements for supporting single or multiple switching points may comprise: no LBT procedure may be used for a gap of less than threshold (e.g., 16 μs); one-shot LBT procedure may be used for a gap corresponding to first time period (e.g., for a gap of above 16 μs but less than 25 μs); one-shot LBT procedure may be used for single switching point and for a gap between DL transmission to UL transmission corresponding to a second time period (e.g., greater than 25 μs); one-shot LBT procedure may be used for multiple switching points and for a gap between DL transmission to UL transmission corresponding to the second time period (e.g., greater than 25 μs).

A signal that facilitates its detection with low complexity may be useful for wireless device power saving, improved coexistence, spatial reuse at least within the same operator network, serving cell transmission burst acquisition, etc. A radio access technology (e.g., LTE and/or NR) may employ a signal comprising at least SS/PBCH block burst set transmission. Other channels and signals may be transmitted/sent together as part of the signal. The signal may be a discovery reference signal (DRS). There may or may not be a gap within a time span that the signal is transmitted/sent at least within a beam. A gap may be defined for beam switching. A block-interlaced based PUSCH may be employed. A same interlace structure for PUCCH and PUSCH may be used. An interlace-based PRACH may be used.

An initial active DL/UL BWP may be approximately 20 MHz (e.g., or any other bandwidth) for a first unlicensed band (e.g., 5 GHz unlicensed band). An initial active DL/UL BWP in one or more unlicensed bands may be similar (e.g., approximately 20 MHz, or any other bandwidth, in 5 GHz and/or 6 GHz unlicensed spectrum), for example, if similar channelization is used in the one or more unlicensed bands (e.g., based on a regulation).

A HARQ acknowledge and negative acknowledge (A/N) for the corresponding data may be transmitted/sent in a shared COT (e.g., with a CAT2 LBT). The HARQ A/N may be transmitted/sent in a separate COT (e.g., the separate COT may require a CAT4 LBT). A radio access technology (e.g., LTE and/or NR) may support flexible triggering and multiplexing of HARQ feedback for one or more DL HARQ processes, for example, if UL HARQ feedback is transmitted/sent on unlicensed band. HARQ process information may be defined independent of timing (e.g., time and/or frequency resource) of transmission. UCI on PUSCH may comprise HARQ process indicator/ID, new data indicator (NDI), redundancy version identifier (RVID). DL feedback information (DFI) may be used for transmission of HARQ feedback for configured grant.

Contention-based random access (CBRA) and/or contention-free random access (CFRA) may be supported. CBRA and/or CFRA may be supported on a primary cell of a master cell group or a primary cell of a secondary cell group (SpCell). CFRA may be supported on SCells. An RAR may be transmitted via an SpCell (e.g., in a non-standalone scenario). An RAR may be transmitted via an SpCell and/or an SCell (e.g., in a standalone scenario). A predefined HARQ process indicator/identifier/index (ID) may be used for an RAR.

Carrier aggregation may be supported. Carrier aggregation between a PCell configured on a licensed band and an SCell configured on an unlicensed band may be supported. An SCell may be configured for both DL transmissions and UL transmission, or may be configured for DL transmissions only. Dual connectivity between a PCell (e.g., an LTE cell, or any other cell) configured on a licensed band and a PSCell (e.g., an NR-U cell, or any other cell) configured on unlicensed band may be supported. Stand-alone operation on an unlicensed band, in which all carriers are in one or more unlicensed bands, may be supported. A cell configured for DL transmissions in an unlicensed band and UL transmissions in a licensed band, or vice versa, may be supported. Dual connectivity between PCell (e.g., an NR cell, or any other cell) on a licensed band and PSCell (e.g., NR-U cell, or any other cell) on an unlicensed band may be supported.

A radio access technology (e.g., LTE, NR, and/or any other 3GPP or non-3GPP access technology) may operate in an unlicensed band (e.g., 5 GHz, 6 GHz, and/or sub-7 GHz). The radio access technology operating bandwidth may be an integer multiple of 20 MHz (or any other bandwidth), for example, if absence of Wi-Fi signals cannot be guaranteed (e.g. by regulation) in the unlicensed band. A wireless device may perform one or more LBT procedures in units of 20 MHz. A receiver-assisted LBT procedure (e.g., using request to send (RTS)/clear to send (CTS) type procedure) and/or on-demand receiver-assisted LBT procedure (e.g., receiver-assisted LBT procedure enabled only if needed) may be employed. Techniques to enhance spatial reuse may be used.

A wireless device may measure (averaged) received signal strength indicator (RSSI) and/or may determine a channel occupancy (CO) of one or more channels for operation in an unlicensed band (e.g., LTE enhanced LAA (eLAA)/ further enhanced (feLAA) and/or NR-U). The wireless device may report CO and/or RSSI measurements to the base station. It may be beneficial to report a metric indicating CO and/or medium contention. CO may be defined as a portion (e.g., percentage) of time in which RSSI was measured to be above a configured threshold. The RSSI and the CO measurement reports may assist the base station to detect hidden node(s) and/or to achieve a load balanced channel access to reduce the channel access collisions.

Channel congestion may cause an LBT failure (e.g., failure of an LBT procedure). Probability of a successful LBT procedure may be increased for random access and/or for data transmission, for example, if the wireless device selects the cell/BWP/channel with a lowest channel congestion and/or lowest load. CO-aware RACH procedure may be considered to reduce LBT failure. Random access backoff time for the wireless device may be determined/adjusted based on channel conditions (e.g., based on CO and/or RSSI measurements). A base station may (semi-statically and/or dynamically) transmit/send a random access backoff indication indicating the random access backoff time. The random access backoff time may be predefined. The random access backoff time may be incremented, for example, based on (e.g., after or in response to) one or more random access response reception failures corresponding to one or more random access preamble attempts.

Carrier aggregation with at least one SCell operating in the unlicensed spectrum may be referred to as LAA. A configured set of serving cells for a wireless device (e.g., a UE), in LAA, may comprise at least one SCell operating in the unlicensed spectrum according to a first frame structure (e.g., frame structure Type 3). The SCell may be referred to as an LAA SCell.

A maximum frequency separation between any two carrier center frequencies on which LAA SCell transmissions are performed may be less than or equal to threshold frequency (e.g., 62 MHz, or any other value), for example, if absence of Wi-fi (e.g., IEEE 802.11n/11ac) devices sharing the carrier cannot be guaranteed on a long term basis (e.g., by level of regulation), and/or if the maximum quantity of unlicensed channels that network may simultaneously transmit/send on is equal to or less than threshold quantity (e.g., 4, or any other value). The wireless device may be required to support frequency separation.

A base station and wireless device may perform an LBT procedure before performing a transmission on an LAA SCell. The transmitter may listen to/sense the channel to determine whether the channel is free or busy, for example, if an LBT procedure is used. A transmitter (e.g., base station, wireless device) may perform the transmission, for example, if the channel is determined to be free/clear. The transmitter may not perform the transmission, for example, if the channel is determined to be not free/clear. A transmitter may continue to meet an LAA maximum energy detection threshold requirement, for example, if the transmitter uses channel access signals of other communication technologies for channel access.

A combined time period of transmissions, compliant with a channel access procedure by a base station, may not exceed a threshold time period (e.g., 50 ms, or any other value) in any contiguous time period (e.g., 1 second, or any other value) on an LAA SCell. An LBT type (e.g., type 1 or type 2 UL channel access) to be used by the wireless device may be signaled via UL grant for UL PUSCH transmission on LAA SCells. The LBT type may or may not be signaled in the UL grant, for example, for autonomous UL (AUL) transmissions.

A base station may signal (e.g., for type 1 UL channel access on AUL) the channel access priority class for a logical channel. A wireless device may select (e.g., for type 1 UL channel access on AUL) the highest channel access priority class (e.g., with a lower number) of the logical channel(s) with MAC SDU multiplexed into the MAC PDU. The MAC CEs (e.g., except padding buffer status report (BSR) bits) may use the lowest channel access priority class.

A wireless device may select (e.g., for type 2 UL channel access on AUL) logical channels corresponding to any channel access priority class for UL transmission in the subframes signaled by base station in common DL control signaling. The base station may not schedule (e.g., for UL LAA operation) the wireless device with subframes that are more than a minimum quantity necessary to transmit/send traffic corresponding to the selected channel access priority class or a lower channel access priority class (e.g., with a lower number) than: the channel access priority class signaled in UL grant based on the latest BSR and received UL traffic from the wireless device if type 1 UL channel access procedure is signaled to the wireless device; and/or channel access priority class used by the base station based on the DL traffic, the latest BSR, and received UL traffic from the wireless device if type 2 UL channel access procedure is signaled to the wireless device.

A first quantity (e.g., four, or any other quantity) channel access priority classes may be used if performing UL and DL transmissions in LAA carriers. Channel access priority class may be used by traffic corresponding to different standardized QoS class identifiers (QCIs). A non-standardized QCI (e.g., operator specific QCI) may use suitable channel access priority class. Channel access priority class used for a non-standardized QCI may be a channel access priority class used for standardized QCIs which best match a traffic class of the non-standardized QCI. The base station may select (e.g., for UL) the channel access priority class by based on the lowest priority QCI in a logical channel group.

Four (or any other quantity of) channel access priority classes may be used. The base station may ensure that (e.g., if a DL transmission burst with PDSCH is transmitted/sent based on channel access obtained using channel access priority class P (1 . . . 4), where the DL transmission burst refers to continuous transmission by a base station after a successful LBT): transmission duration of the DL transmission burst may not exceed a minimum duration needed to transmit/send all available buffered traffic corresponding to channel access priority class(es)≤P; the transmission duration of the DL transmission burst may not exceed the maximum channel occupancy time for channel access priority class P; and/or additional traffic corresponding to channel access priority class(s)>P may be included in the DL transmission burst if no more data corresponding to channel access priority class≤P is available for transmission. Base station may maximize occupancy of the remaining transmission resources in the DL transmission burst with this additional traffic.

An LAA Scell may be scheduled for DL transmission via its PDCCH and for UL transmission via the PDCCH of one other serving cell, for example, if the PDCCH of the LAA SCell is configured and/or if cross-carrier scheduling applies to UL transmission. An LAA Scell may be scheduled for UL transmission and DL transmission via its PDCCH, for example, if the PDCCH of the LAA SCell is configured and/or if self-scheduling applies to both UL transmission and DL transmission.

Autonomous UL may be supported on the SCells. One or more autonomous UL configuration may be supported per SCell. Multiple autonomous UL configurations may be active simultaneously if there is more than one SCell.

The following information may be provided (e.g., if autonomous UL is configured by RRC messaging) in an AUL configuration information element (e.g., AUL-Config): AUL C-RNTI; HARQ process indicators/IDs (e.g., aul-harq-processes) that may be configured for autonomous UL HARQ operation, retransmission time period (e.g., aul-retransmis sionTimer) before triggering a new transmission or a retransmission of the same HARQ process using autonomous UL); bitmap (e.g., aul-subframes) that indicates subframes that are configured for autonomous UL HARQ operation.

A corresponding configured grant may be cleared, for example, if the autonomous UL configuration is released by RRC. A MAC entity may determine/consider that a configured UL grant may occur in subframes for which aul-subframes is set to 1, for example, if AUL-Config is configured. The MAC entity may instruct a multiplexing and assembly procedure to generate an AUL confirmation MAC control element and may cancel a triggered AUL confirmation, for example, if the AUL confirmation has been triggered and not cancelled and/or if the MAC entity has UL resources allocated for new transmission for this transmission time interval (TTI).

The MAC entity may clear the configured UL grant for the SCell based on first transmission of AUL confirmation MAC control element triggered by the AUL release for this SCell. Retransmissions for UL transmissions using autonomous UL may continue after clearing the corresponding configured UL grant.

A MAC entity may be configured with AUL-RNTI for AUL operation. An UL grant may be received for a TTI for a serving cell on the PDCCH for the MAC entity's AUL C-RNTI. The MAC entity may determine/consider that the new data indicator (NDI) for the corresponding HARQ process has not been toggled, for example, if the NDI in the received HARQ information is 1. The MAC entity may deliver the UL grant and associated HARQ information to the HARQ entity for this TTI. The MAC entity may trigger an AUL confirmation, for example, if the NDI in the received HARQ information is 0 and/or if PDCCH transmission contents indicate AUL release. The MAC entity may consider the NDI bit for the corresponding HARQ process to have been toggled, for example, if an UL grant for this TTI has been configured. The MAC entity may provide the configured UL grant and the associated HARQ information to the HARQ entity for this TTI. The MAC entity may trigger an AUL confirmation, for example, if the NDI in the received HARQ information is 0 and/or if PDCCH contents indicate AUL activation.

The MAC entity may provide/deliver the configured UL grant and the associated HARQ information to the HARQ entity for this TTI, for example, if the aul-retransmission-Timer is not running and if there is no UL grant previously delivered to the HARQ entity for the same HARQ process; or if the previous UL grant delivered to the HARQ entity for the same HARQ process was not an UL grant received for the MAC entity's C-RNTI; or if the HARQ_FEEDBACK is set to ACK for the corresponding HARQ process.

The NDI transmitted/sent in the PDCCH for the MAC entity's AUL C-RNTI may be set to 0. The HARQ process ID associated with a TTI for transmission on a serving cell may be selected (e.g., for configured UL grants), based on the wireless device implementation, from the HARQ process IDs that are configured for autonomous UL HARQ operation by upper layers (e.g., in aul-harq-processes), for example, if UL HARQ operation is autonomous. A HARQ process may maintain (e.g., for autonomous HARQ) a state variable (e.g., HARQ_FEEDBACK) which may indicate the HARQ feedback for the MAC PDU currently in the buffer, and/or a timer (e.g., aul-retransmissionTimer) which may prohibit new transmission or retransmission for the same HARQ process if the timer is running. The HARQ process may set the state variable (e.g., HARQ_FEEDBACK) to the received value; and may stop the timer (e.g., aul-retransmissionTimer), if running, for example, if the HARQ feedback is received for a TB. The HARQ process start the timer (e.g., aul-retransmissionTimer), for example, if PUSCH transmission is performed for a transport block (TB) and/or if the UL grant is a configured grant for the MAC entity's AUL C-RNTI. The HARQ process may set the state variable (e.g., HARQ_FEEDBACK) to NACK, for example, if UL HARQ operation is autonomous asynchronous and if the HARQ entity requests a new transmission. The HARQ process may set CURRENT_IRV to 0, for example, if the UL grant was addressed to the AUL C-RNTI. The MAC entity may not generate a MAC PDU for the HARQ entity, for example, if aperiodic CSI requested for a TTI and if the grant indicated to the HARQ entity is a configured UL grant activated by the MAC entity's AUL C-RNTI. The wireless device may use autonomous UL feedback information, for example, if the wireless device detects, on the scheduling cell for UL transmissions on an LAA SCell, a transmission of DCI (e.g., corresponding to format 0A/4A) with the CRC scrambled by AUL C-RNTI carrying AUL-DFI. A corresponding HARQ-ACK feedback for a HARQ process configured for autonomous UL transmission may be provided/delivered to higher layers. A corresponding HARQ-ACK feedback for the HARQ processes not configured for autonomous UL transmission may not be provided/delivered to higher layers. The wireless device may expect HARQ-ACK feedback in the AUL-DFI at earliest in subframe n+4 for an UL transmission in subframe/slot/TTI n. The wireless device may not be expected to receive (or may not receive) AUL-DFI indicating ACK for a HARQ process prior to a time period (e.g., 4 ms, or any other time period) following the wireless device transmitting/sending another UL transmission associated with that HARQ process, for example, if the wireless device receives AUL-DFI in a subframe indicating ACK for the HARQ process.

A wireless device may validate an autonomous UL assignment PDCCH/EPDCCH if one or more of the following conditions are met: the CRC parity bits obtained for the PDCCH/enhanced PDCCH (EPDCCH) payload are scrambled with the AUL C-RNTI; and a flag (e.g., flag for AUL differentiation) indicates activating/releasing AUL transmission. One or more fields in an activation DCI may be pre-configured values for validation.

A base station may configure consecutive configured grant resources in time. There may be no gaps between the consecutive configured grant resources. The base station may configure non-consecutive configured grant resources. The non-consecutive configured grant resources may be periodic (e.g., with a periodicity). The non-consecutive configured grant resources may be non-periodic. A first pattern of configured grant resources may be repeated in time, wherein the resources of the first configured grant resources may be non-periodic (e.g., even if a pattern of the multiple configured grants may be periodic).

A wireless device may select a HARQ process ID from an RRC configured set of HARQ IDs for transmission of packet via a configured grant resource on an unlicensed cell. DCI may comprise DFI. The DFI may comprise pending HARQ ACK feedback for prior configured grant transmissions from the same wireless device. The DFI may comprise HARQ feedback for dynamically scheduled UL transmissions using HARQ IDs configured for configured grant transmission in unlicensed spectrum (e.g., NR-U configured grant transmission).

A packet/transport block corresponding to a HARQ process that was initially transmitted/sent via a configured grant resource may be retransmitted/resent via a (e.g., another) configured grant resource. The packet/transport block corresponding to a HARQ process that was initially transmitted/sent via a configured grant resource may be retransmitted/resent via resources dynamically scheduled by an UL grant. A wireless device may autonomously initiate retransmission for a HARQ process that was initially transmitted/sent via configured grant procedure in unlicensed spectrum (e.g., NR-U transmission), for example, if a NACK is received (e.g., via DFI) for the corresponding HARQ process. The wireless device may autonomously initiate retransmission for a HARQ process that was initially transmitted/sent via configured grant procedure in unlicensed spectrum (e.g., NR-U transmission), for example, if no feedback is received (e.g., from a base station) prior to expiration of a timer.

A block-interlaced based PUSCH may be employed. A same interlace structure for PUCCH and PUSCH may be used. Interlaced based PRACH may be used.

Initial active DL/UL BWP may be approximately 20 MHz (or any other bandwidth) for 5 GHz band. Initial active DL/UL BWP may be approximately 20 MHz (or any other bandwidth) for 6 GHz band if channelization that is similar to the 5 GHz band is used for the 6 GHz band.

HARQ A/N for the corresponding data may be transmitted/sent in a same shared COT. The HARQ A/N may be transmitted/sent in a COT separate from a COT in which the corresponding data was transmitted/sent.

Procedures to support flexible triggering and multiplexing of HARQ feedback for one or more DL HARQ processes may be considered, for example, if UL HARQ feedback is transmitted/sent on unlicensed band. The dependencies of HARQ process information to timing may be removed. UCI on PUSCH may comprise HARQ process indicator/ID, NDI, and/or RVID. DFI may be used for transmission of HARQ feedback for configured grant.

Both CBRA and CFRA may be supported on SpCell and CFRA may be supported on SCells (e.g., in NR-U). RAR may be transmitted/sent via SpCell. The transmission may comprise a predefined HARQ process indicator/ID for RAR.

Carrier aggregation between a licensed band cell (e.g., NR PCell) and unlicensed band cell (e.g., NR-U SCell) may be supported. An unlicensed band cell may correspond to both DL and UL, or may correspond to DL only. Dual connectivity between a licensed band cell (e.g., LTE PCell) and unlicensed band cell (e.g., NR-U PSCell) may be supported. Stand-alone unlicensed band operation, where all carriers are in unlicensed spectrum, may be supported. A cell (e.g., NR cell) with DL in unlicensed band and UL in licensed band may be supported. Dual connectivity between a licensed band cell (e.g., NR PCell) and unlicensed band cell (e.g., NR-U PSCell) may be supported.

A radio access technology (e.g., NR-U) may operate in a band (e.g., sub-7 GHz, and/or sub-7 GHz). An operating bandwidth for the radio access technology may be an integer multiple of 20 MHz (or any other bandwidth), for example, if absence of Wi-Fi cannot be guaranteed (e.g. by regulation) in the band. LBT procedures may be performed in units of 20 MHz (e.g., 20 MHz subbands) at least for bands where absence of Wi-Fi cannot be guaranteed (e.g. by regulation). Receiver-assisted LBT (e.g., using RTS/CTS type procedure) and/or on-demand receiver-assisted LBT (e.g., in which receiver-assisted LBT is enabled only if needed) may be employed. Techniques to enhance spatial reuse may be used. Preamble detection may be used.

A network (e.g., a base station) may first gain access (e.g., via an LBT procedure) to a channel to transmit/send PDCCH for scheduling PUSCH transmissions on an unlicensed carrier. The wireless device may perform LBT procedure again prior to transmitting via a resource. Performing LBT procedures at both the base station and the wireless device may increase latency. The latency may be higher if the channel is loaded. A procedure of autonomous UL transmission may be used. A wireless device may be pre-allocated with a resource for transmission (e.g., in a manner similar to UL semi-persistent scheduling (SPS)) and the wireless device may perform an LBT procedure prior to using the resource. An autonomous UL may be based on the configured grant functionality (e.g., Type 1 and/or Type 2).

The HARQ process indicator/ID may be transmitted/sent by the wireless device (e.g., via UCI). Sending the HARQ process identity may enable a wireless device to use a first available transmission opportunity irrespective of the HARQ process. The wireless device may send UCI (e.g., via PUSCH) comprising HARQ process ID, NDI, and/or RVID.

UL dynamic grant scheduled transmission (e.g., for unlicensed band) may increase delay and transmission failure probability because of the at least two LBT procedures performed (e.g., an LBT procedure at a wireless device and an LBT procedure at a base station). Pre-configured grant (e.g., such as configured grant in NR) may be used (e.g., for NR-U), which may decrease the quantity of LBT procedures performed and control signaling overhead.

An UL grant may be provided by RRC messaging and stored as configured UL grant, for example, in Type 1 configured grant. An UL grant may be provided by a PDCCH transmission, and stored or cleared as configured UL grant based on L1 signaling (e.g., indicating configured grant activation or deactivation), for example, in Type 2 configured grant.

There may or may not be a dependency between HARQ process information and timing. UCI via PUSCH may comprise HARQ process indicator/ID, NDI, RVID, etc. Wireless device may autonomously select one HARQ process indicator/ID, and may indicate the HARQ process indicator/ID to the base station (e.g., via UCI).

A wireless device may perform non-adaptive retransmission based on a configured UL grant. The wireless device may attempt to transmit/send in a next available resource with configured grant, for example, if dynamic grant for configured grant retransmission is blocked due to LBT failure.

DFI may be transmitted/sent (e.g., via DCI) and may comprise HARQ feedback for configured grant transmission. The wireless device may perform transmission/retransmission using configured grant based on DFI comprising HARQ feedback. Wideband carrier with more than one channel may be supported for an unlicensed cell (e.g., NR-based unlicensed cell).

A wireless device multiplexing and collision avoidance mechanisms between configured grant transmissions and between configured grant and scheduled grant transmissions may be used. Configured grant transmission (e.g., NR-U configured grant transmission) may not be allowed at a time that overlaps with occasions configured for potential DRS transmissions (e.g., NR-U DRS transmissions) of the serving cell. An RRC configured bitmap may be used for allowed time resources for configured grant transmission at a subframe/slot/symbol level. An RRC configured bitmap of 40 bits (or any other quantity of bits) may be used (e.g., in FeLAA). Using an RRC configured bitmap at subframe/slot/symbol level may provide flexibility to assign or exclude certain subframes/slots/symbols for configured UL.

RRC signaling may indicate (e.g., for type 1 configured grants) a time domain resource allocation (e.g., periodicity, offset in a frame, start symbol and length of PUSCH and K-repetition) of a configured grant resource. RRC signaling may indicate periodicity and K-repetition in time domain (e.g., for type 2 configured grant). The other time domain related parameters may be provided via DCI that is scrambled with a corresponding RNTI for configured grants (e.g., CS-RNTI). Some enhancements may be used in different applications (e.g., for URLLC services). Granularity of time domain allocation may be based on slot (e.g., instead of OFDM symbol). The K-repetition may be reinterpreted as a quantity of configured resources within a period. A wireless device may start configured grant transmission from any configured resource boundary. The configured grant transmission may occupy any quantity of the configured resources.

Resource allocation (e.g., in NR-U) may be based on frequency interlaces. The resource configuration may indicate/include frequency interlace(s) to be used within the configured frequency resources, for example, to comply with the regulatory requirements (e.g., minimum occupied channel bandwidth (OCB) and maximum power spectral density (PSD) requirements) in an unlicensed spectrum.

A wireless device may be configured with a wideband carrier and/or a wideband UL BWP that spans multiple subbands. A subband may be a 20 MHz (e.g., or any other bandwidth) unlicensed channel. A wireless device may be configured with a frequency-domain resource (e.g., one or more frequency interlaces, across multiple subbands) to increase resiliency to LBT failure. A wireless device may perform multiple subband LBT procedures. The wireless device may transmit/send via one or more subbands for which the LBT procedure(s) are successful. The wireless device may select the quantity of subbands to use based on a traffic type or the TB size.

Configuration of frequency-domain resources may comprise configuration of one or more frequency interlaces, for example, for UL transmission in unlicensed band based on a configured grant (e.g., in NR-U). Frequency-domain resources may be configured across multiple subbands of a wideband UL BWP. The wideband UL BWP may be configured for the wireless device for transmission in unlicensed band based on configured grant (e.g., in NR-U).

A wireless device operating in unlicensed bands may be sending/transmitting UL packets corresponding to different traffic classes (e.g., QCIs). The different traffic classes may have different latency and/or bit rate requirements for which a single resource configuration (e.g., corresponding to a periodicity and transport block size (TBS)) may not be adequate. A wireless device may be configured with multiple active UL configured grants in a BWP of a cell. A wireless device may be configured with multiple resource configurations for the UL transmission with configured grant to satisfy diverse QoS requirements anticipated for unlicensed band operations (e.g., in NR-U).

One or more wireless devices may be configured with same time-domain resources, with either orthogonal or same frequency interlaces on a same unlicensed channel, to improve the resource utilization for pre-configured resources. Transmission starting points of the one or more wireless devices may be aligned to avoid mutual blocking during LBT procedures. A receiving base station may (e.g., if a collision occurs) determine/identify wireless devices using other pre-configured resources (e.g., DMRS) and resolve the collision in the spatial or code domains.

A wireless device with data to transmit/send may be unable to gain access to the pre-configured resources as a result of LBT failure due to the uncertainty of the unlicensed channel availability in NR-U. Missing of the pre-configured transmission opportunity may lead to underutilized resources and/or excessive latencies. The wireless device that misses a pre-configured periodic transmission opportunity may defer its channel access for the remaining time span of the configured period until the following transmission opportunity.

A wireless device may be configured with multiple transmission occasions over the pre-configured time-domain resource within a configured grant period. The wireless device may perform an LBT procedure for accessing a first transmission occasion/burst starting position, for example, before the beginning of the pre-configured period. The wireless device may send one or more PUSCH transmissions up until the end of the configured grant resource within the pre-configured period, for example, if the LBT procedure is successful. The wireless device may not defer channel access for the remaining period, for example, if the LBT procedure fails. The wireless device may resume its channel access attempt by performing an LBT procedure for accessing a second transmission occasion.

A base station may dynamically allow a group of wireless devices to transmit/send via additional resources in accordance with a configured grant by sending a DL common alignment signal (e.g., DCI). The DCI may be scrambled by a group indicator/ID.

Transmission start time of multiple wireless devices configured with same time-domain resources and either same or orthogonal frequency interlaces on a given unlicensed channel may be aligned. A base station may align UL transmission with configured grant using an alignment signal (e.g., indicated in group common DCI).

A retransmission may be scheduled with an UL grant for a HARQ process that was initially transmitted/sent with configured grant. UCI multiplexed with data and transmitted/sent via PUSCH may comprise HARQ process indicator/ID, NDI, RVID and other information related to the transmitted/sent data. UCI multiplexed with data and carrying information related to data may be encoded and/or decoded separately, before encoding and/or decoding the data, to enable soft combining of the packet at the base station.

The HARQ process indicator/ID may be determined based on the frequency interlace and/or the DMRS cyclic shift (such that initial and retransmission of a wireless device TB may be identified). The base station may provide pending HARQ feedback for one or more PUSCH transmissions sent within previous UL bursts (e.g., based on a configured grant) using a group common DCI scrambled with a group RNTI. A base station may perform an LBT procedure (e.g., CAT4 LBT) and acquire an MCOT. The base station may transmit/send a DL alignment signal to trigger a transmission from one or more wireless devices based on the configured grant. The wireless devices with data to transmit/send may share the base station acquired MCOT and either access the channel immediately (e.g., if the PUSCH transmission can start after gap that is less than 16 μs) or using an LBT procedure (e.g., CAT2 LBT) otherwise. The wireless devices transmitting/sending based on the DL alignment signal may limit their COT by the base station-acquired MCOT.

The base station may provide HARQ feedback for one or more PUSCH transmissions (e.g., based on configured grant) within the wireless device-acquired MCOT in either a group common DCI or frequency-multiplexed wireless device-specific DCIs. The base station may share one or more wireless device-acquired MCOT(s) and access the channel based on an LBT procedure (e.g., CAT2 LBT).

A wireless device may update its configured grant transmission parameters (e.g., MCS, RI and PMI), and indicate the changes to the base station within the UL burst. A pre-configured pool of pilot signals may indicate the change (e.g., DMRS and cyclic shifts). UCI multiplexed with a PUSCH transmission may indicate the wireless device-updated transmission parameters.

The base station may update the configured grant transmission parameters (e.g., based on received signal quality such as SINR or BLER) and indicate the new parameters in DCI. The base station may use a group common DCI. A wireless device-specific DCI may be used.

Multiple candidate transmission occasions within a period may be configured. The candidate transmission occasions within a period may be configured by network or derived by wireless device according to the configuration. A wireless device may determine multiple candidate transmission occasions within a period (e.g., for NR-U UL configured grant). The multiple transmission occasions may be based on the first candidate transmission occasion, duration of PUSCH, and period P.

A wireless device may perform multiple LBT procedures if it is configured with a BWP (e.g., with frequency bandwidth larger than 20 MHz) for UL configured grant transmission. The wireless device may not transmit/send an UL signal in the active BWP on the unlicensed spectrum, for example, if a subband is sensed to be busy. A wireless device may not transmit/send an UL signal unless all the subbands of the frequency bandwidth are sensed to be idle.

A wireless device may have multiple frequency resource allocations per BWP. A wireless device may be configured with multiple configured grant resource configurations in a BWP by RRC messaging. Multiple configured grant configurations may be activated and different configured grant configurations may have different combinations of subbands. A configuration may be indexed, and the index may be indicated by the activation/deactivation DCI to indicate the target configuration. Multiple resource configurations may be supported per BWP (e.g., for NR-U UL configured grant). Different resource configurations may correspond to different subband combinations.

Retransmission may be via a configured grant resource or resource scheduled by UL grant for a HARQ process that was initially transmitted/sent via configured grant resource. UCI (e.g., NR-U UCI) for configured grant may be mapped to the REs after the symbols carrying DMRS in PUSCH on the allocated subbands. UCI may be mapped from the symbol, of the PUSCH transmission, before which the channel is sensed to be idle. UCI may be mapped on the resource of the actual transmission occasion, for example, for NR-U UL configured grant. NR-U UCI for configured grant may be mapped to the REs after the symbols carrying DMRS in the PUSCH transmission.

Multiple wireless devices in unlicensed spectrum (e.g., NR unlicensed spectrum) may be configured with configured grant resources with aligned starting positions in time domain. The wireless devices may perform LBT procedures simultaneously (e.g., if there are packets in buffers of the wireless devices), for example, before the transmission occasion of configured grant resource. Each wireless device may sense that the channel is idle and may start PUSCH transmission. PUSCH transmissions from multiple wireless devices may be simultaneous and may collide.

DMRS may be used for wireless device identification since DMRS configuration(s)/parameter(s) are configured in a wireless device-specific manner. A base station may determine/identify colliding wireless devices based on DMRS detection if a collision occurs. A base station may determine/identify wireless devices transmitting/sending UL data based on DMRS detection, for example, if the wireless devices transmit/send UL data simultaneously using the same starting position in time domain. The base station may schedule retransmission or feedback NACK for the corresponding wireless device.

A wireless device may be configured/scheduled with multiple transmission opportunities in time and/or frequency domain for grant-free UL (GUL) (e.g., NR GUL) transmission in unlicensed band because of uncertainty in channel availability. A wireless device may be configured with multiple consecutive transmission occasions in time domain, within a periodic window, for GUL transmission. The wireless device may perform multiple LBT attempts until the wireless device succeeds. The wireless device may be configured with mini-slot level time domain resources for the periodic window to enable more LBT attempts at a finer channel access granularity. The consecutive time domain resources for the periodic window may be configured via either a bitmap or a set (e.g., tuple) of parameters (e.g., including start position, temporal length, and/or periodicity). A bitmap may be used to indicate slots/symbols/subframes that are configured with a configured grant within a time duration. The bitmap may indicate a pattern and the pattern may be repeated for consecutive time durations.

A wireless device (e.g., in NR-U) with capability of subband LBT may be configured to operate multiple unlicensed channels (e.g., 20 MHz unlicensed channels, or unlicensed channels of any other bandwidth). The base station may configure a set of candidate resources distributed across the multiple unlicensed channels for GUL transmission. The wireless device may perform subband LBT procedures for each unlicensed channel. The wireless device may select the available candidate resource(s) to transmit/send the data. The candidate resources may be shared with multiple wireless devices (e.g., by managing the transmission starting positions) to avoid inefficient resource utilization. The base station may blindly detect actual transmission(s) on the configured multiple candidate resources. A wireless device may be configured with multiple candidate resources across multiple unlicensed channels for GUL transmission. The wireless device may transmit/send data via one or more candidate resources based on subband LBT procedure results.

DL signals and/or channels (e.g., PDCCH, PDSCH) may be shared in a wireless device-initiated COT (e.g., for NR-U configured grant). Configured grant UCI (CG-UCI) on GUL transmission may comprise one or more of HARQ process indicator/ID, NDI, RVID, etc. CG-UCI on GUL transmission may remove the timing dependency of HARQ process. A wireless device may select the HARQ process indicator/ID from an RRC configured set of HARQ process indicators/IDs. The CG-UCI may comprise a wireless device indicator/ID, for example, if the configured resource(s) for GUL transmission is shared with multiple wireless devices.

The CG-UCI may comprise COT sharing information to support wireless device-initiated COT sharing for PDCCH transmission and/or PDSCH transmission. CG-UCI may include (e.g., in addition to HARQ related information) one or more of wireless device indicator/ID, COT-sharing related information, CSI report for DL transmission (e.g., in a same wireless device-initiated COT), etc.

DFI may be transmitted/sent via DCI and may comprise HARQ feedback for configured grant transmission. Time domain resource allocation for the configured grant transmissions may provide flexibility.

A base station may configure a wireless device with a periodicity and repetition quantity by RRC. Repetition quantity may correspond to pre-configured transmission occasions within the periodicity. The wireless device may transmit/send PUSCH transmission, for example, after a successful LBT procedure and before any of the candidate transmission opportunities scheduled by the configured grant. The base station may perform blind detection on UL data according to the configuration.

Multiple frequency domain opportunities may be considered in order to increase UL transmission opportunities. Multiple BWPs may be configured for a wireless device. The wireless device may attempt to perform LBT procedures in multiple BWPs according to the resource configuration for configured grant, for example, if data is available for transmission. The wireless device may transmit/send on either multiple BWPs or a selected BWP, for example, if any LBT procedures on the BWPs succeeds.

Transmission based on the configured grants may be code block group (CBG)-based. The HARQ feedback information in DFI or UCI may be CBG-based. DFI may provide CBG level HARQ feedback (e.g., ACK/NACK information per CBG of a TB). UCI may indicate the CBGs of the TBs that are transmitted/sent via a configured grant resource. The wireless device may select the configured grant UL CBG and the transmitted/sent CBGs information may be carried in the UCI. The DFI may provide CBG level feedback indication and the wireless device may retransmit/resend failed CBGs based on the DFI indication.

A wireless device initiated MCOT sharing between configured grant UL and DL may be used (e.g., in NR-U). A wireless device, performing grant-free transmission, may indicate/comprise (e.g., in grant-free UCI) one or more of: HARQ process indicator/ID, wireless device indicator/ID, NDI, PUSCH duration, and/or COT sharing information. The grant-free UCI may be scrambled with a cell-specific RNTI. COT acquired by a wireless device may be shared for configured grant transmission. DFI may comprise HARQ feedback for configured grant transmission. HARQ-ACK information corresponding to HARQ processes (e.g., configured at least for CGU (configured grant for NR-U)) may be included also in CGU-DFI.

A wireless device may transmit/send the UCI, corresponding to a PUSCH transmission via a configured grant resource, via the PUSCH. The UCI may comprise at least one of HARQ process indicator/ID, NDI, RVID, etc. The mapping position of UCI may be from the second symbol to the second last symbol to minimize the effect of multiple starting/ending symbol positions of PUSCH. UCI mapping may avoid puncturing due to the LBT failure if the PUSCH for configured grant has multiple starting/ending positions. The position of DM-RS for the PUSCH may be considered in the UCI mapping. The UCI may be mapped close to DM-RS symbol to guarantee its reliability. UCI mapping on PUSCH may be based on multiple starting/ending positions of PUSCH, the position of DM-RS for the PUSCH, and multiplexing with NR-UCI (e.g., HARQ-ACK, CSI part 1, and CSI part 2).

The time-domain resource allocation for configured grant may be based on offset value from a system frame (e.g., with SFN=0) and symbol-level periodicity. The time-domain resource may be allocated using a bitmap for a fixed period time to increase flexibility for time-domain resource allocation. Various numerologies for bitmap-based time domain resource allocation may be considered. A bitmap with a fixed size may be interpreted in a scalable manner with respect to numerology (e.g., one slot allocation for each bit in case of 15 kHz SCS and two slot allocation for each bit in case of 30 kHz SCS), or different bitmap size can be configured for each SCS (e.g., 40-bit bitmap for 15 kHz SCS and 80-bit bitmap for 30 kHz SCS).

A wireless device and/or base station may use CBG-based transmission. A wireless device may provide HARQ-ACK feedback for each CBG and base station may retransmit/resend the NACKed CBGs (e.g., rather than the whole TB). The CBG-based transmission may be useful for large TBs and especially if some CBGs are punctured (e.g., by URLLC communications or time-selective interference).

CBG-based transmission may be realized by CBGTI (CBG transmission indication) in scheduling DCI for a retransmission of a TB. A bit value of 0 may indicate that the corresponding CBG is not transmitted/not to be transmitted. A bit value of 1 may indicate that the corresponding CBG is transmitted/to be transmitted for DL/UL. CBG-based transmission may be used for PDSCH transmission and/or PUSCH transmission (e.g., in NR-U). CBG-based transmission may be used for PUSCH transmission via configured grant resources. Some symbols may not be transmitted/sent due to LBT failure (e.g., puncturing) if multiple starting positions for CGU PUSCH are allowed. The wireless device may retransmit/resend CBG(s) only corresponding to the symbols that are not transmitted. Control information (e.g., DFI, UCI) may be configured to support efficient CBG based transmission for CGU. A wireless device may indicate, to a base station and using CBGTI bits in the UCI, which CBGs are/were transmitted/sent. CBG-level HARQ feedback via DFI may be used to enable a wireless device to retransmit/resend the NACKed CBGs based on the DFI. Various techniques may be used to reduce signaling overhead if CBG-level HARQ-ACK feedback by DFI is adopted. For example, CBG-level HARQ-ACK may be used for a limited quantity of HARQ process indicators/IDs and/or TB-level HARQ-ACK may be used for granted UL transmission.

A base station may indicate (e.g., via RRC signaling) slots in which configured grant UL transmissions are allowed. The base station may indicate the slots using a bitmap comprising a plurality of bits. A periodic transmission window may be defined (e.g., instead of only one periodic transmission occasion) to improve efficiency of configured grant transmission (e.g., in NR-U). Configured grant UL transmission may be allowed within the base station-acquired COT. Collisions between configured grant UL transmission and scheduled transmission may be managed based on transmission starting positions. A wireless device selected starting offset and RRC configured starting offset may be used to coordinate wireless device multiplexing for configured grant operation (e.g., NR-U configured grant operation). A timer may be used for autonomous configured grant retransmission (e.g., for NR-U). The timer may be RRC configured (e.g. with a slot granularity).

CBG-based operation for configured grant may overcome bursty interference. Retransmission efficiency may be increased using CBG-based operation. A wireless device may start configured grant UL transmission, for example, after a successful LBT procedure. Some symbols or partial symbols may be discarded if the wireless device finishes the LBT procedure. The wireless device may need to retransmit/resend CBG(s) corresponding to the symbols that were not sent (e.g., instead of the full TB) if the base station received the rest of the CBGs successfully.

A HARQ process corresponding to a configured grant may not have a dependency to the timing of the configured grant. UCI (e.g., sent via a PUSCH) may comprise one or more of HARQ process indicator/ID, NDI, RVID, etc. DFI may be transmitted/sent via DL control signaling. The DFI may comprise HARQ feedback for configured grant transmission. Time domain resource allocation of configured grant transmissions may be flexible. A retransmission may be based on a configured grant resource.

Type 1 and type 2 configured grant mechanism may be used for operation (e.g., of NR) in unlicensed spectrum. Consecutive configured grant resources in time without any gaps in between the resources may be configured. Non-consecutive configured grant resources (periodic or non-periodic) with gaps in between the resources may be configured.

A wireless device may select a HARQ process indicator/ID, from an RRC configured set of HARQ indicators/IDs, for NR-U configured grant transmission. DFI may comprise pending HARQ ACK feedback for prior configured grant transmissions from the same wireless device. DFI may comprise HARQ ACK feedback for scheduled UL transmissions using HARQ indicators/IDs configured for configured grant transmission.

A HARQ process may be initially transmitted/sent via configured grant resource. The retransmission of the HARQ process may be via a configured grant resource. A HARQ process that was initially transmitted/sent via configured grant resource may be retransmitted/resent via a resource scheduled by an UL grant.

A wireless device may autonomously initiate retransmission for a HARQ process that was initially transmitted based on a configured grant for NR-U, for example if one or more of the following conditions is met: reception of NACK feedback via DFI for the corresponding HARQ process, no reception of feedback from a base station upon a timer expiration, etc.

Configured grant transmission may not be allowed at a time at which the configured grant transmission overlaps with occasions configured for potential DRS of the serving cell (e.g., irrespective of the configured time domain resource for configured grant transmission). A bitmap-based approach and configured parameters (e.g., comprising one or more of periodicity, offset in the frame, start symbol, length of PUSCH and K-repetition signaling, etc.) may be used to enable flexible time domain resource allocation of configured grants. CBG-based retransmissions may be used for configured grant transmissions. CBG related control information may be transmitted/sent via DFI and/or UCI. Collision between configured grant and scheduled grant transmission may be avoided by management of starting point for configured grant and scheduled grant transmission. The resources utilized by the UCI, and multiplexing of UCI and data information of PUSCH may be based on DMRS placement and starting and ending symbols of the configured grant transmissions. UCI corresponding to a configured grant transmission may comprise one or more of wireless device indicator/identifier, COT sharing information, PUSCH duration, etc. A wireless device may not assume ACK in absence of feedback (e.g., explicit feedback or feedback in the form of UL grants). A wireless device may assume NACK based on a timer expiration (e.g., to avoid LBT impact on reception of feedback).

Wireless device(s) may share resources with a base station within COT(s), acquired by the wireless device(s), as part of configured grant transmissions. Configured grant transmissions within a base station-acquired COT may be allowed.

Multiple wireless device starting time offsets with sub-symbol granularity may be supported for configured grant transmissions. The wireless device may start transmissions by accessing transmission opportunities, provided by a configured grant, at the configured/indicated starting positions. A quantity of allocated slots, following the time instance corresponding to the indicated offset, may be configured for configured grant time domain resource allocation. Multiple PUSCHs may be configured/allocated within a slot.

The DFI for configured grants (e.g., NR-U configured grants) may comprise at least TB level HARQ-ACK bitmap for all UL HARQ processes. The DFI for configured grants may support RRC-configured minimum duration (e.g., D) from a last symbol of a PUSCH transmission to a starting symbol of the DFI comprising HARQ-ACK for that PUSCH transmission. A wireless device may assume that HARQ-ACK is valid only for PUSCH transmission ending before n-D, where n is the time corresponding to the beginning of the start symbol of the DFI. A wireless device blind decoding complexity may not be increased due to DFI size. A size of DFI may be same as a DCI size used in NR. The DFI may comprise one or more of: an NDI bit for each HARQ indicator/ID; HARQ-ACK bitmap for all UL HARQ processes for configured grant; and HARQ-ACK for a scheduled PUSCH transmission.

A configured grant UCI (CG-UCI) may be included in every configured grant PUSCH (CG-PUSCH) transmission. A quantity of separately encoded UCIs multiplexed in a PUSCH transmission using a configured grant may be predefined (e.g., at most three or any other quantity). A CG-UCI may comprise one or more of: HARQ indicator/ID, NDI, RV, COT sharing information (e.g., LBT type/priority class, COT duration), wireless device indicator/ID, CRC, indication of PUSCH start/end point/slot, resource configuration indicator/index, multiple blanked OFDM symbols, transmission parameters (e.g., MCS, PMI, RI, SRI), shared CG-UCI corresponding to multiple PUSCHs, SR information (e.g., to indicate a request for continuous PUSCH scheduling), uplink assignment index (UAI) (similar to downlink assignment index (DAI) in DL), UL transmit power, CBG level ACK-NACK, CBGTI; etc.

Configuring dedicated time/frequency resources for each wireless device may increase a likelihood of resource wastage and decreased user capacity. Burst traffic may result in the pre-configured dedicated resources to be underutilized. A wireless device with data ready to transmit/send may not gain access to the pre-configured resources as a result of LBT failure. A network may improve resource utilization with pre-configured resources by configuring a selected set of wireless devices (e.g., two or more wireless devices) with same time-domain resources, and either orthogonal or same frequency interlaces on the same LBT subband. The network may align transmission starting points of the wireless devices to avoid mutual blocking during the LBT.

Multiple configured grant wireless devices may be configured with the same time and/or frequency resources. One or more collisions may occur if multiple wireless devices are configured with the same time and/or frequency resources. The receiving base station may determine/identify the wireless devices involved in a collision using other pre-configured resources (e.g., DMRS sequence/index) and resolve the intra-cell collisions in the spatial or code domain. Resource utilization may be improved despite the burst traffic and channel availability in NR-U leading to increased user capacity and reduced latencies.

Dependencies of HARQ process information on the timing may be removed for NR-U transmission with configured grant. UCI (e.g., via PUSCH) may comprise one or more of the HARQ process indicator/ID, NDI, and/or RVID (e.g., as in LTE-AUL). A wireless device may transmit/send its selected HARQ process indicator/ID in a CG-UCI that is multiplexed in a PUSCH transmission. The HARQ process indicator/ID may be encoded and decoded separately before the data, for example, to enable soft combining of the packet at the base station. The CG-UCI may have lower reliability compared to a dedicated physical control channel (e.g., PUCCH), for example, because of collisions among multiple wireless device transmissions (e.g., that use the same configured grant) and/or interference from hidden nodes.

The wireless device indicator/ID and/or HARQ indicator/ID for transmissions using configured grant in NR-U (including initial transmission and retransmissions) may be determined based on flexible mapping between the HARQ indicator/ID (and/or wireless device indicator/ID) and the set of configured grant resources/parameters used for the transmission of the associated TB. The HARQ process indicator/ID and/or wireless device indicator/ID may be determined/verified based on the frequency interlace and/or the DMRS cyclic shift. This may allow a more flexible utilization of the configured grant resources and support multiple resource configuration per cell per wireless device.

UL transmission collisions may occur, for example, because the base station may configure multiple wireless devices to share the same configured grant resource. A configured grant wireless device may be allocated to occupy parts of the channel bandwidth. Different wireless devices may be allocated different interlaces, but LBT procedures may be performed on the whole BWP and/or bandwidth of the channel. Other wireless devices may not be able to access the channel due to LBT failure on a configured BWP, for example, if one wireless device successfully an performs LBT procedure earlier and transmits/sends data on the BWP. This may prevent multiple channel access and/or multiple UL user multiplexing. Blank pattern method and/or a same UL data transmission starting point may be used to reduce UL collisions. The configured grant wireless device may be allocated to occupy the entire channel bandwidth. The same resource may be used by other wireless devices to avoid the resource waste, for example, if this wireless device has LBT failure and/or has no data to transmit/send. RRC configured starting offset set and/or wireless device-selected starting offset from the configured set may be used to alleviate the collision problem if multiple wireless devices attempt to access a same configured grant PUSCH resource.

Configured grant transmissions may involve scheduling multiple wireless devices on overlapping resources (e.g., including possibly with same DMRS sequence/resource). A wireless device indicator/ID may be included in the UCI payload to provide a robust and reliable way for base station to determine which wireless device is transmitting. Orthogonal DMRS sequences may be used to differentiate between wireless devices. Configuring multiple orthogonal DMRS sequences may result in higher DMRS overhead and may not always be feasible, for example, if supporting higher rank transmissions on configured PUSCH resources. The presence/absence of wireless device indicator/ID in the CG-UCI may be RRC configured.

It may be desirable for a base station to be able to decode UCI and detect DMRS without knowing the exact starting point (e.g., to reduce the blind detection complexity at the base station). UCI and DMRS may be sent on symbols after a last allowed starting point. Different transmission starting points may allow later wireless devices to determine whether the earlier wireless devices occupy the medium or not if the wireless devices are overloaded on a same resource. Wireless devices allocated on orthogonal resources may have the same starting point in order to not block each other during LBT procedures. Different wireless devices may pick different starting times (e.g., within the first symbol of the resource) to contend for transmission, for example, if all the frequency domain resources are allocated to a wireless device. The wireless devices may be assigned with a fixed and/or aligned starting position for UL transmission, for example, if a subset of the frequency domain resources are allocated. Different wireless devices (e.g., NR-U) may have different configured BWPs and may support both regular and interlaced waveforms. It may be possible to have contention-based transmissions among wireless devices that aren't allocated the full set of RBs. The starting point offset (time domain) may be selected randomly (e.g., in FeLAA) from a set of values configured by RRC messaging if the allocation spans the entire bandwidth, but may be a fixed value for interlace-based partial bandwidth allocation. Using various procedures herein may prevent collision between wireless devices for full bandwidth allocations. FDM across wireless devices may be allowed for partial bandwidth allocations.

A CG-UCI may include wireless device indicator/ID and/or CRC scrambled by specific RNTI to increase the robustness of UCI (e.g., in case of intra-cell collisions) and/or to identify the wireless device at the base station. The CG-UCI may be multiplexed in the CG-PUSCH the same way as HARQ-ACK UCI. The CG-UCI may be part of HARQ-ACK UCI.

CG-UCI may be mapped on a first symbol after DMRS. DMRS and CG-UCI may be transmitted/sent on symbol(s) that comprise a last allowed starting point. First symbol and last symbol may or may not be used for DMRS and/or CG-UCI. CG-UCI may be mapped using NR UCI multiplexing rules. CG-UCI may be sent before HARQ-ACK/NACK.

The configured grant retransmission timer value may be configured per configured grant configuration, and the configured grant retransmission timer may be maintained per HARQ process. Autonomous retransmission via configured grant resource may be prohibited for a HARQ process, for example, if the configured grant retransmission timer for the HARQ process is running. New retransmission via configured grant resource may be prohibited for the HARQ process, for example, if the configured grant retransmission timer is running (e.g., because the configured grant timer may also be running). The value of configured grant retransmission timer may be lower than the value of configured grant timer. The configured grant timer may not be restarted at autonomous retransmission on configured grant resource after expiration of the configured grant retransmission timer. The wireless device may not stop the configured grant timer upon NACK feedback reception, and may stop the configured grant timer upon ACK feedback reception. The configured grant timer may not be started/restarted if configured grant is not transmitted/sent due to LBT failure. The configured grant timer may not be started/restarted if UL LBT procedure fails for PUSCH transmission corresponding to a grant received via PDCCH addressed to CS-RNTI scheduling retransmission for configured grant. The configured grant timer may not be started/restarted if the UL LBT procedure fails for PUSCH transmission corresponding to an UL grant received via PDCCH addressed to C-RNTI, which indicates the same HARQ process configured for configured UL grant. Retransmissions of a TB using configured grant resources may not be allowed, for example, if initial transmission or a retransmission of the TB was previously done using dynamically scheduled resources. The wireless device may transmit/send a pending TB using same HARQ process in a configured grant resource, for example, on LBT failure at transmission on configured grant. CS-RNTI may be used for scheduled retransmission and C-RNTI may be used for new transmission.

In at least some communications (e.g., a system compatible with LTE/LTE_A, NR, and/or other systems), a base station may transmit/send DCI to a wireless device to trigger a SPS assignment for some types (e.g., voice over internet protocol (VoIP), vehicle-to-everything (V2X)) of data transmission. It may be beneficial to assign resource blocks and/or indicate transmission format (e.g., MCS, MIMO type) once for transmission of the SPS data on multiple subframes to reduce frequent DCI transmission. A wireless device may use the assigned resource blocks and/or indicated transmission format until finishing the transmission.

Figure 17:
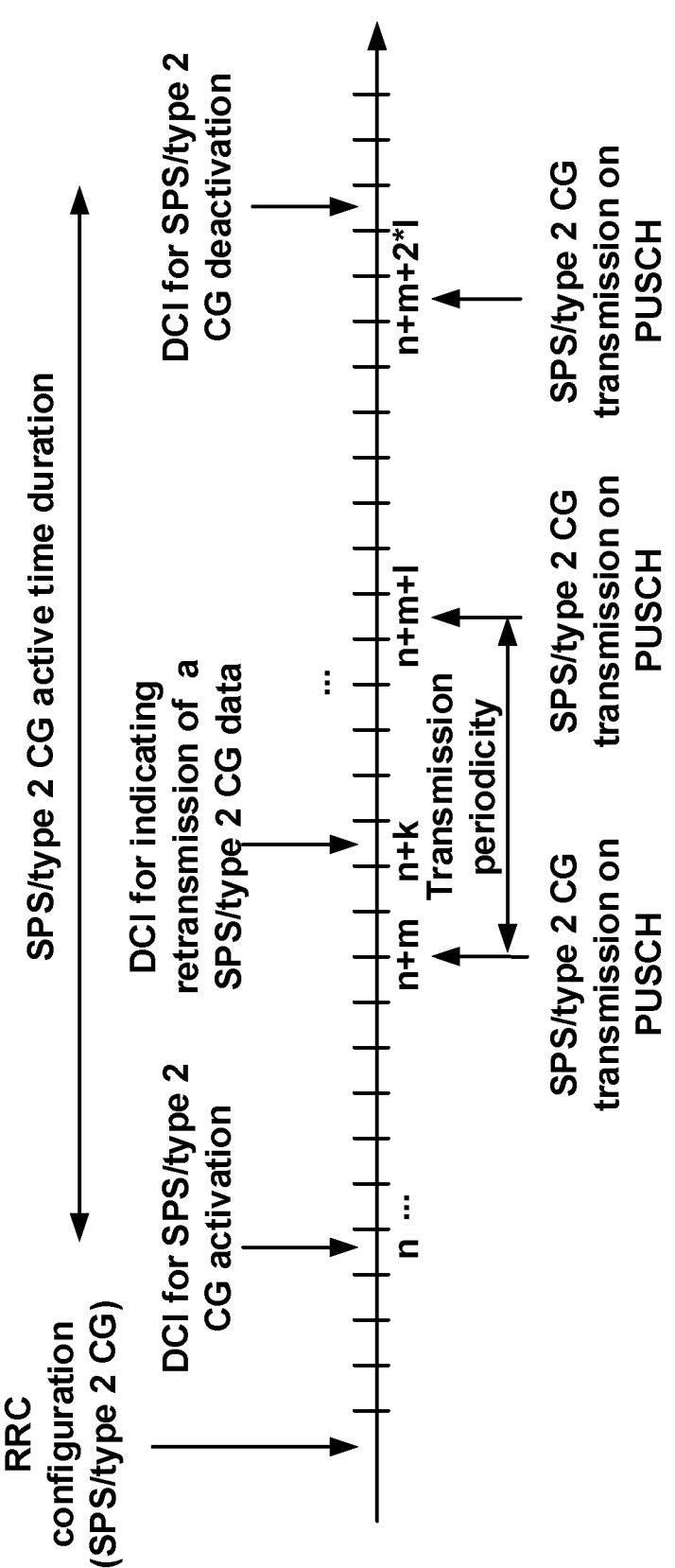
FIG. 17 shows example of scheduling of uplink transmission.

FIG. 17 shows an example frame schedule for triggering an SPS or type 2 CG DCI configuration, activation and deactivation of UL/DL configured grants. In particular, FIG. 17 shows an example configuration where a base station may trigger an SPS or type 2 grant-free (GF) activation by transmitting DCI at subframe n. The DCI may be CRC scrambled by a first RNTI, (e.g., SPS C-RNTI or CS-RNTI) different from a second RNTI for normal dynamic scheduling (e.g., C-RNTI), to differentiate from normal dynamic scheduling. A wireless device may be assigned with a first RNTI (e.g., C-RNTI) for dynamic scheduling, and a second RNTI (e.g., SPS C-RNTI/CS-RNTI) for SPS/type 2 GF transmission. A base station may transmit/send (e.g., to the wireless device) one or more DCIs, via a PDCCH, for UL data scheduling. The wireless device may determine that a PUSCH assignment indicated by a first DCI is for dynamic scheduling, for example, if the first DCI comprises CRC scrambled by a first RNTI. The wireless device may transmit/send UL data via the PUSCH in a subframe. The subframe may be indicated by the first DCI, or may be a subframe after a predefined quantity of subframes following receiving the first DCI. The wireless device may determine that a PUSCH assignment indicated by a second DCI is for SPS/type 2 GF scheduling, for example, if the second DCI comprises CRC scrambled by a second RNTI. The wireless device may transmit/send UL data via the PUSCH in multiple subframes and with a configured periodicity. As shown in FIG. 17, the wireless device may transmit/send SPS data via PUSCH indicated by an RRC configuration (e.g., SPS/ type 2 CG) or the second DCI for indicating a SPS/type 2 CG transmission via PUSCH. The wireless device may transmit/send SPS data at subframes n+m, n+m+l, n+m+2*l, where m may be an offset value and l may be a value indicating transmission periodicity.

A HARQ procedure may apply for a SPS/type 2 GF transmission, to guarantee a base station correctly receive the data. As shown in FIG. 17, a base station may transmit/ send DCI for indicating retransmission of SPS/type 2 CG data at subframe n+k. To differentiate the DCI for indicating activation/deactivation of a SPS transmission from DCI indicating a retransmission of the SPS data, the base station may transmit/send DCI indicating that a last SPS PUSCH transmission is not correctly received by setting a first field in the DCI to a first value. The first field may be a new data indicator (e.g., NDI). The base station may indicate that the last transmission is not correctly received, and request a wireless device to do a retransmission, by setting the NDI to 1 (e.g., in case of a 1-bit NDI field), and a HARQ process number to a value associated with a transmission block for retransmission. The wireless device may retransmit/resend the SPS data associated with the HARQ process number via a PUSCH indicated by the DCI, for example, if the wireless device receives the DCI indicating a retransmission. A base station may use, one or more fields of DCI and/or CRC of the DCI to indicate a SPS/type 2 GF activation/deactivation and/or retransmission of the activated SPS/type 2 GF data. The base station may set one or more fields of the DCI to indicate whether the DCI is for activation, deactivation, or retransmission of a SPS/type 2 GF data. The one or more fields of the DCI may comprise at least one of: a TPC field for PUSCH, an NDI field, a modulation and coding scheme (MCS) field, a HARQ process number field, a resource assignment (RA) field, and/or a redundancy version (RV) field. An NDI field of DCI may indicate whether there is new data. A HARQ process number may indicate/identify a HARQ process associated with the PUSCH transmission of a transmission block. An RV value may indicate the redundancy version in case of retransmission. An MCS field comprising at least a most significant bit (MSB, e.g., the first bit in the left of the MCS field) may indicate a an MCS for the PUSCH transmission.

A base station may set the NDI field to 1 indicating DCI is for retransmission of a SPS data, for example, if the DCI is CRC scrambled by a CS-RNTI (or SPS C-RNTI). The base station may set the NDI field to 0 indicating the DCI is for activation/deactivation of the SPS transmission. The base station may indicate whether the DCI is for activation or deactivation by setting one or more fields of the DCI. The base station may send DCI, corresponding to a first DCI format (e.g., DCI format 0), indicating activation of the SPS/type 2 GF UL transmission by setting the TPC field to a first value (e.g., 00 for a 2-bit TPC field) and/or the MSB bit of the MCS and RV field to a second value (e.g., 0). The base station may send DCI, corresponding to a second DCI format (e.g., DCI format 6-0A), indicating activation of the SPS/type 2 GF UL transmission by setting the TPC field to a first value (e.g., 00), the RV field to a second value (e.g., 00), and/or the HARQ process number to a third value (e.g., 000). The DCI corresponding to the first DCI format (e.g., DCI format 0) may be transmitted/sent via a first PDCCH. The DCI corresponding to the second DCI format (e.g., DCI format 6-0A) may be transmitted/sent via a second PDCCH (e.g., MPDCCH). The first PDCCH may be different from the second PDCCH, at least on transmit/send format, radio resource for the transmission. The second PDCCH may be for a machine-type communication (MTC) wireless device which may be located in a deep coverage area and may have a limited receiving capacity. The first PDCCH may be for a normal wireless device which may be in a normal coverage area, and may have normal receiving capacity. A wireless device may perform a validation of the PDCCH to determine whether received DCI is for activation, for example, if the DCI is scrambled by the SPS C-RNTI or CS-RNTI and/or if the NDI field is set to 0. The wireless device may not perform a validation of the PDCCH, for example, if the NDI field is set to 1. The wireless device may perform a retransmission according to the DCI, for example, if the NDI field is set to 1.

The wireless device may determine that the received DCI (e.g., if performing a PDCCH validation for the first DCI format (e.g., DCI format 0)) is a valid SPS activation, for example, if the TPC field indicates the first value (e.g., 00) and/or the MSB bit of the MCS and RV field indicate the second value (e.g., 0) in the received DCI. The wireless device may transmit/send SPS data according to the DCI, for example, based on the DCI being a valid SPS activation. The wireless device may determine that the received DCI (e.g., if performing a PDCCH validation for the second DCI format (e.g., DCI format 6-0A)) is a valid SPS activation, for example, if the TPC field indicates 00, the RV field indicates 00, and/or the HARQ process number is 000 in the received DCI. The wireless device may transmit/send SPS data according to the DCI, for example, based on the DCI being a valid SPS activation.

The wireless device may determine the received as an invalid SPS activation, for example, if the TPC field does not indicate 00, and/or the MSB bit of the MCS and RV field do not indicate 0 in the received DCI (e.g., corresponding to DCI format 0). The wireless device may determine the received DCI as an invalid SPS activation, for example, if the TPC field does not indicate 00, the RV field does not indicate 00', and/or the HARQ process number is not a 000 in the received DCI (e.g., corresponding to DCI format 6-0A). The wireless device may determine that the DCI has been received with a non-matching CRC, for example, based on the DCI being an invalid SPS activation. The wireless device may discard the DCI, and/or not perform actions indicated by the DCI, based on the received DCI being with a non-matching CRC.

The base station may send a PDCCH transmission with DCI (e.g., corresponding to DCI format 0) indicating deactivation of the SPS/type 2 GF UL transmission for a normal wireless device. The base station may indicate deactivation of the SPS/type 2 GF UL transmission by setting the TPC field to 00, the MCS and RV field to 11111, the cyclic shift DM RS field to 000 (if present), and/or the RA and hopping field to all 1s in the DCI. The base station may send a PDCCH transmission with DCI (e.g., corresponding to DCI format 6-0A) indicating deactivation of the SPS/type 2 GF UL transmission for an MTC wireless device. The base station may indicate deactivation of the SPS/type 2 GF UL transmission by setting the TPC field to 00, the RV field to 00, the repetition number/quantity to 00, the MCS field to 1111, the RA field to all is and/or a HARQ process number to 000 in the DCI. The wireless device may perform a validation of the PDCCH transmission to determine whether the DCI is for deactivation, for example, if the wireless device receives a DCI scrambled by the SPS C-RNTI or CS-RNTI and/or if the NDI field is set to 0. The wireless device may not perform a validation of the PDCCH transmission, for example, if the NDI field is set to 1. The wireless device may perform a retransmission according to the DCI, for example, if the NDI field is set to 1.

The wireless device may determine that the received DCI (e.g., if performing a PDCCH validation for DCI format 0) is a valid SPS deactivation, for example, if the TPC field indicates is 00, the MCS and RV field indicates 11111, the cyclic shift DM RS field indicates 000 (if present), and/or the RA and hopping field indicates all 1s, in the received DCI. The wireless device may stop transmission of the SPS data, for example, based on the DCI being a valid SPS deactivation. The wireless device may determine that the received DCI (e.g., if performing a PDCCH validation for DCI format 6-0A) is a valid SPS deactivation, for example, if the TPC field indicates 00, the RV field indicates 00, the repetition quantity is 00, the MCS field indicates 1111, the RA field is set to all 1s, and/or the HARQ process number is 000, in the received DCI. The wireless device may stop transmission of the SPS data, for example, based on the DCI being a valid SPS deactivation.

The wireless device may determine that the received DCI (e.g., corresponding to DCI format 0) is an invalid SPS deactivation, for example, if the TPC field does not indicate 00, the MCS and RV field does not indicate 11111, the cyclic shift DM RS field does not indicate 000 (if present), and/or the RA and hopping field is not set to all 1s, in the received DCI. The wireless device may determine that the received DCI is an invalid SPS activation, for example, if the TPC field does not indicate 00, the RV field does not indicate 00, the repetition quantity is not 00, the MCS field is not 1111, the RA field is not set to all 1s, and/or the HARQ process number is not 000 in the received DCI. The wireless device may determine that the DCI has been received with a non-matching CRC, for example, based on the DCI being an invalid SPS deactivation. The wireless device may skip the DCI based on the received DCI being with a non-matching CRC.

Figure 18:
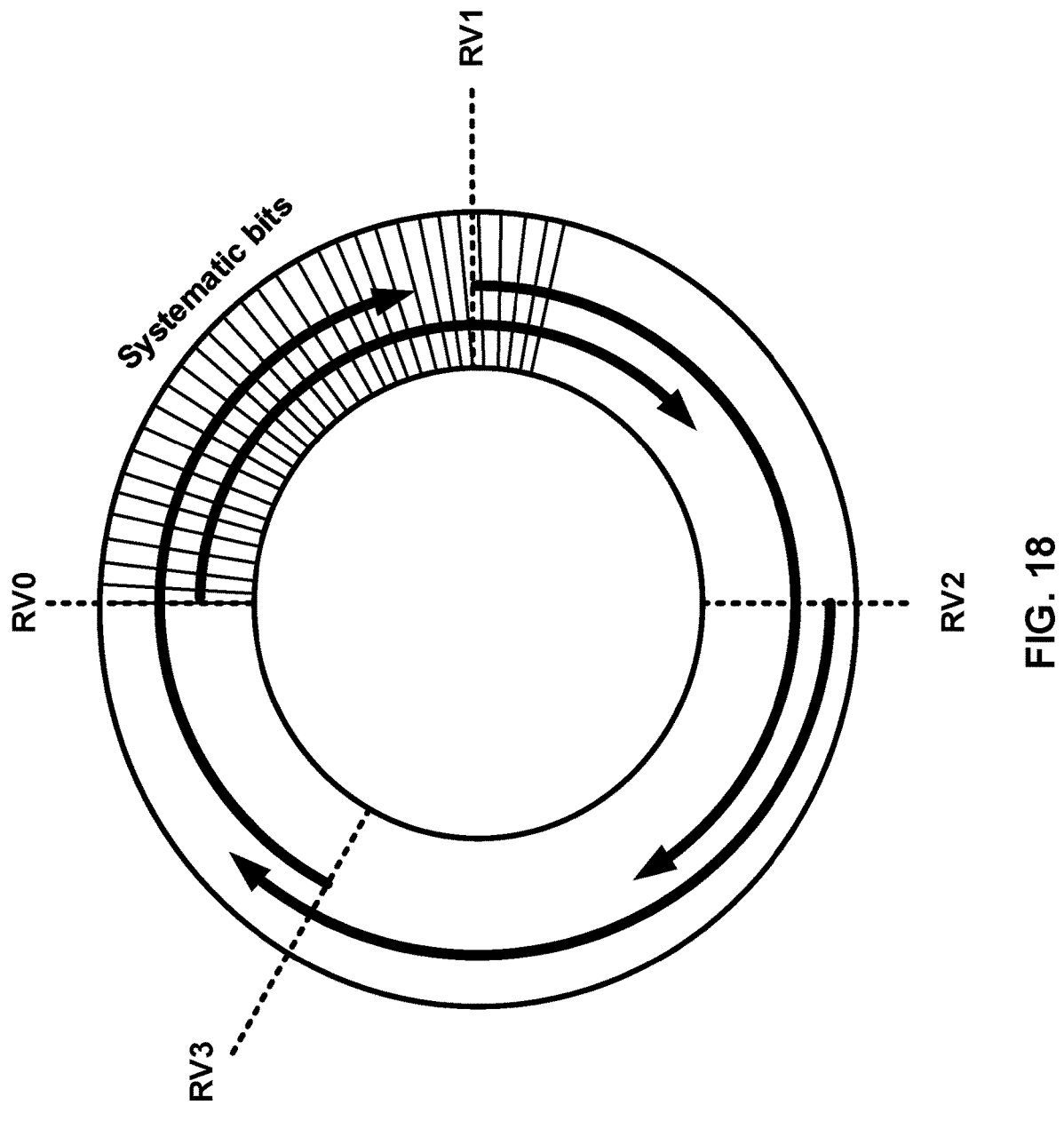
FIG. 18 shows an example of rate matching for different redundancy versions (RVs).

FIG. 18 shows an example of rate matching for different RVs. A base station may perform rate matching for each code block. FIG. 18 shows an example of how a base station may write coded bits of a TB into a circular buffer. The coded bits may start with non-punctured systematic bits and continue with parity bits. The base station may select transmit/send bits based on reading a required number of bits from the circular buffer. The exact selected bits for transmission may depend on a redundancy version (RV) (e.g., RV0, RV1, RV2 or RV3) corresponding to a different starting position in the circular buffer. The base station, by selecting different RVs, may generate different sets of coded bits representing a same set of information bits. The different starting position in the circular buffer may be defined such that both RV0 and RV3 are self-decodable and may include systematic bits under typical circumstances.

Soft combining may be an important part of hybrid-ARQ functionality. A wireless device may perform soft combining to decode a TB with retransmission via different RVs. Rate-matching functionality may comprise interleaving coded bits using a block interleaver and collecting coded bits from each code block. The coded bits from the circular buffer may be written row-by-row into a block interleaver and read out column-by-column. The quantity of rows in the interleaver may be determined by modulation order. The coded bits in one column may correspond to one modulation symbol. The systematic bits may spread across the modulation symbols which may improve system performance. Bit collection may concatenate coded bits for each code block.

A wireless device may be configured with repetition transmission (e.g., pusch-AggregationFactor or pdsch-AggregationFactor larger than 1), in which a same symbol allocation may be applied across the repetition transmission (e.g., the same symbol allocation may be applied across a quantity of consecutive slots defined by parameter pusch-AggregationFactor or pdsch-AggregationFactor). The wireless device may expect that a TB may be repeated within each symbol allocation among each of the consecutive slots.

FIG. 19A shows example RVs for transmission of uplink data. FIG. 19A shows a table for the RV identifier (e.g., $rv_{id}$) and mapping sequence indicated by DCI scheduling PDSCH for UL transmission of data. The $rv_{id}$ is applied to the $n^{th}$ transmission occasion TB. A base station may transmit/send the TB via PDSCH with a single transmission layer. The base station may apply an RV on an $n^{th}$ transmission occasion of the TB according to FIG. 19A. The $rv_{id}$ may have a value of 0, 2, 3 or 1. The base station may indicate, to the wireless device, an $rv_{id}$ via downlink control information. The wireless device may determine that the RV of the $n^{th}$ transmission occasion is 0, for example, if n modulo 4 is equal to 0 and if $rv_{id}$ is equal to 0. The wireless device may determine that the RV of the $n^{th}$ transmission occasion is 2, for example, if n modulo 4 is equal to 1 and if $rv_{id}$ is equal to 0. A same rule may be applied for other transmission occasions. For example, the wireless device may determine, for $rv_{id}$ equal to 0, that the RV of the $n^{th}$ transmission occasion is 3 if n modulo 4 is equal to 2, and may determine that the RV of the $n^{th}$ transmission occasion is 1 if n modulo 4 is equal to 3.

FIG. 19B shows an example determination of RVs of a transport block. The base station may configure the wireless device with a repetition quantity of eight slots (e.g., the configured pdsch-AggregationFactor is eight slots) or any other quantity of slots. The wireless device may determine the RVs in order of 0, 2, 3, 1, 0, 2, 3, 1 for the eight slots, for example, if the base station indicates, to the wireless device, a redundancy version indication (e.g., RV=00) via PDCCH.

SPS may be supported in the DL, where the wireless device may be configured with a periodicity of the data transmission using RRC signaling. Activation of semi-persistent scheduling may be done via a PDCCH transmission (e.g., as for dynamic scheduling), for example, with CS-RNTI. The PDCCH transmission may comprise necessary information in terms of time-frequency resources and other parameters. The hybrid-ARQ process number may be determined, for example, based on a time at which the DL data transmission starts. The wireless device may receive, based on activation of SPS transmission, DL data transmission periodically (e.g., according to an RRC-configured periodicity). The wireless device may receive the DL data transmission based on transmission parameters indicated in the PDCCH transmission activating the SPS transmission. The control signaling may be used once and the overhead may be reduced. The wireless device may continue to monitor the set of candidate PDCCHs for UL and DL scheduling commands, for example, based on (e.g., in response to or after) enabling the SPS. Continuing to monitor the set of candidate PDCCHs may be useful, for example, for occasional transmission of large amounts of data, and to handle hybrid-ARQ retransmissions which are dynamically scheduled.

Multiple schemes for UL transmission without a dynamic grant may be supported. The schemes may comprise configured grant type 1 and configured grant type 2. The schemes may differ in the manner of activation. UL grant and activation of the grant for configured grant type 1 may be provided by RRC messaging. Transmission periodicity for configured grant type 2 may be provided by RRC messaging and L1/L2 control signaling may be used to activate/deactivate the transmission in a similar manner as for DL transmission. The two schemes may reduce control signaling overhead, and the latency before UL data transmission, as no scheduling request-grant cycle is needed prior to data transmission. Configured grant type 1 may set all transmission parameters (e.g., comprising periodicity, time offset, frequency resources, and MCS of possible UL transmissions) using RRC signaling. The wireless device may start to use the configured grant for transmission at a time instant indicated by the periodicity and time offset, for example, based on receiving the RRC configuration. The time offset may be relative to a particular SFN (e.g., SFN=0). Configured grant type 2 may be similar to DL SPS. RRC signaling may be used to configure the periodicity. PDCCH activation may provide transmission parameters. The wireless device may send/transmit according to the preconfigured periodicity and based on receiving the activation command, for example, if data is present in the buffer. The wireless device may not transmit/send any messages, for example, if no data is present in the buffer (e.g., similar to configured grant type 1). Time offset may or may not be needed for configured grant type 2. The wireless device may acknowledge the activation/deactivation of configured grant type 2 by sending a MAC CE in the UL. It is possible to configure multiple wireless devices with overlapping time-frequency resources in the UL in both configured grant type 1 and configured grant type 2. The network may differentiate between transmissions from different wireless devices.

The wireless device may receive from the base station, higher layer parameters (e.g., configuredGrantConfig in BWP-UplinkDedicated information element) that semi-statically configure PUSCH resource allocation. A PUSCH transmission may correspond to a configured grant. One or more of the following parameters may be indicated (e.g., for type 1 PUSCH transmissions with a configured grant): time domain resource allocation (e.g., timeDomainAllocation) that provides a row indicator/index pointing to an allocated table (e.g., indicating a combination of start symbol and length and PUSCH mapping type), frequency domain resource allocation (e.g., frequencyDomainAllocation) for a given resource allocation type, the modulation order, target code rate and TB size (e.g., mcsAndTBS); number/quantity of DM-RS CDM groups, DM-RS ports, SRS resource indication and DM-RS sequence initialization, the antenna port value, the bit value for DM-RS sequence initialization, precoding information and number/quantity of layers, SRS resource indicator, and/or the frequency offset between two frequency hops if frequency hopping is enabled (e.g., frequencyHoppingOffset). The resource allocation for type 2 PUSCH transmissions with a configured grant may follows higher layer configuration and UL grant received on the activation DCI. The wireless device may not transmit/send anything on the resources configured by RRC (e.g., configuredGrantConfig), for example, if the higher layer did not deliver a TB to transmit/send via the resources allocated for UL transmission without grant.

A wireless device may receive, from a base station, the higher layer parameters indicating a periodicity for a configured grant. The higher layer parameters may comprise a quantity of repetitions (e.g., repK) to be applied to the transmitted/sent TB, and an RV pattern/sequence (e.g., repK-RV) to be applied to the repetitions. The RV for UL transmissions with a configured grant may be set to 0, for example, if the parameter indicating the quantity of repetition is not configured. Otherwise, for an $n^{th}$ transmission occasion among K repetitions (n=1, 2, . . . , K) the RV may correspond to a $(mod(n-1,4)+1)^{th}$ value in the configured RV sequence. The wireless device may apply an RV on an $n^{th}$ transmission occasion of the TB according to FIG. 19A. The initial transmission of a TB may start at: the first transmission occasion of the K repetitions, for example, if the configured RV sequence is {0,2,3,1}; any of the transmission occasions of the K repetitions that are associated with RV=0, for example, if the configured RV sequence is {0,3,0,3}; any of the transmission occasions of the K repetitions, for example, if the configured RV sequence is {0,0,0,0}, except the last transmission occasion where K=8. FIG. 19B shows an example where K=8 repetitions is configured with an RV sequence {0,2,3,1}.

For any RV sequence, the repetitions may be terminated, for example, after transmitting K repetitions, or at the last transmission occasion among the K repetitions within a period P, or from a starting symbol of the repetition that overlaps with a PUSCH with the same HARQ process scheduled by DCI format 0_0 or 0_1 (e.g., whichever is reached first). The wireless device may not be expected to be configured with a time duration for the transmission of K repetitions larger than a time duration derived by the periodicity P. The wireless device may repeat the TB across the repK consecutive slots (e.g., applying the same symbol allocation in each slot0) for both Type 1 and Type 2 PUSCH transmissions with a configured grant, for example, if the wireless device is configured with repK>1. The transmission on a slot may be omitted for multi-slot PUSCH transmission, for example, if the wireless device procedure for determining slot configuration determines symbols of the slot as DL symbols.

A base station may transmit/send an indication of a DCI format to schedule UL transmission (e.g., PUSCH transmission) in each of one or more TTIs for a wireless device. The wireless device may be in an unlicensed cell (e.g., LAA SCell and/or NR-U PCell). DCI format 0B may be used for scheduling PUSCH transmission in each of multiple subframes in a cell (e.g., LAA SCell). DCI format 4B may be used for scheduling PUSCH transmission with multi-antenna port transmission mode in each of multiple subframes in a cell (e.g., LAA SCell). Such DCI formats may be referred to a multi-TTI DCI format.

A TTI may be a subframe, and/or one or more slots, and/or one or more mini-slots. A slot may comprise consecutive OFDM symbols (e.g., 14 consecutive OFDM symbols, or any other quantity of OFDM symbols). A mini-slot may comprise one or more consecutive OFDM symbols and may be shorter than a slot.

A DCI corresponding to a multi-TTI DCI format may comprise one or more of the following: carrier indicator, PUSCH trigger A, timing offset (e.g., indicating absolute or relative time offset for the PUSCH transmission based on the trigger A value), a quantity of scheduled subframes (e.g., RRC signaling may configure a maximum quantity of subframes, for example, by higher layer parameter maxNumberOfSchedSubframes-Format0B-r14), resource block assignment, MCS, a HARQ process number, NDI (e.g., the NDI field may comprise up to maxNumberOfSchedSubframes-Format0B-r14 bits, each bit corresponding to a scheduled PUSCH), RV (e.g., the RV field may comprise maxNumberOfSchedSubframes-Format0B-r14 bits, each bit corresponding to a scheduled PUSCH transmission), TPC command, CSI request, SRS request, one or more partial PUSCH modes, PUSCH starting positions (e.g., applicable to first subframe/TTI), PUSCH ending symbol (e.g., applicable to last subframe/TTI), channel access type, and/or channel access priority class (CAPC), etc.

A quantity of information bits in a DCI corresponding to a multi-TTI DCI format (e.g., format 0B) may be equal to, substantially equal to, or different from a payload size of other DCI formats (e.g., format 1, 2, 2A, 2B, 2C, 2D associated with configured DL transmission mode in the same serving cell). One or more zero bits may be appended to the multi-TTI DCI format such that the wireless device may differentiate the multi-TTI DCI format based on its different length.

TTI bundling may be configured (e.g., by PUSCH configuration information element). A parameter (e.g., TTI_BUNDLE_SIZE) may provide a quantity of TTIs in a TTI bundle. A wireless device, in a TTI bundling operation, may perform multiple transmissions of a same TB based on the quantity of TTIs. TTI bundling operation may rely on the HARQ entity for invoking the same HARQ process for each transmission that is part of the same bundle. HARQ retransmissions may be non-adaptive within a bundle (e.g., HARQ retransmissions may be triggered without waiting for feedback from previous transmissions according to TTI_BUNDLE_SIZE). The HARQ feedback of a bundle may be received for a last TTI of the bundle (e.g., the TTI corresponding to TTI_BUNDLE_SIZE). A transmission in the last TTI may or may not occur (e.g., where a measurement gap occurs). A retransmission of a TTI bundle may also be a TTI bundle. TTI bundling may not be supported, for example, if a MAC entity is configured with one or more SCells with configured UL.

An SPS configuration may comprise one or more parameters (e.g., totalNumberPUSCH-SPS-STTI-UL-Repetitions and/or totalNumberPUSCH-SPS-UL-Repetitions) indicating a total quantity of UL transmissions for slot and/or subslot/mini-slot UL SPS repetitions. A wireless device may be configured with UL SPS and the configured quantity of SPS PUSCH transmissions may be greater than 1. Simultaneous transmission via PUSCH and PUCCH may not be configured. The parameter may indicate a quantity of transmission repetitions within a configured grant bundle. Bundling operation may rely on the HARQ entity for invoking the same HARQ process for each transmission that is part of the same bundle. HARQ retransmissions may be non-adaptive within a bundle (e.g., HARQ retransmissions may be triggered without waiting for feedback from previous transmissions).

A wireless device may attempt sending a PUSCH transmission at a single starting position indicated in the UL grant for the PUSCH (e.g., for multi-TTI scheduling and/or single TTI scheduling for the PUSCH). A wireless device may transmit/send repetitions of a TB across multiple TTIs. A base station may schedule (e.g., similar to slot aggregation) multiple TTIs using a single DCI/UL grant, for a single TB corresponding to a HARQ process. The wireless device may perform a successful LBT procedure and transmit/send repetitions of the single TB across the scheduled (and available) multiple TTIs. Unnecessary LBT procedures may be avoided because of successive repetitions, and reliability may be increased because of the repeated transmissions. A quantity of available TTIs may be greater than a configured/indicated quantity of repetitions. The extra TTIs may be released after transmitting the configured/indicated quantity of repetitions. More repetitions than the configured/indicated quantity of repetitions may be transmitted/sent until all available TTIs are used. The wireless device may stop transmission if the multiple (available) TTIs are exhausted, for example, based on the quantity of the multiple TTIs being less than the quantity of the configured/indicated repetitions.

A base station may schedule multiple TTIs for multiple PUSCH transmissions (e.g., also referred to as multi-TTI scheduling). Each TTI may be scheduled using a separate UL grant (e.g., via multiple DCIs) in a same PDCCH monitoring occasion. A base station may schedule multiple TTIs for multiple PUSCH transmissions using a single UL grant (e.g., via a single DCI). Multiple (e.g., different) TB s with different HARQ process indicators/IDs may be scheduled over the multiple TTIs (e.g., multiple slots/mini-slots/subslots/subframes). A first (same) TB associated with a first HARQ process indicator/ID may be scheduled over the multiple TTIs (e.g., for multiple repetitions) using a single UL grant. The wireless device may rate-match the first TB across all TTIs. The wireless device may transmit/send the first TB with one or more (e.g. different) RVs in different TTIs.

A TTI may comprise a subframe. A TTI may comprise one or more slots. A TTI may comprise one or more mini-slots/subslots. A slot may comprise consecutive OFDM symbols (e.g., 14 consecutive OFDM symbols, or any other quantity of consecutive OFDM symbols). A mini-slot/subslot may comprise one or more OFDM symbols. A slot may comprise one or more mini-slots/subslots.

The base station may schedule multiple time-contiguous PUSCH transmissions. The base station may schedule multiple non-time-contiguous PUSCH transmissions. Multi-TTI scheduling by a single DCI may schedule a plurality of consecutive TTIs. The base station may schedule, in multi-TTI scheduling, a plurality of PUSCH transmissions that are continuous in time. The base station may schedule, in multi-TTI scheduling, one or more mini-slots in an initial portion (e.g., first slot) of the multiple TTIs. Type B PUSCH mapping may be used for the one or more mini-slots in the initial portion (e.g., beginning of transmission). Flexible PUSCH starting positions may be provided within the first slot of the multi-TTI UL transmission, to overcome LBT failure effect. A single PUSCH duration may not exceed 14 OFDM symbols. Each PUSCH may be mapped to one slot and/or one mini-slots. In another example, each PUSCH may be mapped to one or more slots and/or one or more mini-slots, e.g., the one or more slots and/or the one or more mini-slots may be consecutive.

Figures 20A, 20B:
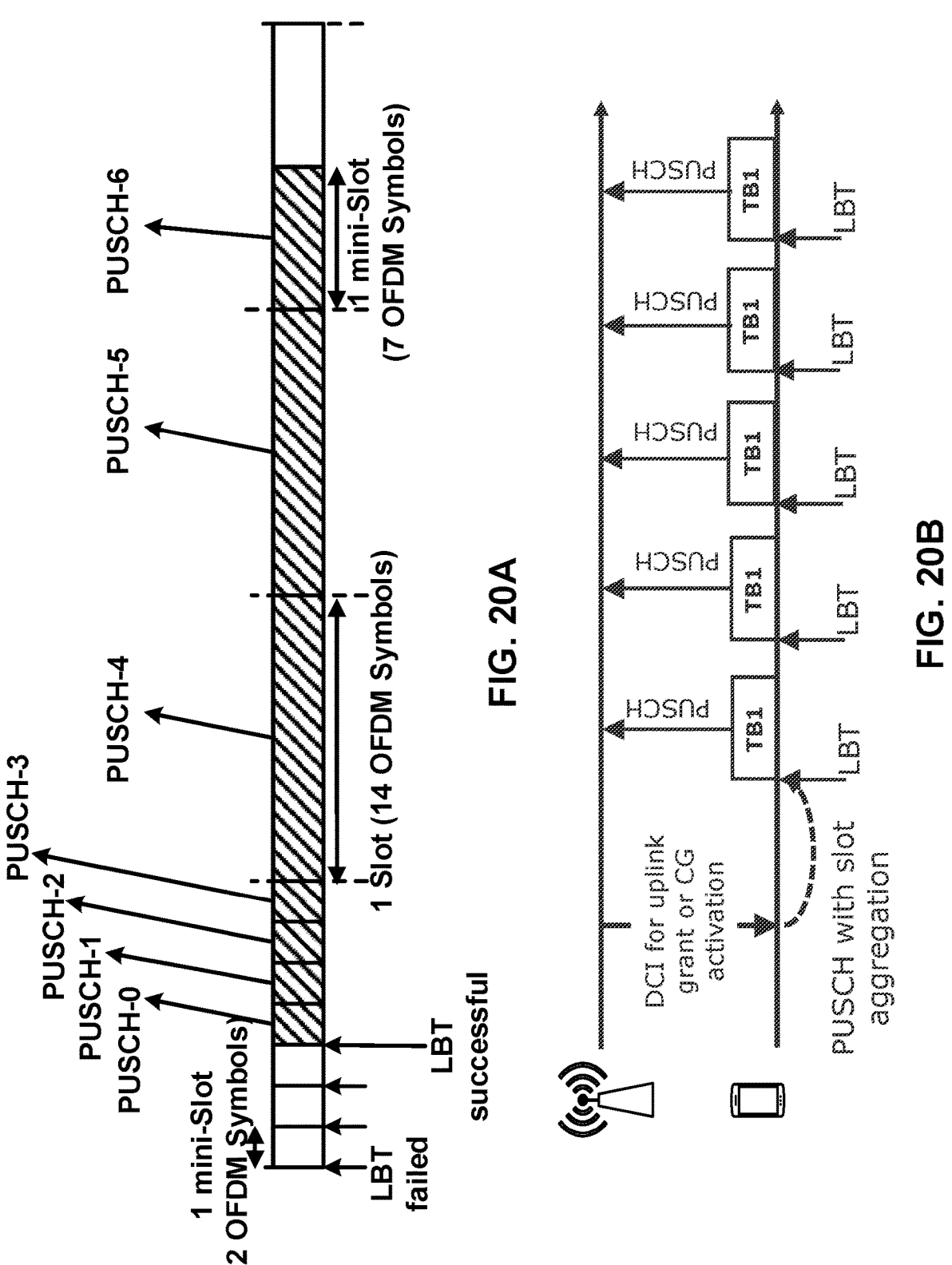
FIG. 20A shows an example of uplink scheduling.
FIG. 20B shows an example of uplink scheduling.

FIG. 20A and FIG. 20B show examples of uplink scheduling. FIG. 20A shows an example of multi-TTI PUSCH scheduling. FIG. 20B shows an example of PUSCH scheduling with slot aggregation. DCI may comprise an uplink grant and/or configured grant activation. DCI may be used to schedule PUSCH transmissions. Multi-TTI scheduling may allow scheduling the following sequence of TTIs: one or more consecutive mini-slots in a first part (e.g., not spanning over one entire slot and/or not ending at a slot boundary); one or more consecutive full slots in a second part; and/or one or more consecutive mini-slots in a third (last) part (e.g., if any, not spanning over one entire slot). In FIG. 20A, for example, seven consecutive mini-slot PUSCHs each with a length 2 symbols (e.g., 2 OFDM symbols) may be scheduled in the first slot, followed by two full-slot PUSCHs each with a length 14 symbols (e.g., 14 OFDM symbols), followed by a mini-slot PUSCH with a length 7 symbols (e.g., 7 OFDM symbols) in the last slot. The multiple mini-slot PUSCHs scheduled in the first slot provide multiple opportunities for LBT procedures. The multiple continuous PUSCHs may result in avoiding extra LBT procedures in between PUSCH transmissions.

The base station may use a first DCI format for multi-TTI scheduling and/or a second DCI format for single-TTI scheduling. The base station may use a third DCI format for multi-TTI and single-TTI scheduling, for example, allowing dynamic switching between single-TTI and multi-TTI scheduling. An UL fallback DCI may not be used for multi-TTI scheduling.

The base station may schedule discontinuous HARQ indicators/IDs for scheduling multiple TBs with different HARQ process indicators/IDs in multiple TTIs. The base station may indicate, in the multi-TTI scheduling DCI, a HARQ process indicator/ID to be applied to the first scheduled PUSCH (e.g., for the first TTI). The HARQ process indicator/ID may be incremented by 1 for subsequent PUSCHs in the scheduled order. Modulo operation may be used if a quantity of scheduled PUSCHs are greater than the available/configured quantity of HARQ indicators/IDs.

The base station may indicate, via a multi-TTI PUSCH scheduling DCI, one or more of: NDI field (e.g., with 1 NDI bit per PUSCH, RV field (e.g., with one or more RV bits per PUSCH, CBGTI field (e.g., per retransmitted PUSCH and/or per PUSCH and/or for a quantity of PUSCHs), HARQ process indicator/ID of a first PUSCH, time domain resource assignment (TDRA) field, CSI request field (e.g., for a single PUSCH, MCS field, LBT (channel access) type, channel access priority class (CAPC), etc.

The multi-TTI PUSCH scheduling DCI (multi-TTI DCI) may comprise a TDRA field, indicating an entry/row of a pre-defined TDRA table. The TDRA table may be extended such that each TDRA entry/row may indicate multiple PUSCHs. The multiple PUSCHs may be continuous in time domain. The TDRA entry/row may indicate a quantity of scheduled PUSCHs. The TDRA entry/row may indicate one or more starting symbols (S) and/or one or more symbol lengths (L) for the multiple TTIs. Each PUSCH may have a separate start and length indicator value (SLIV) and/or a mapping type (e.g., PUSCH mapping type A, PUSCH mapping type B). The quantity of scheduled PUSCHs may be signaled by a quantity of indicated valid SLIVs in the TDRA entry/row of the TDRA table. A first SLIV may be indicated by the TDRA entry/row for the starting slot (e.g., one or more mini-slots of the first part). A second SLIV may be indicated by the TDRA entry/row for the ending slot (e.g., one or more mini-slots of the last/third part). The slots between the first slot and the last slot may have a SLIV of S=0 and L=14 (e.g., spanning over one entire slot). A first mapping type may be indicated by the TDRA entry/row for the starting slot (e.g., one or more mini-slots of the first part). A second mapping type may be indicated by the TDRA entry/row for the ending slot (e.g., one or more mini-slots of the last/third part). A third mapping type may be indicated by the TDRA entry/row for the one or more slots in between. The TDRA entry/row may comprise a parameter indicating the quantity of scheduled PUSCHs. The scheduled PUSCHs may be contiguous and/or non-contiguous.

The multi-TTI DCI may comprise an MCS field indicating one or more MCS indicators/indexes (e.g. entry/row of an MCS table). A single MCS index may be signaled for the multiple scheduled PUSCHs. The wireless device may apply the same behavior for a first PUSCH scheduled for initial transmission and a second PUSCH scheduled for retransmission. The behavior may be: determining a TB size based on explicitly indicated MCS (e.g., for MCS row 0-27); and/or referring to the DCI scheduling the initial PUSCH transmission to determine the TB size (e.g., for MCS row 28-31). A single MCS (e.g., row 0-27) may be indicated in the multi-TTI DCI. The wireless device may apply different behaviors for a first PUSCH scheduled for initial transmission and a second PUSCH scheduled for retransmission. The wireless device may determine the TB size based on the indicated MCS for example, for the first PUSCH scheduled for initial transmission. The wireless device may refer to the DCI scheduling the initial PUSCH transmission to determine the TB size, for example, for the second PUSCH scheduled for retransmission. The wireless device may not expect to receive signaling of an MCS row 28-31 in a multi-TTI DCI. The MCS field of the multi-TTI DCI may comprise a bitmap. The wireless device may use the bitmap to determine one or more first PUSCHs to use the indicated MCS row, and one or more second PUSCHs to use an MCS row indicated by the previous DCI scheduling the same TB.

A base station may configure a wireless device with one or more active configured grants (CGs) within a BWP. The base station may configure one or more first CGs with mini-slot transmission duration and/or one or more CGs with slot transmission duration. The base station may configure each CG separately. The base station may configure one or more CGs in a same configuration (e.g., a CG group configuration). The CGs in a CG group may have shared parameters (e.g., CG timer and CG retransmission timer, periodicity, MCS table, HARQ process numbers, RB assignment, repetition (repK), RV pattern, etc.). The CGs in a CG group may have different time domain offsets. The wireless device may switch between the active CGs, for example, if the active CGs support the same HARQ process numbers and/or logical channels, and/or if the active CGs belong to the same CG group. The wireless device may initiate a COT using one or more mini-slot-based CGs depending on an LBT procedure outcome (e.g., providing multiple opportunities in time domain for a flexible starting point). The wireless device may switch to slot-based CG, for example, after initiating a COT with mini-slot-based CG. A DMRS and/or UCI overhead may be reduced. CG configuration may be associated with one subband advantageously providing multiple opportunities in frequency domain. Each CG may be configured for a service (e.g., supporting a logical channel).

A wireless device may start transmission by accessing a transmission opportunity, as provided by a configured grant, at one or more configured/indicated starting positions. The base station may indicate a quantity of allocated slots following a time instance corresponding to an indicated time offset for a configured grant resource allocation. The base station may configure multiple PUSCHs within a slot. The wireless device may transmit/send a CG transmission burst from a first symbol (e.g., S) in the first indicated slot to a second symbol (e.g., S+L) in the last indicated slot. The base station may schedule the allocated slots without any gap between them. At least one PUSCH may have a length that is different from the length of other PUSCHs within a slot for a given configuration.

A wireless device may select a HARQ process indicator/ID for transmitting/sending a TB using a CG resource. The wireless device may select the HARQ process indicator/ID autonomously. The wireless device may prioritize ongoing retransmissions on pending HARQ processes for selection. The wireless device may have two HARQ processes associated with a CG. A first HARQ process may be pending (e.g., a TB may be waiting in the HARQ buffer for retransmission). A second HARQ process may be idle (e.g., no TB is waiting in the HARQ buffer for retransmission). The wireless device may select the first HARQ process for transmission via the CG. The wireless device may prioritize older retransmissions (e.g., with CG timer closer to expiration).

A wireless device may perform an LBT procedure to transmit/send a TB corresponding to a HARQ process using a first CG resource. The LBT procedure may fail. The wireless device may transmit/send the pending TB corresponding to the same HARQ process using a second CG resource.

A base station may configure a wireless device with CG comprising one or more repetitions (e.g., configured via parameter repK). The wireless device may be configured with CG with repK>1. The wireless device may repeat a TB across consecutive transmissions corresponding to the same CG configuration. The wireless device may apply the same symbol allocation in each slot for the consecutive transmissions. The wireless device may repeat the TB in consecutive transmission occasion candidates. The consecutive transmission occasion candidates may be contiguous in time. One or more of the consecutive transmission occasions may have different symbol allocations and/or may occur in same slot.

The base station may configure multiple PUSCH configurations within a slot allocated to a CG. TDRA in CG may repeat over multiple slots allocated to the CG (e.g., CG-slots, following a time instance corresponding to an indicated time offset). Same symbol allocation and PUSCH mapping type may be used across the CG-slots. An SLIV indicated for a CG may be interpreted differently for one or more of the CG-slots. S may indicate a starting symbol of a first PUSCH in the first CG-slot, and/or L-symbol PUSCHs may be mapped continuously until the end of the slot. S=0 and length of L may be applied to the last CG-slot. S=0 and L-symbol PUSCHs may be mapped continuously until the end of the slot (e.g., L=2 or L=7 or L=14) for the remaining CG slots in between. The base station may signal a bitmap to indicate one or more allowed starting positions within a slot. Ending position may be end of slot/symbol before a subsequent starting position.

A wireless device may transmit/send a CG-UCI with every CG transmission in unlicensed bands. The CG-UCI may comprise information associated with a TB that is transmitted/sent via the CG. The CG-UCI may comprise the HARQ indicator/ID, RV, and/or NDI. The TB information may be independent of time domain resources. The repetitions may or may not be on back to back slots for a CG configured with repetitions (e.g., repK>1). The wireless device may select a first CG to transmit/send a first repetition of the TB. The wireless device may select a second CG to transmit/send a second repetition of the TB. The first CG and the second CG may or may not comprise continuous/consecutive time domain resources. The wireless device may transmit/send first/initial repetitions configured for multiple HARQ indicators/IDs in consecutive CGs, and then, transmit/send second repetitions configured for the multiple HARQ indicators/IDs in the next consecutive CGs (e.g., cycling over HARQ indicators/IDs). The wireless device may transmit/send all repK repetitions configured for a first HARQ indicator/ID in consecutive CGs, and then, transmit/send the repK repetitions configured for a second HARQ indicator/ID in the next consecutive CGs. The wireless device may retransmit/resend a TB without receiving DFI, and/or without waiting for CG retransmission timer expiry. DFI overhead may be reduced, for example, because the wireless device may retransmit/resend UL transmission that the base station was not able to decode without the wireless device receiving DFI.

Multiple time domain opportunities may be provided for a transmission. Multiple time domain opportunities may be used for various transmission, such as transmission in an unlicensed frequency band. For example, it may be beneficial for a network to provide multiple time domain opportunities to a wireless device for starting an UL transmission (e.g., by configuring/indicating multiple starting points in a slot), such as shown in FIG. 20B for transmitting TB1 after each successful LBT procedure. The wireless device may perform one or more LBT procedures at one or more of the starting points. A wireless device may start a COT and/or may start UL transmission, for example, if an LBT procedure is successful. Multiple continuous UL grants may be provided to a wireless device. For example, it may be beneficial for a network to allocate multiple continuous UL grants to the wireless device for multiple TB transmissions without a gap in time domain, such that the wireless device may be able to maintain the COT and/or reduce a number/quantity of LBT procedures. The base station may allocate to the wireless device such transmission opportunities using dynamic multi-TTI scheduling and/or semi-static CG configuration. Transmission opportunities may comprise multiple PUSCHs and/or multiple starting points (e.g., as described with respect to FIG. 20A).

A base station may transmit/send multi-TTI DCI to a wireless device to schedule multiple PUSCH transmissions. The base station may configure a CG for the wireless device to schedule multiple PUSCH transmissions. The multiple PUSCH transmissions may be continuous. The wireless device may use the multiple PUSCH transmissions for transmitting a single/same TB with repetitions and/or multiple/different TB s with and/or without repetitions.

In at least some wireless communications, a wireless device may send/transmit more than one TB (e.g., more than one PUSCH transmission of a TB) via a plurality of time durations (e.g., TTIs, slots, and/or any other time duration), such as via a slot aggregation. Repetition of TB(s) (e.g., slot aggregation) may use a same set of OFDM symbols in each TTI (and/or other time duration) over the plurality of TTIs (and/or other time durations). There may be gaps between two adjacent TTIs, for example, unless all OFDM symbols of a TTI (e.g., 14 OFDM symbols) are allocated for the slot aggregation. Such gaps may lead to frequent LBT procedures (e.g., in unlicensed spectrum, such as described with respect to FIG. 20B) and/or may lead to LBT failures and/or degrade repetition performance. Multi-TTI scheduling may be supported such that a base station may send/transmit DCI comprising contiguous resource assignments over a plurality of TTIs (e.g., slots and/or any other time duration). The wireless device may send/transmit a plurality of TBs over the scheduled plurality of TTIs. A wireless device may send/transmit a first TB in a first TTI (of the plurality of TTIs) and a second TB in a second TTI (of the plurality of TTIs).

A wireless device may support (e.g., may be required to simultaneously support) multiple applications that may have different requirements (e.g., different transmission-receiver requirements). For example, at least some applications may require high data rate, such as applications using enhanced mobile broadband (eMBB) which may require up to 20 Gbps in the DL and 10 Gbps in the UL, or any other high data rate in the DL and/or UL. At least some applications may require low latency and/or high reliability, such as ultra reliable low-latency communications (URLLC) which may require/demand fail-safe, real-time communications (e.g., such as in intelligent transportation systems, autonomous vehicles, and/or any other high reliability and/or low latency service). A wireless device may be unable to support different types of service (e.g., eMBB, URLLC, and/or any other service type) that may require contiguous repetitions (e.g., of the same transport block or different transport blocks) of various frequencies (e.g., such as unlicensed frequency bands), for example, due to scheduling requirements. For example, time gaps required for non-contiguous transmission may require multiple LBT procedures, which may lead to delay of data transmission. While contiguous repetition (e.g., PUSCH repetition type B) may avoid at least some delay of data transmission such as time gaps, contiguous repetition may require additional signaling overhead for scheduling repetitions (e.g., of the same transport block or different transport blocks).

As described herein, enhanced scheduling of uplink transmission may be provided for various types of wireless communications. DCI may be used for scheduling contiguous repetitions of the same TB or of different TBs. The DCI may comprise a multiple transmission time interval (multi-TTI) DCI format. The DCI may indicate whether scheduling information (e.g., contiguous scheduled PUSCH transmission, PUCCH transmission, and/or any other transmission) is for transmission of multiple (e.g., separate/different) TBs or for transmission of repetition of the same TB. The DCI may indicate one of a plurality of modes (e.g., single-TB repetition mode or multi-TB repetition mode). The mode indication may be based on at least one of: one or more fields of the DCI, and/or one or more radio network temporary identifiers (RNTIs). For example, the DCI may comprise at least one field indicating the mode (e.g., single-TB repetition or multi-TB repetition). Additionally or alternatively, the DCI may indicate the mode (e.g., single-TB repetition or multi-TB repetition) by scrambling the DCI using a first RNTI (e.g., indicating a first mode, single-TB repetition, etc.) or by scrambling the DCI using a second RNTI (e.g., indicating a second mode, multi-TB repetition, etc.). The first RNTI and/or the second RNTI may comprise at least one of a cell-RNTI (C-RNTI) or a configured scheduling RNTI (CS-RNTI). A first mode (e.g., single-TB repetition)

may be associated with a first type of service (e.g., URLLC and/or any other type of service, such as a high reliability and/or low latency service). A second mode (e.g., multi-TB repetition) may be associated with a second type of service (e.g., eMBB and/or any other type of service, such as a high data rate service). Enhanced scheduling described herein may provide scheduling transmissions for various types of wireless communications with various advantages such as reduced signaling overhead (e.g., using a DCI format that does not require additional overhead and/or using RNTI scrambling) and reduced transmission delay (e.g., reducing requirements for time gaps and/or multiple LBT procedures such as in unlicensed frequency bands).

A wireless device operating in unlicensed spectrum may simultaneously support various applications, services, and/or use cases (e.g., eMBB, URLLC, and/or any other types of applications and services). A base station (may provide DCI for an UL grant. A DCI (e.g., multi-TTI DCI) may schedule a continuous PUSCH transmission for different TBs, but a single LBT procedure may be required prior to executing the initial PUSCH transmission. The DCI may reflect scheduling for a configured grant or dynamic grant that involves repetition of the same TB(s). Transmission of each repeated TB may require a separate LBT procedure prior to the transmission of each TB. The multiple LBT procedures may be required because the TBs may result from slot aggregation and the repetitions account for possible discontinuous transmission with each TB requiring a separate LBT procedure. It may be beneficial (e.g., for eMBB services) to schedule a wireless device with a multi-TTI scheduling such that only a single LBT procedure is required prior to transmitting/sending multiple TBs in continuous PUSCHs. At the same time, it may be beneficial to schedule the wireless device with a repetition over a plurality of TTIs (e.g., for URLLC services). Using a first DCI format for the multi-TTI scheduling and a second DCI format for the repetition may increase wireless device complexity and/or power consumption due to blind detection. In general, communication systems may not be designed to handle transmission of repeated TBs in the unlicensed spectrum (e.g., for URLLC services) without introducing significant latencies. A framework utilizing a common configuration that enables a communication system to schedule PUSCH transmissions for multi-TTIs having different TBs and repetitions may be required to use the same resources in high data rate transmissions. Enhancements to enable sharing of a same DCI format (e.g., with a same DCI payload size) between the multi-TTI scheduling and the repetition scheduling may be necessary. Additionally, enhancements on the repetition scheduling from existing slot aggregation mechanism may be needed for operation in unlicensed bands.

A wireless device and a base station may use a DCI format. The DCI format may be shared for a multi-TTI scheduling (e.g., multiple-TB transmission mode) and a repetition scheduling (e.g., same-TB repetition mode). The multi-TTI scheduling may comprise that the wireless device is requested to transmit/send a first TB in a first TTI of a plurality of TTIs and a second TB in a second TTI of the plurality of TTIs. The repetition scheduling may comprise that the wireless device is requested to transmit/send a TB repeatedly over the plurality of TTIs. The wireless device may determine a first transmission mode (e.g., multi-TTI scheduling/multiple-TB transmission mode) or a second transmission mode (e.g., repetition scheduling/same-TB repetition mode) based on one or more DCI fields of the DCI and/or based on RNTI(s) used in the DCI. The one or more DCI fields may indicate the first transmission mode or the second transmission mode (e.g., 1-bit indication to indicate a mode). The wireless device may determine the second transmission mode based on the one or more DCI fields indicating a set of predefined values (e.g., NDI bits= [*1 . . . 1] and/or RV bits=[*1 . . . 1] where * represents a wild-card) One or more of NDI bits may be indicated with a predefined value (e.g., 1 . . . 1) and/or one or more of RV bits may be indicated with a predefined value (e.g., 1 . . . 1), and/or a combination thereof. The wireless device may determine the first transmission mode based on receiving the DCI scrambled with a C-RNTI (wherein C-RNTI may be used for a dynamic scheduling resource). The wireless device may determine the second transmission mode based on receiving the DCI scrambled with a CS-RNTI (wherein CS-RNTI may be used for a configured grant resource).

The wireless device may send a plurality of PUSCH transmissions based on determining the first transmission mode or the second transmission mode. Sharing the DCI format for both scheduling options may reduce wireless device complexity and power consumption and may provide scheduling flexibility for various applications.

A base station may transmit/send, to a wireless device, one or more RRC messages. The one or more RRC messages may comprise parameters that configure one or more PUSCHs and/or one or more CGs. The base station may configure wireless device-specific PUSCH parameters that are applicable to a BWP. The parameters may comprise one or more of: PUSCH power control parameter, resource allocation type, PUSCH aggregation factor, MCS table, etc. The wireless device may monitor one or more DL control channels (e.g., PDCCHs) to receive an UL grant. The base station may transmit/send, to the wireless device via the one or more PDCCHs, DCI. The DCI may be scrambled by a first (wireless device-specific) RNTI (e.g., C-RNTI or CS-RNTI). The DCI may schedule one or more UL grants for the wireless device. The DCI may correspond to a first DCI format with a first DCI payload size. The DCI may correspond to a multi-TTI DCI format.

The multi-TTI DCI may indicate an UL grant for the wireless device. The UL grant may schedule multiple continuous PUSCH transmissions over multiple TTIs (e.g., slots and/or mini-slots). The UL grant may indicate one or more PUSCHs in a TTI of the multiple TTIs. The multiple continuous PUSCH transmissions may have same duration and/or different durations. FIG. 20A shows an example of multiple continuous PUSCH transmissions over multiple TTIs. As shown in FIG. 20A, six continuous PUSCH transmissions may be sent across four consecutive slots. The first four PUSCH transmissions (e.g., PUSCH-0, PUSCH-1, PUSCH-2, PUSCH-3) are in the first slot, and are each of a mini-slot duration (two symbols each). The UL grant may schedule seven mini-slot PUSCHs (e.g., of 2-symbol length in the first slot). The wireless device may perform LBT procedures at the starting positions of each mini-slot PUSCH. LBT procedures may fail for the first three mini-slot PUSCHs, and may succeed for the fourth mini-slot PUSCH, increasing a likelihood of the wireless device grabbing the channel and initiating a COT during the first scheduled slot. Two full-slot (e.g., 14 OFDM symbols in length) PUSCHs follow the first slot (e.g., with PUSCH transmissions PUSCH-4 and PUSCH-5). A mini-slot PUSCH of 7-symbol length (e.g., with PUSCH transmission PUSCH-6) may be scheduled in the last (fourth) slot.

The multi-TTI DCI may indicate a transmission mode. The transmission mode may be indicated by a scheduling type, a TB count, and/or a multi-TTI mode. The transmission mode may indicate a repetition mode (e.g., single-TB repetition mode). In the repetition mode, the wireless device may transmit/send a same TB repeatedly across the multiple continuous PUSCHs scheduled by the multi-TTI DCI. The multi-TTI DCI may indicate a TB count of one. The wireless device may transmit/send a same TB repeatedly across the multiple continuous PUSCHs scheduled by the multi-TTI DCI, for example, based on the multi-TTI DCI indicating a TB count of one. The transmission mode may indicate a multi-TB transmission mode (e.g., two or more TBs). In the multi-TB transmission mode, the wireless device may transmit/send two or more (different) TBs across the multiple continuous PUSCHs scheduled by the multi-TTI DCI, for example, based on the multi-TTI DCI indicating a multi-TB transmission mode (e.g., two or more TBs). The multi-TTI DCI may indicate a TB count of four. The wireless device transmits/sends four different TBs across the multiple continuous PUSCHs scheduled by the multi-TTI DCI, for example, based on the multi-TTI DCI indicating a TB count of four.

The base station may send DCI corresponding to a multi-TTI DCI format for scheduling PUSCH transmissions with a multi-antenna port transmission mode (e.g., MIMO). The PUSCH transmissions may be scheduled in one or more (e.g., each) of the multiple TTIs. A TTI may be scheduled with a PUSCH transmission in a time domain and/or two or more TBs in spatial domain. The wireless device may transmit/send two different TB s using two antenna ports/ layers via the same PUSCH transmission/resource. The wireless device may transmit/send the same TB twice using two antenna ports/layers via the same PUSCH/resource. This spatial domain TB count and/or repetition may be different from the time domain TB count and repetition. A TB count and/or repetition may apply to a time domain. A single-TB repetition may refer to repeatedly transmitting/ sending one TB in a time domain via multiple PUSCH transmissions/resources. The single-TB repetition may comprise spatial domain multiplexing of two or more TBs via multiple antenna ports. The multi-TB transmission mode may comprise spatial domain multiplexing of the same TB via multiple antenna ports.

At least some of multiple continuous PUSCH transmissions/resources scheduled by a multi-TTI DCI may be greater than a configured number/quantity of repetitions (e.g., repK, and/or PUSCH-AggregationFactor), for example, in a same-TB repetition mode. The wireless device may skip/release/ignore the extra PUSCH transmissions/ resources scheduled by a multi-TTI DCI, for example, based on sending/transmitting the same-TB repeatedly with the configured number/quantity of repetitions. The wireless device may continue transmitting/sending the same-TB repeatedly, for example, at least until the multiple PUSCHs scheduled by the multi-TTI DCI are exhausted. For example, the wireless device may transmit/send the extra repetitions with a first RV (e.g., RV=0). For example, the wireless device may transmit/send the extra repetitions by continuing the RVs according to the RV pattern.

At least some multiple continuous PUSCH transmissions/ resources scheduled by the multi-TTI DCI may be smaller than a configured number/quantity of repetitions (e.g., repK, and/or PUSCH-AggregationFactor), for example, in a same-TB repetition mode. A number/quantity of available continuous PUSCH transmissions/resources scheduled by the multi-TTI DCI may be smaller than the configured number/ quantity of repetitions, for example, due to one or more LBT failures. A wireless device may miss one or more of the multiple continuous PUSCH transmissions scheduled by the multi-TTI DCI, for example, due to one or more LBT failures. The wireless device may skip/release/ignore the multiple continuous PUSCH transmissions scheduled by the multi-TTI DCI, for example, if the number/quantity of available continuous PUSCHs is not sufficiently high (e.g., greater than a threshold). The wireless device may transmit/send the same-TB with one or more repetitions based on (e.g., according to) the number/quantity of available continuous PUSCH transmisisons/resources.

At least some multiple continuous PUSCH transmissions/resources scheduled by the multi-TTI DCI may be greater than a number/quantity of scheduled/available/pending TBs, for example, in a multi-TB transmission mode. The wireless device may skip/release/ignore the extra PUSCH transmissions/resources scheduled by the multi-TTI DCI, for example, based on transmitting/sending the scheduled/available/pending TBs. The wireless device may continue sending/transmitting a first TB scheduled in a first TTI in the second TTI, for example, if a second TB scheduled in a second TTI is not available and/or if the first TTI and the second TTIs are consecutive ordered TTIs. The wireless device may continue sending/transmitting a first TB in one or more consecutive TTIs, for example, at least until a next TB scheduled in a third TTI is available and/or at least until the multiple PUSCH transmissions/resources scheduled by the multi-TTI DCI are exhausted.

At least some multiple continuous PUSCH transmissions/resources scheduled by the multi-TTI DCI may be smaller than a number/quantity of scheduled/available/pending TBs, for example, in a multi-TB transmission mode. A number/quantity of available continuous PUSCH transmissions/resources scheduled by the multi-TTI DCI may be smaller than the number/quantity of scheduled/available/pending TBs, for example, due to one or more LBT failures. The wireless device may miss one or more of the multiple continuous PUSCH transmissions/resources scheduled by the multi-TTI DCI, for example, due to one or more LBT failures. The wireless device may skip/release/ignore the multiple continuous PUSCH transmissions/resources scheduled by the multi-TTI DCI, for example, if the number/quantity of available continuous PUSCHs is not sufficiently high (e.g., greater than a threshold). The wireless device may transmit/send one or more TBs of the multiple TBs in one or more TTIs of the multiple TTIs base on (e.g., according to) the number/quantity of available continuous PUSCH transmissions/resources.

A base station may send/transmit a multi-TTI DCI to dynamically schedule UL (re)transmissions across multiple TTIs for a wireless device. For example, the wireless device may receive the multi-TTI DCI with CRC scrambled by C-RNTI, comprising one or more information fields. The DCI may indicate multiple continuous PUSCHs over multiple TTIs. A first PUSCH transmission may be scheduled in a first TTI and a second PUSCH transmission may be scheduled in a second TTI. Information fields may comprise a HARQ process number indicating the HARQ process associated with the TB transmission in the first PUSCH transmission. The wireless device may determine the HARQ processes of the subsequent PUSCH transmissions scheduled by the multi-TTI DCI, for example, by sequentially incrementing the indicated HARQ process number. Each HARQ process may support one TB. A HARQ process may support a plurality of TBs.

The multi-TTI DCI may comprise a transmission mode field. The transmission mode field may comprise one bit (or any other quantity of bits) indicating whether the transmission mode is a multi-TTI scheduling (e.g., multi-TB transmission mode) or a repetition scheduling (e.g., a same-TB repetition mode). The wireless device may determine that the multi-TTI DCI is for a repetition scheduling, for example, based on the transmission mode field indicating a first value (e.g., a first transmission mode, repetition scheduling, same-TB repetition mode). The wireless device may determine that the multi-TTI DCI is for a multi-TTI scheduling, for example based on the transmission mode field indicating a second value (e.g., a second transmission mode, multi-TTI scheduling, multi-TB transmission mode). The transmission mode field may indicate a transmission mode among any quantity of different transmission modes (e.g., two, three, four, or any other quantity of transmission modes). A transmission mode, of a plurality of different transmission modes, may be associated with a particular type of service (e.g., URLLC, eMBB, and/or any other service such as a service associated with a high data rate, low latency, high reliability, and/or any other characteristic/requirement).

The wireless device may determine a plurality of TBs, for example, based on determining a multi-TB transmission mode. Each of the plurality of TBs may be associated with each of the determined HARQ processes. The wireless device may map each of the plurality of TBs to each of the multiple continuous PUSCH transmissions/resources scheduled by the multi-TTI DCI. The wireless device may map a first TB associated with the first HARQ process number to the first PUSCH transmission scheduled in the first TTI (and/or any other resource/time duration). The wireless device may map a second TB associated with the second HARQ process number to the second PUSCH transmission scheduled in the second TTI (and/or any other resource/time duration).

Figures 21A, 21B, 21C:
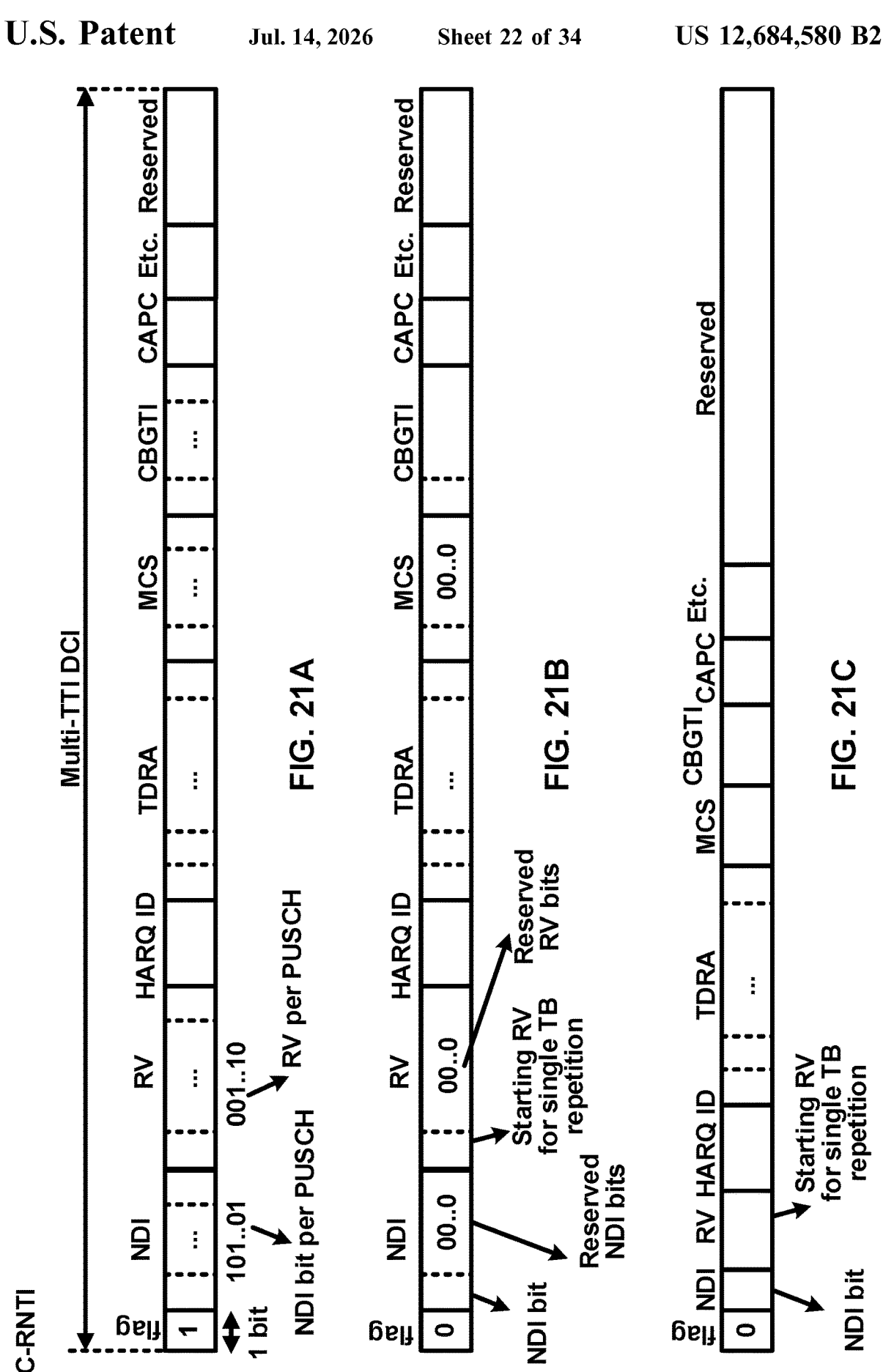
FIG. 21A shows an example of multiple transmission time interval (multi-TTI) downlink control information (DCI) fields.
FIG. 21B shows an example of a multi-TTI DCI for a same-transport block (TB) repetition mode.
FIG. 21C shows an example of a multi-TTI DCI for a same-TB repetition mode.

FIG. 21A shows an example of a multi-TTI DCI for a same-TB repetition mode. The multi-TTI DCI may be scrambled by a C-RNTI, for example, for the multi-TB transmission mode. The multi-TTI DCI format may comprise one or more fields (e.g., information fields). The one or more fields may comprise at least one of: a flag for a transmission mode field, a new data indicator (NDI) field, a redundancy version (RV) information field, a hybrid access request identifier (HARQ ID) field, a time domain resource assignment (TDRA) field, a modulation and coding scheme (MCS) field, a code block group transmission indicator (CBGTI) field, a channel access priority class (CAPC) field, additional information fields (Etc.), and/or reserved information fields (Reserved). At least one field, such as a one-bit flag (e.g., flag=1), or any other quantity of bits in the DCI, may correspond to the transmission mode field. A wireless device may determine the multi-TB transmission mode, for example based on the one-bit flag indicating value 1 (or any other quantity of bits indicating a first value).

The one or more fields in the DCI (e.g., information fields) may comprise a new data indicator (NDI) field. The NDI field may comprise multiple NDI bits per PUSCH transmission/resource, for example, for a multi-TB transmission mode (e.g., multi-TTI scheduling). Each of the multiple NDI bits may correspond to each of the multiple continuous PUSCH transmissions/resources. A first NDI bit (or any other bit(s)) may indicate whether the first PUSCH transmission of the first TTI is to be scheduled for an initial transmission of a new TB or a retransmission of a pending TB (e.g., associated with the first HARQ process). A wireless device may determine an initial transmission and/or a retransmission, for example, based on whether the first NDI bit (or any other bit(s)) of the first HARQ process is toggled or not (relative to a previous value).

The one or more fields in the DCI (e.g., information fields) may comprise a redundancy version (RV) field. The RV field may comprise multiple RV bits per PUSCH transmission. Each one or more RV bits of the multiple RV bits may correspond to each of the multiple continuous PUSCH transmissions/resources. A first one or more RV bits (or any other bit(s)) of the RV field may indicate the RV of the first TB in the first PUSCH transmission. An example of such fields is shown in FIG. 21A. A wireless device may apply a similar behavior to other fields (e.g., information fields), such as the MCS, CBGTI, CAPC, and/or any other field.

A wireless device may determine a TB based on an indicated HARQ process number, for example, for a same-TB repetition mode. The wireless device may map the TB to the multiple continuous PUSCH transmissions scheduled by the multi-TTI DCI. The wireless device may transmit/send multiple repetitions of the TB, for example, based on a repetition parameter and/or based on a number/quantity of the multiple continuous PUSCH transmissions scheduled by the DCI. The one or more fields in the DCI (e.g., information fields) may be the same for the multi-TB transmission mode and the single TB repetition mode (e.g., the same size and/or same position in the DCI).

FIG. 21B shows an example of a multi-TTI DCI for a same-TB repetition mode. The multi-DCI may be scrambled by a C-RNTI, for example, for a same-TB repetition mode. A one-bit flag (e.g. flag=0), or any other quantity of bits in the DCI, may correspond to a transmission mode field. A wireless device may determine a same-TB repetition mode, for example, based on the one-bit flag (or any other quantity of bit(s)) indicating value 0 (or any other value). The wireless device may interpret/process/determine the DCI information fields in the same or similar same way as described with respect to FIG. 21A.

A wireless device may consider/determine one or more bits of one or more information fields to be redundant/reserved (e.g., reserved RV bits). For example, the wireless device may consider/determine the first NDI bit (or any other bit) to indicate whether the multiple continuous PUSCH transmissions are scheduled for an initial transmission of a new TB or a retransmission of a pending TB (e.g., associated with the first HARQ process). The wireless device may ignore the rest of the NDI bits and/or consider/determine the rest of the NDI bits to be reserved. The NDI field may indicate a first entry/indication and/or a second entry/indication indicating an initial transmission of a new TB with repetitions or a retransmission of a pending TB with repetitions (e.g., all zeros '00 . . . 0'/all ones '11 . . . 1'; half zeros-half ones '00 . . . 11'/'11 . . . 00'; at least one 0/at least one 1; and/or any other pattern/combination of 1 and/or 0).

A wireless device may consider/determine the first one or more RV bits to indicate the starting RV to be applied to the first PUSCH transmission of single-TB repetition, via the first TTI, for example, based on determining the repetition mode. The wireless device may repeat the same starting RV for all the TB repetitions in the multiple PUSCH transmissions. The wireless device may follow a configured/predefined RV pattern/sequence to determine the RVs of the subsequent TB repetitions in the subsequent PUSCH transmissions, for example, based on the starting RV. The wireless device may ignore the rest of the RV bits and/or consider/determine the rest of the RV bits to be reserved. The RV field may indicate a first entry and a second entry indicating a starting RV (e.g., all zeros '00 . . . 0'/all ones '11 . . . 1'; half zeros-half ones '00 . . . 11'/'11 . . . 00'; at least one 0/at least one 1; and/or any pattern/combination of 1 and/or 0). A wireless device may apply a similar or the same behavior to other information fields, such as MCS, CBGTI, CAPC, and/or any other field.

FIG. 21C shows an example of a multi-TTI DCI for a same-TB repetition mode. The multi-TTI DCI may be scrambled by a C-RNTI, for example, for the same-TB repetition mode. A one-bit flag (e.g., flag=0), or any other quantity of bits in the DCI, may correspond to a transmission mode field. A wireless device may determine the same-TB repetition mode, for example, based on the one-bit flag (or any other quantity of bits) indicating value 0 (or any other value). The wireless device may interpret/determine the DCI information fields differently from the examples described with respect to FIG. 21A and/or FIG. 21B. The NDI field (e.g., as shown in FIG. 21C) may comprise one bit (or any other quantity of bits) to indicate the status of one TB (e.g., initial transmission of a new TB or retransmission of a pending TB). The wireless device may send/transmit the TB via the multiple PUSCH transmissions scheduled by the multi-TTI DCI. The RV field may comprise one or two bits (or any other quantity of bits) to indicate the starting RV to be applied to the first PUSCH transmission of the TB repetitions. The wireless device may follow a configured/predefined RV pattern/sequence to determine the RVs of the subsequent TB repetitions in the subsequent PUSCH transmissions, for example, based on the starting RV. Other information fields, such as MCS, CBGTI, and/or any other field, may be interpreted differently (e.g., with different size and/or positions in the DCI payload). One or more bits (e.g., zero-value bit(s)) may be padded after a last information field in the DCI, for example, to maintain a fixed DCI payload size. The multi-TTI DCI scheduling same-TB repetition mode may comprise one or more certain information fields that may not be present in the multi-TTI DCI scheduling multi-TB transmission mode. The multi-TTI DCI scheduling multi-TB transmission mode may comprise one or more certain information fields that may not be present in the multi-TTI DCI scheduling same-TB repetition mode.

Figure 22:
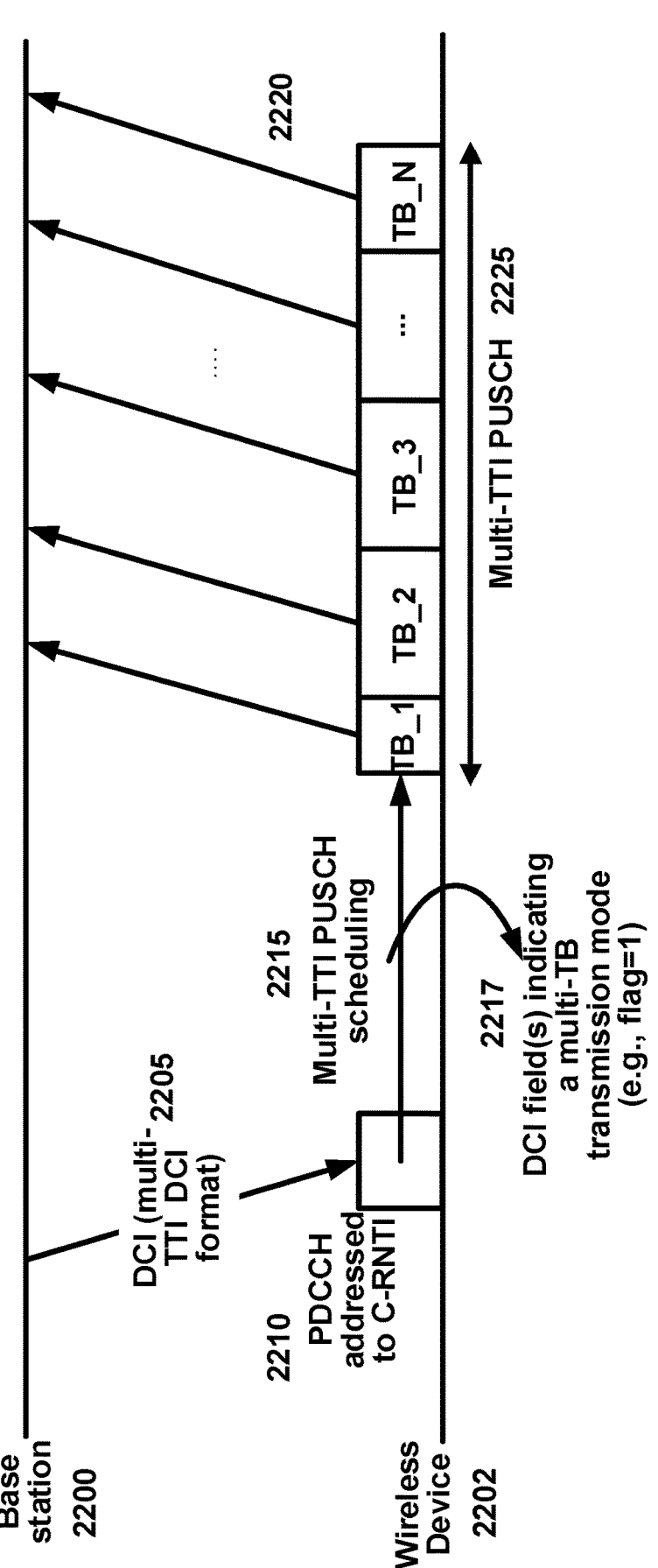
FIG. 22 shows an example of multiple TB transmission scheduled by a multi-TTI DCI.

FIG. 22 shows an example of multiple TB transmission scheduled by a multi-TTI DCI. The multi-TTI DCI may be scrambled by (and/or addressed to) a C-RNTI. A wireless device 2202 may receive, from a base station 2200, DCI comprising a multi-TTI DCI format 2205. The wireless device 2202 may receive the DCI 2205 in one or more PDCCH transmissions 2210 that may be addressed to a C-RNTI associated with the wireless device 2202. The DCI format 2205 may comprise information for scheduling multi-TTI PUSCH transmissions/resources. The DCI 2205 may comprise one or more fields 2217 that may indicate, for example, a multi-TB transmission mode (e.g., flag=1). The wireless device 2202 may determine a transmission mode, for example, based on a transmission mode field of the DCI 2205 and/or one or more fields (e.g., information fields) of the DCI 2205. The wireless device 2202 may determine a multi-TB transmission mode and/or multiple continuous PUSCH transmissions 2215 scheduled in consecutive TTIs 2225 (or any other time durations/resources). The wireless device 2202 may determine to transmit/send the multi-TTI PUSCH transmissions 2225 via one or more uplink transmissions 2220. The multi-TTI PUSCH transmissions 2225 may comprise a first TB (e.g., TB_1) in a first PUSCH transmission, a second TB (e.g., TB_2) in a second PUSCH, a third TB (e.g., TB_3) in a third PUSCH, and up to N-TB's (e.g., up to TB_N) in an N-th PUSCH (e.g., where N may comprise any integer). The PUSCH transmissions 2215 may comprise any quantity of TBs (e.g., 1, 2, 3, . . . up to N). The first, second, third, . . . , and the N-th PUSCH transmission may be scheduled in the first, second, third, . . . , and the N-th continuous TTIs, respectively.

Figure 23:
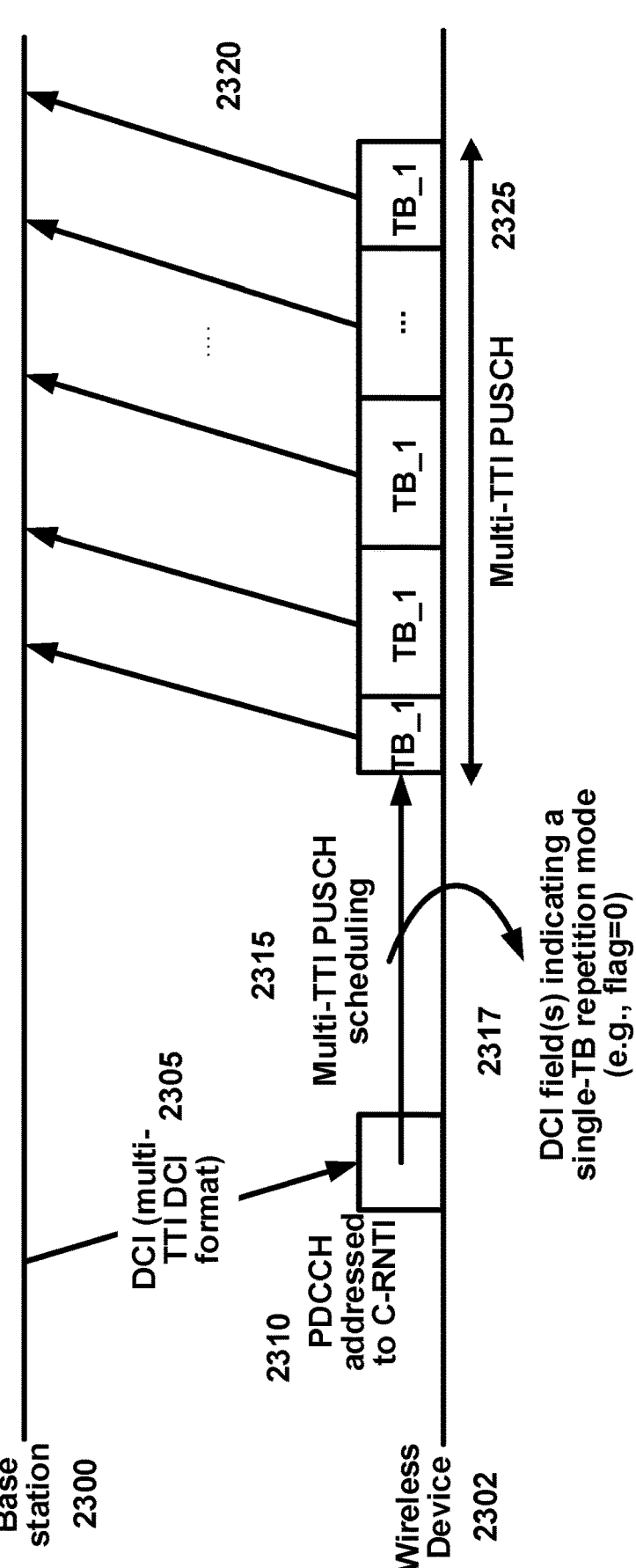
FIG. 23 shows an example of single-TB repetition scheduled by a multi-TTI DCI.

FIG. 23 shows an example of single-TB repetition scheduled by a multi-TTI DCI. The multi-TTI DCI may be scrambled by (and/or addressed to) a C-RNTI. A wireless device 2302 may receive, from a base station 2300, DCI comprising a multi-TTI DCI format 2305. The wireless device 2302 may receive the DCI 2305 in one or more PDCCH transmissions 2310 that may be addressed to a CRNTI associated with the wireless device 2302. The DCI format 2305 may comprise information for scheduling multi-TTI PUSCH transmissions/resources. The DCI 2305 may comprise one or more fields 2317 that may indicate, for example, a single-TB repetition mode (e.g., flag=0). The wireless device 2302 may determine a transmission mode, for example, based on a transmission mode field of the DCI 2305 and/or one or more fields (e.g., information fields) of the DCI 2305. The wireless device 2302 may determine a same (single)-TB repetition mode and/or multiple continuous PUSCH transmissions 2315 scheduled in consecutive TTIs 2320 (or any other time durations/resources). The wireless device 2302 may determine to transmit/send the multi-TTI PUSCH transmissions 2325 via one or more uplink transmissions 2320. The multi-TTI PUSCH transmissions 2325 may comprise a first TB (e.g., TB_1) in a first PUSCH transmission. The first TB may be repeated in a second PUSCH transmission, a third PUSCH transmission, and/or an N-th PUSCH (e.g., wherein N may comprise any integer). The PUSCH transmissions 2320 may comprise any quantity of repetitions of the same TB (e.g., 1, 2, 3, . . . up to N repetitions). The first, second, third, . . . , and the N-th PUSCH transmission may be scheduled in the first, second, third, . . . , and the N-th continuous TTIs, respectively.

A base station may transmit/send one or more RRC messages to a wireless device. The one or more RRC messages may comprise one or more parameters that may configure one or more PUSCHs and/or one or more configured grants (CGs). The base station may configure one or more uplink transmissions without dynamic grant(s), for example, based on (e.g., according to) at least two possible schemes/configurations. An UL grant may be configured via RRC (e.g., CG type1) and/or provided via the PDCCH (e.g., addressed to CS-RNTI) (e.g., CG type2). The base station may configure CG parameters (e.g., for CG type1 and/or CG type2) comprising at least one of: an MCS table; a resource allocation type; a power control; a number/quantity of HARQ processes; a number/quantity of repetitions, repK; an RV sequence/pattern to use (e.g., if repetitions are configured (e.g., repK>1)); a periodicity; a CG timer; and/or any other parameter. The base station may configure the UL grant with RRC parameters (e.g., for CG type1) comprising at least one of: a time offset; a TDRA; a frequency domain allocation; an antenna port; an MCS and/or TBS; and/or any other parameter. The base station may configure/schedule the UL grant by DCI addressed to a CS-RNTI (e.g., for CG type2). The wireless device may monitor one or more downlink control channels (e.g., PDCCHs) to receive the UL grant. For example, the base station may transmit/send to the wireless device DCI via the one or more PDCCHs. The DCI may be scrambled by a first RNTI (e.g., a wireless device-specific), such as a CS-RNTI. The DCI may schedule one or more UL grants for the wireless device. The DCI may use a first DCI format comprising a first DCI payload size. The DCI may use a multi-TTI DCI format.

A base station may transmit/send a multi-TTI DCI to activate and/or deactivate/release a CG (e.g., a CG type2) for a wireless device. The multi-TTI DCI may schedule an UL grant across multiple TTIs. The multi-TTI DCI may indicate multiple continuous PUSCH transmissions over multiple TTIs. A first PUSCH transmission may be scheduled in a first TTI. A second PUSCH transmission may be scheduled in a second TTI. The wireless device may receive the multi-TTI DCI with CRC bits scrambled by a CS-RNTI. The multi-TTI DCI may comprise one or more information fields, indicating an activation or release of a CG (e.g., CG type2). The wireless device may determine that the multi-TTI DCI with CRC bits scrambled by a CS-RNTI indicates a CG activation, for example, if the CG has not been activated yet, and/or if CG is deactivated, and/or if CG is not active. The wireless device may determine that the multi-TTI DCI with CRC bits scrambled by a CS-RNTI indicates a CG release, for example, if the CG has been already activated, and/or if CG is active.

The base station may transmit/send the multi-TTI DCI to schedule an UL grant for retransmission of a TB that is previously transmitted/sent via a CG (e.g., CG type1 or CG type2) (e.g., CG retransmission). The multi-TTI DCI may schedule an UL grant across multiple TTIs. The multi-TTI DCI may indicate multiple continuous PUSCH transmissions over multiple TTIs. A first PUSCH transmission may be scheduled in a first TTI. A second PUSCH transmission may be scheduled in a second TTI. The wireless device may receive the multi-TTI DCI with CRC bits scrambled by a CS-RNTI. The multi-TTI DCI may comprise one or more information fields, indicating an UL grant for CG retransmission.

A multi-TTI DCI may comprise a transmission mode field. The transmission mode field may comprise one bit (or any other quantity of bits) indicating whether the transmission mode is a multi-TTI scheduling (e.g., multi-TB transmission mode) or a repetition scheduling (e.g., a same-TB repetition mode). The transmission mode field may indicate whether the transmission mode comprises any other type of mode (e.g., based on a service and/or any other condition/characteristic). The wireless device may determine that the multi-TTI DCI schedules a repetition scheduling, for example, based on the transmission mode field indicating a first value (e.g., a first transmission mode, repetition scheduling, same-TB repetition mode). The wireless device may determine that the multi-TTI DCI schedules a multi-TTI scheduling, for example, based on the transmission mode field indicating a second value (e.g., a second transmission mode, multi-TTI scheduling, multi-TB transmission mode).

A wireless device may determine whether multi-TTI DCI (e.g., scrambled by a CS-RNTI) is for CG retransmission or CG activation/release. The NDI field in DCI scrambled with a CS-RNTI may be interpreted differently. The wireless device may determine to perform an initial transmission of a new TB, for example, based on determining that the DCI is for CG activation. The wireless device may determine to retransmit/resend a pending TB, for example, based on determining that the DCI is for CG retransmission. The wireless device may determine whether the multi-TTI DCI (e.g., scrambled by a CS-RNTI) is for CG retransmission or CG activation/release, for example, based on the NDI field.

Figures 24A, 24B, 24C:
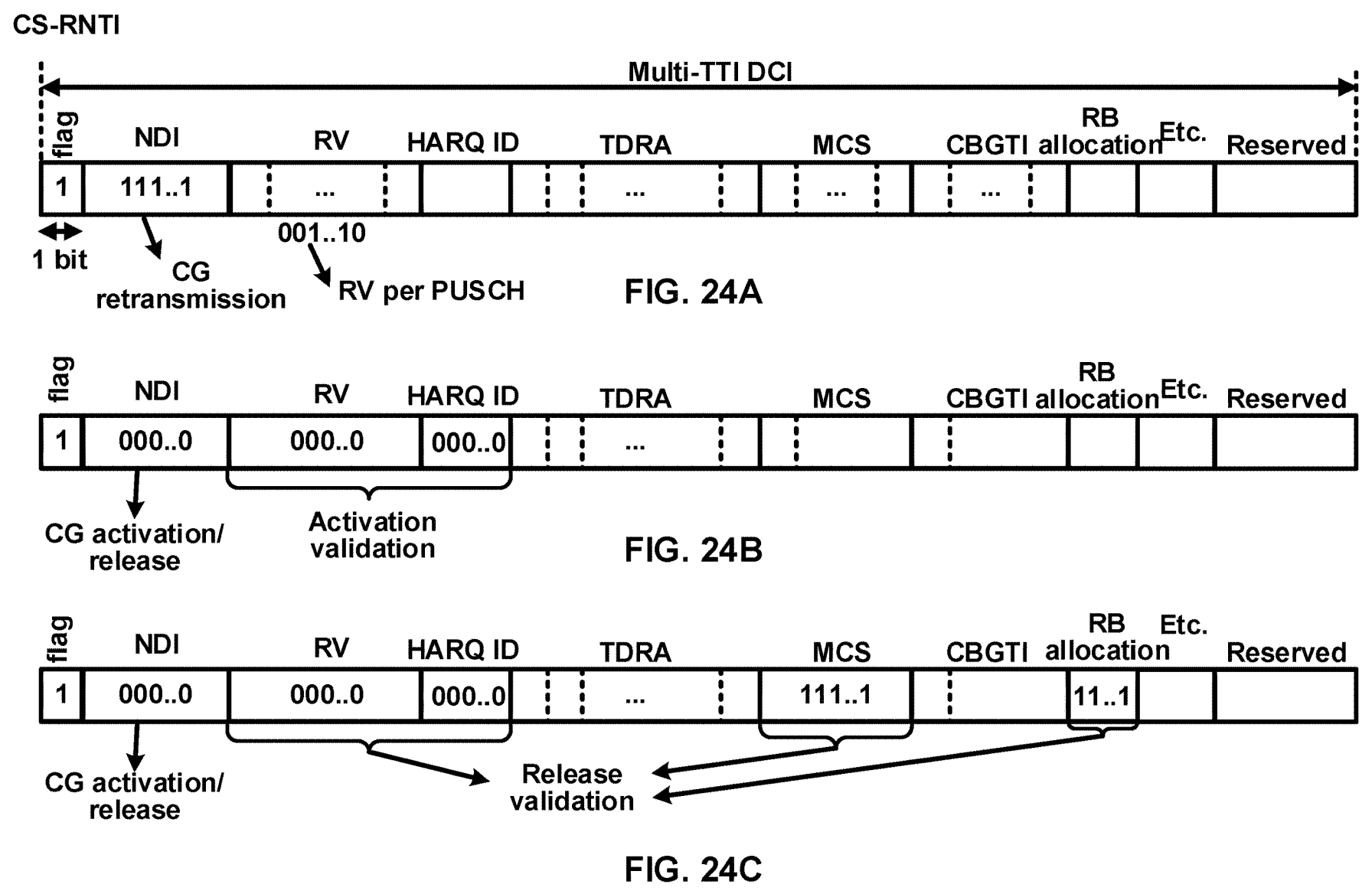

FIG. 24A shows an example of multi-TTI DCI for scheduling multi-TB transmissions. The multi-TTI DCI may be scrambled by a CS-RNTI, for example, for a multi-TB transmission mode. The multi-TTI DCI may comprise one or more formats. The multi-DCI may comprise one or more fields (e.g., information fields). The one or more fields may comprise at least one of: a flag for a transmission mode field, a new data indicator (NDI) field, a redundancy version (RV) information field, a hybrid access request identifier (HARQ ID) field, a time domain resource assignment (TDRA) field, a modulation and coding scheme (MCS) field, a code block group transmission indicator (CBGTI) field, a resource block allocation field, additional information fields (Etc.), reserved information fields (Reserved), and/or any other field. A one-bit flag (e.g., flag=1), or any other quantity of bits in the DCI, may indicate/correspond to a transmission mode field. A wireless device may determine a multi-TB transmission mode, for example, based on the one-bit flag (or any other quantity of bits) indicating value 1 (or any other value). The NDI field may indicate a first value (e.g., all one '111 . . . 1' or any other value) to indicate that the DCI is for scheduling a CG retransmission. One or more first bits of the NDI field having a first value may indicate that the DCI is for CG retransmission. The wireless device may determine/consider the first NDI bit to indicate whether multiple continuous PUSCH transmissions are scheduled for a retransmission of a pending (CG) TB (e.g., associated with an indicated HARQ process). The wireless device may ignore the rest of the NDI bits and/or determine/consider the rest of the NDI bits to be reserved. The NDI field may indicate a first entry indicating a retransmission of a pending TB (e.g., all zeros '00 . . . 0'/all ones '11 . . . 1'; half zeros-half ones '00 . . . 11'/'11 . . . 00'; at least one 0/at least one 1; first zero '0xx . . . x'/first one '1xx . . . x'; and/or any other pattern/combination of 1 and/or 0).

A multi-TTI DCI may be used to schedule retransmission of multiple TBs (e.g., previously transmitted/sent via a CG) across/via multiple continuous PUSCH transmissions. The multi-TTI DCI may comprise a HARQ process number indicating the HARQ process associated for a TB transmission in the first PUSCH. The wireless device may determine the HARQ processes of the subsequent PUSCHs scheduled by the multi-TTI DCI, for example, by sequentially incrementing the indicated HARQ process number. The multi-TTI DCI may comprise an RV field. The RV field may comprise multiple RV bits. Each one or more RV bits of the multiple RV bits may correspond to each of the multiple continuous PUSCH transmissions (e.g., RV per PUSCH transmission). A first one or more RV bits of the RV field may indicate the RV for retransmission of a TB in a first PUSCH transmission. A wireless device may apply a similar or the same behavior to other information fields, such as MCS, CBGTI, RB allocation, and/or any other field.

A multi-TTI DCI may indicate retransmission of a first TB associated with a first HARQ process via a first PUSCH. The multi-TTI DCI may indicate retransmission of a second TB associated with a second HARQ process via a second PUSCH (e.g., subsequent to the first PUSCH transmission). The second TB may not be available in the HARQ buffer of the second HARQ process. The wireless device may flush/erase the HARQ buffer, for example, based on the CG timer expiring and/or based on an ACK being received for that HARQ process. The wireless device may prepare a new TB associated with the second HARQ buffer. The wireless device may transmit/send the first TB via the second PUSCH transmission. The wireless device may skip the second PUSCH transmission.

FIG. 24B and FIG. 24C show examples of multi-TTI DCI for scheduling multi-TB transmissions. The multi-TTI DCI may be scrambled by a CS-RNTI, for example, for a multi-TB transmission mode. A one-bit flag (e.g., flag=1), or any other quantity of bits in the DCI, may indicate/correspond to the transmission mode field. The wireless device may determine the multi-TB transmission mode, for example, based on the one-bit flag (or any other quantity of bits) indicating value 1 (or any other value). The NDI field may indicate a first value (e.g., all zeros '000 . . . 0' or any other value) to indicate that the DCI is for configuring/scheduling a CG activation/release. One or more first bits of the NDI field having a second value may indicate that the DCI is for CG activation/release. The wireless device may determine/consider the first NDI bit to indicate whether the multiple continuous PUSCH transmissions are scheduled for a CG activation/release. The wireless device may ignore the rest of the NDI bits and/or determine/consider the rest of the NDI bits to be reserved. The NDI field may indicate a second entry indicating a CG activation/release (e.g., all zeros '00 . . . 0'/all ones '11 . . . 1'; half zeros-half ones '00 . . . 11'/'11 . . . 00'; at least one 0/at least one 1; first zero '0xx . . . x'/first one '1xx . . . x'; and/or any pattern/combination of 1 or 0). The NDI field indicating CG activation/release may be the complementary of the NDI field indicating CG retransmission.

The base station may transmit/send the multi-TTI DCI (e.g., scrambled by a first RNTI (e.g., CS-RNTI)) to activate a CG (e.g., CG type2) with a multi-TB transmission mode, such as shown in FIG. 24B. The wireless device may receive, via the multi-TTI DCI, an uplink grant comprising multiple continuous PUSCH transmissions over multiple consecutive TTIs.

A wireless device may transmit/send multiple TBs associated with an activated CG. The wireless device may determine/select (e.g., autonomously select) one or more HARQ processes to transmit/send via the multiple continuous PUSCH transmissions. The wireless device may determine/select (e.g., autonomously select) a first HARQ process for the first PUSCH in the first TTI. The wireless device may determine the HARQ processes of the subsequent PUSCHs scheduled by the multi-TTI DCI, for example, by sequentially incrementing the number/ID of the first HARQ process. The wireless device may determine/select any HARQ process for any of the multiple continuous PUSCHs (e.g., that may comprise a HARQ process ID supported by a CG configuration). The wireless device may indicate a HARQ process ID of a selected/determined HARQ process in the CG-UCI. The wireless device may transmit/send (e.g., in each PUSCH transmission), the CG-UCI associated with a CG transmission (e.g., indicating the HARQ ID of the TB transmitted/sent via the PUSCH transmission).

A wireless device may indicate a first value for an NDI. The wireless device may indicate the first value for an NDI bit in a CG-UCI that may be associated with a CG transmission. The wireless device may indicate NDI=0 in the CG-UCI, for example, for an initial transmission of a TB via CG based on a CG activation. A second NDI bit (or any other bit) may be toggled for differentiating initial transmission and retransmissions (e.g., if not all the NDI bits are used for differentiating CG retransmission and CG activation/release, and/or if other information fields are used for differentiating CG retransmission and CG activation/release). The wireless device may determine/indicate the actual value of the second NDI bit in the CG-UCI, for example, to indicate whether the TB is associated with an initial transmission or a retransmission. The wireless device may not indicate the NDI in the CG-UCI, for example, based on CG activation (e.g., if it may be unnecessary).

A wireless device may indicate an RV used for transmitting a TB. The wireless device may indicate the RV, for example, via the activated CG in the CG-UCI. The RV may be the starting RV of a configured/predefined RV sequence, for example, if the TB is associated with an initial transmission. The wireless device may not indicate the RV in the CG-UCI, for example, based on CG activation (e.g., if it may be unnecessary). The RV may be a next RV of the configured/predefined RV sequence, for example, if the TB is associated with a retransmission. A wireless device may apply a similar or the same behavior to other information fields, such as MCS, CBGTI, and/or any other field.

A base station may transmit/send a multi-TTI DCI (e.g., scrambled by a first RNTI (e.g., CS-RNTI)) to release (deactivate) a CG (e.g., CG type2) with multi-TB transmission mode, such as shown in FIG. 24C. The wireless device may determine/consider the CG as inactive/deactivated, for example, based on receiving the CG release DCI.

A wireless device may use one or more information fields in the DCI for validation of a DCI format for CG activation and/or release. The wireless device may determine/select (e.g., autonomously select) one or more first transmission parameters for a CG-based transmission and/or one or more second transmission parameters may be predefined (e.g., HARQ ID, RV, MCS, NDI, CAPC, CBGTI, and/or any other parameter). The one or more information fields may be unnecessary in DCI indicating CG activation/release. The wireless device may validate a CG activation, for example, if the one or more information fields indicate a first value (e.g., if RV indicates all '0's and/or HARQ ID indicates all '0's, etc.), such as shown in FIG. 24B. The wireless device may validate a CG release, for example, if the one or more information fields indicate a first value (e.g., if RV indicates all '0's and/or HARQ ID indicates all '0's, and/or if the RV indicates any other value) and/or one or more second information fields indicate a second value (e.g., if MCS indicates all '1's and/or RB assignment indicates all '1's, and/or if the MCS indicates any other value). As shown in FIG. 24B, the RV and HARQ ID fields may indicate a value of zero '0'. As shown in FIG. 24C, the RV and HARQ ID are set to zero '0', and the MCS and RB allocation fields may be set to one '1'.

Validation of a DCI format may be achieved, for example, if one or more of the information fields for the DCI format are set according to one or more values (e.g., predefined values). The wireless device may determine/consider the information fields in the DCI format as a valid activation or valid release of CG type2, for example, if validation is achieved. The wireless device may discard all information fields in DCI, for example, if validation is not achieved.

A wireless device may be configured with multiple active CGs. The wireless device may be configured with multiple active CGs, for example, in a BWP and/or in any other wireless resource. A multi-TTI DCI may configure activation of a single CG. A multi-TTI DCI may comprise at least one field to indicate a CG-index of the CG that is to be activated. The multi-TTI DCI may indicate the CG-index of the CG that is to be activated based on a HARQ ID (e.g., the HARQ ID may exclusively be associated with the intended CG). The multi-TTI DCI may configure activation of multiple CGs. The multi-TTI DCI may comprise a field to indicate multiple CG-indexes associated with the CGs that are to be activated. The multi-TTI DCI may only indicate a first CG-index and a wireless device may apply activation to multiple CGs, for example, with CG-indexes starting from the first CG-index until a quantity (e.g., some or all) of TTIs are exhausted. The multi-TTI DCI may comprise a bitmap indicating the CG indexes to be activated (e.g., each bit of the bitmap may sequentially be mapped to each CG index in increasing order, decreasing order, or in any other order).

Figures 25A, 25B, 25C:
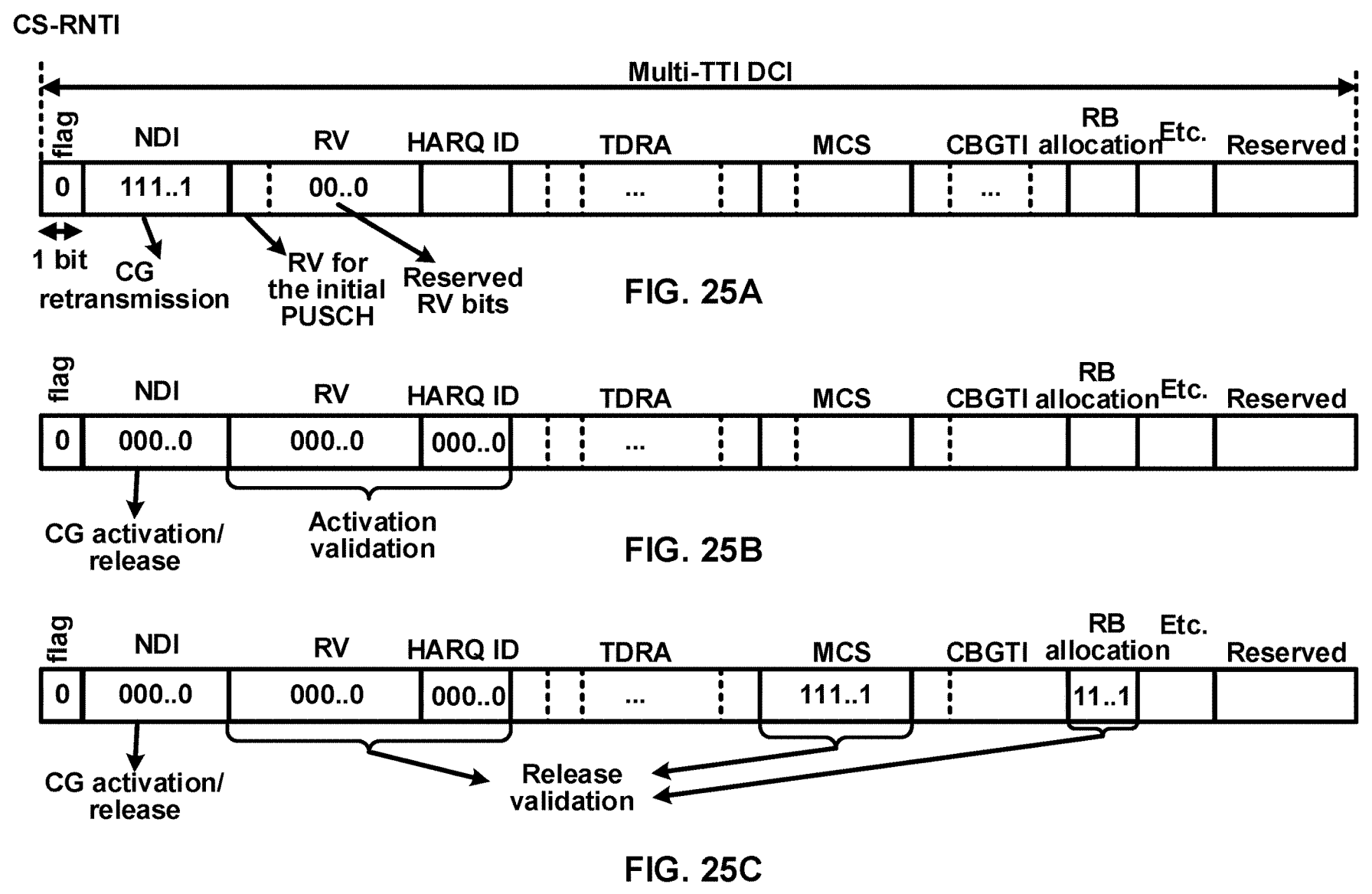

FIG. 25A shows an example of a multi-TTI DCI for scheduling single-TB repetition. The multi-TTI DCI may be scrambled by a CS-RNTI, for example, for a single (same)- TB repetition mode. A one-bit flag (e.g., flag=0), or any other quantity of bits in the DCI, may correspond to a transmission mode field. A wireless device may determine a single-TB repetition mode, for example based on the one-bit flag (or any other bits) indicating value 0 (or any other value). The NDI field may indicate a first value (e.g., all ones '111 . . . 1' or any other value) to indicate that the DCI is for scheduling a CG retransmission. One or more first bits (or any other bit(s)) of the NDI field having a first value may indicate that the DCI is for CG retransmission. The wireless device may determine/consider the first NDI bit (or any other bit(s)) to indicate whether the multiple continuous PUSCH transmissions are scheduled for a retransmission of a pending (CG) TB (e.g., associated with an indicated HARQ process). The wireless device may ignore the rest of the NDI bits and/or determine/consider the rest of the NDI bits to be reserved. The NDI field may indicate a first entry indicating a retransmission of a pending TB (e.g., all zeros '00 . . . 0'/all ones '11 . . . 1'; half zeros-half ones '00 . . . 11'/'11 . . . 00'; at least one 0/at least one 1 first zero '0xx . . . x'/first one '1xx . . . x'; and/or any other pattern/combination of 1 or 0).

A multi-TTI DCI may schedule retransmission of a TB (e.g., previously transmitted/sent via CG) with repetitions across multiple continuous PUSCH transmissions. The multi-TTI DCI may comprise a HARQ process number indicating the HARQ process associated with the TB. The multi-TTI DCI may comprise an RV field. The wireless device may determine/consider a first one or more RV bits (or any other bits) to indicate the starting RV to be applied to a first PUSCH transmission of the TB repetitions, via a first TTI. The wireless device may repeat the same starting RV for all of the TB repetitions in the multiple PUSCH transmissions. The wireless device may follow a configured/ predefined RV pattern/sequence to determine the RVs of the subsequent TB repetitions in the subsequent PUSCHs, for example, based on the starting RV. The wireless device may ignore the rest of the RV bits and/or determine/consider the rest of the RV bits to be reserved. The RV field may indicate a first entry and a second entry indicating a starting RV (e.g., all zeros '00 . . . 0'/all ones '11 . . . 1'; half zeros-half ones '00 . . . 11'/'11 . . . 00'; at least one 0/at least one 1; and/or any other pattern/combination of 1 or 0). A wireless device may apply a similar or the same behavior to other information fields, such as MCS, CBGTI, RB allocation, and/or any other field.

FIG. 25B and FIG. 25C show examples of multi-TTI DCI for scheduling single-TB repetition. The multi-TTI DCI may be scrambled by a CS-RNTI, for example, for a single-TB repetition mode. A one-bit flag (e.g., flag=0), or any other quantity of bits in the DCI, may correspond to a transmission mode field. A wireless device may determine a multi-TB transmission mode, for example, based on the one-bit flag (or any other bit(s)) indicating value 0 (or any other value). The NDI field may indicate a first value (e.g., all zeros '000 . . . 0' or any other value) to indicate that the DCI is for configuring/scheduling a CG activation/release. One or more first bits of the NDI field having a second value (e.g., all ones '111 . . . 1' or any other value) may indicate that the DCI is for CG activation/release. The wireless device may determine/consider the first NDI bit (or any other bit(s)) to indicate whether the multiple continuous PUSCHs are scheduled for a CG activation/release. The wireless device may ignore the rest of the NDI bits and/or determine/ consider the rest of the NDI bits to be reserved. The NDI field may indicate a second entry indicating a CG activation/ release (e.g., all zeros '00 . . . 0'/all ones '11 . . . 1'; half zeros-half ones '00 . . . 11'/'11 . . . 00'; at least one 0/at least one 1; first zero '0xx . . . x'/first one '1xx . . . x'; and/or any other pattern/combination of 1 and/or 0). The NDI field indicating CG activation/release may be the complementary of the NDI field indicating CG retransmission.

A base station may transmit/send a multi-TTI DCI (e.g., scrambled by a first RNTI (e.g., CS-RNTI)) to activate a CG (e.g., CG type2) for a single-TB repetition mode, such shown in FIG. 25B. A wireless device may receive, via the multi-TTI DCI, an UL grant comprising multiple continuous PUSCH transmissions over multiple consecutive TTIs.

A wireless device may transmit/send a TB repeatedly via multiple continuous PUSCH transmissions associated with the activated CG. The wireless device may determine/select (e.g., autonomously select) a HARQ process to transmit/ send via the multiple continuous PUSCH transmissions. The wireless device may determine/select any HARQ process that may be associated with a HARQ process ID supported by the CG configuration. The wireless device may indicate the HARQ process ID of the selected HARQ process in a CG-UCI. The wireless device may transmit/send (e.g., with each PUSCH transmission), a CG-UCI associated with a CG transmission (e.g., each CG transmission) indicating the HARQ ID of the TB transmitted/sent via the PUSCH transmission. The wireless device may transmit/send a CG-UCI via a first PUSCH of a first repetition in the first TTI. The wireless device may transmit/send a CG-UCI via a last PUSCH of a last repetition in a last TTI.

A wireless device may indicate a first value for an NDI bit (or any quantity of bits) in a CG-UCI associated with a CG transmission. The wireless device may indicate NDI=0 in the CG-UCI for an initial transmission of a TB via CG, for example, based on a CG activation. A second NDI bit (or any quantity of bits) may be toggled (e.g., relative to another bit(s)) for differentiating initial transmission and retransmissions (e.g., if not all the NDI bits are used for differentiating CG retransmission and CG activation/release, and/or if other information fields are used for differentiating CG retransmission and CG activation/release). The wireless device may indicate the actual value of the second NDI bit (or any quantity of bits) in the CG-UCI that may be used to indicate whether the TB is associated with an initial transmission or a retransmission. The wireless device may not indicate the NDI in the CG-UCI, for example, based on CG activation (e.g., if it may be unnecessary).

A wireless device may indicate an RV used for transmitting/sending each of the TB repetitions via the activated CG in a CG-UCI. The wireless device may indicate the starting RV applied to a first TB repetition of a first PUSCH in a first TTI (e.g., in the corresponding CG-UCI). The wireless device may not indicate the RV in the CG-UCI, for example, based on CG activation (e.g., if it may be unnecessary, such as if the wireless device applies the configured/predefined RV sequence to the TB repetitions via multiple continuous PUSCH transmissions starting from the first TTI). The RV may be a next RV of the configured/predefined RV sequence, for example, if the TB is associated with a retransmission. A wireless device may apply a similar or the same behavior to other information fields, such as TDRA, MCS, CBGTI, RB allocation, and/or any other field.

A base station may transmit/send a multi-TTI DCI (e.g., scrambled by a first RNTI (e.g., CS-RNTI)) to release (deactivate) a CG (e.g., CG type2) for a single-TB repetition mode, such as shown in FIG. 25C. The wireless device may determine/consider the CG as inactive/deactivated, for example, based on receiving the CG release DCI.

A wireless device may use one or more information fields in a DCI for validation of a DCI format (e.g., for CG activation and/or release). The wireless device may determine/select (e.g., autonomously select) one or more first transmission parameters for a CG-based transmission. One or more second transmission parameters may be predefined (e.g., HARQ ID, RV, MCS, NDI, CAPC, CBGTI, etc.). The one or more information fields may be unnecessary in a DCI indicating CG activation/release. The wireless device may validate a CG activation, for example, if the one or more information fields indicate a first value (e.g., if RV indicates all '0's; HARQ ID indicates all '0's; CAPC all '0'; and/or any other field indicates any other value). The wireless device may validate a CG release, for example, if the one or more information fields indicate a first value (e.g., in FIG. 25B, the RV indicates all '0's and/or HARQ ID indicates all '0's, etc.). One or more second information fields indicate a second value (e.g., in FIG. 25C, the RV and HARQ ID indicates all zeros '0'; the MCS field indicates all '1's; and/or the RB assignment indicates all '1's). A plurality of the one or more information fields may be used in combination to validate a CG release.

A multi-TTI DCI may not comprise a transmission mode field. One or more information fields may not be necessary, for example, if the multi-TTI DCI is scrambled by a first RNTI (e.g., CG-RNTI). One or more information fields may not be necessary, for example, if one or more transmission parameters are determined/preconfigured/predefined/autonomously selected by wireless device. A base station may indicate whether a transmission mode (e.g., for a CG activation or a CG retransmission) is a multi-TTI scheduling (e.g., multi-TB transmission mode) or a repetition scheduling (e.g., a same-TB repetition mode), or any other mode, using one or more information fields in the DCI, and/or using a combination of the one or more information fields. The wireless device may determine that the multi-TTI DCI schedules a repetition scheduling (e.g., a first transmission mode, repetition scheduling, same-TB repetition mode, etc.), for example, based on the one or more information fields indicating a first value. The wireless device may determine that the multi-TTI DCI schedules a multi-TTI scheduling (e.g., a second transmission mode, multi-TTI scheduling, multi-TB transmission mode, etc.), for example, based on the one or more information fields indicating a second value. One or more reserved entries of at least one entry of the information fields (e.g., NDI field, and/or RV field, and/or MCS field, and/or CBGTI field, and/or TDRA field, and/or RB assignment field, and/or reserved bits, and/or any other field) may be used for differentiating the multi-TB transmission mode from the same-TB repetition mode (e.g., for CG retransmission and/or for CG activation). At least one of the information fields may have at least one extra/idle entry that is not currently mapped to any information. The at least one of the information fields (e.g., NDI, RV, MCS, TDRA, RB assignment, and/or any other field) may comprise M bits, indicating 2M entries, wherein at least one of the 2M entries may be reserved/idle/extra/redundant. The at least one of the 2M entries may be used to indicate the transmission mode. A first reserved entry of a first information field and/or a second reserved entry of a second information field may indicate the transmission mode.

A multi-TTI DCI (e.g., scrambled by a first RNTI (e.g., CS-RNTI)) may need to indicate four states or any other quantity of states, such as at least one of: 1) CG retransmission with multi-TB transmission mode, 2) CG retransmission with single-TB repetition mode, 3) CG activation/ release with multi-TB transmission mode, and/or 4) CG activation/release with single-TB repetition mode. FIG. 26A shows an example of multi-TTI DCI. The multi-TTI DCI may comprise a DCI format that may be scrambled by CS-RNTI (e.g., with m-bits in the NDI field) The NDI field of the multi-TTI DCI may comprise M bits that may be used to differentiate among four states (e.g., the four states described above) or any other quantity of states. FIG. 26B shows an example state table for scheduling modes. The state table may be used for differentiating a DCI type and a scheduling mode that maps the first two NDI bits (xx), or any other quantity of bits. The first two bits (e.g., 'xx') of the NDI field may be used to differentiate four states (or fewer than four states, or any other quantity of states), such as: CG retransmission with multi-TB transmission, CG retransmission with single-TB repetition, CG activation/release with multi-TB transmission, and/or CG activation/release with single-TB repetition. A first bit (or any other bit(s)) may be used for differentiating a DCI type, such as: whether the DCI format is for CG retransmission (e.g., '1') or CG activation/ release (e.g. '0'). A second bit (or any other bit(s)) may be used for differentiating a scheduling type/transmission mode, such as: whether the DCI is for multi-TTI scheduling (multi-TB transmission mode '1') and/or repetition scheduling (single-TB repetition mode '0').

FIG. 26C shows an example state table for scheduling modes. The state table may be used for differentiating a DCI type and a scheduling mode that maps the first half and second half NDI bits (x|x), or any other bits. At least some or all bits (e.g., 'x|x') of the NDI field may be used to differentiate four states (or fewer than four states, or any other quantity of states), such as: CG retransmission with multi-TB transmission, CG retransmission with single-TB repetition, CG activation/release with multi-TB transmission, and/or CG activation/release with single-TB repetition. A first half of NDI bits (or any other bit(s)) may be used for differentiating a DCI type, such as: whether the DCI format is for CG retransmission (e.g., all ones '11 . . . 1') or CG activation/release (e.g., all zeros '00 . . . 0'). A second half of NDI bits (or any other bit(s)) may be used for differentiating a scheduling type/transmission mode, such as: whether the DCI is for multi-TTI scheduling (multi-TB transmission mode) (e.g., all ones '11 . . . 1') and/or repetition scheduling (single-TB repetition mode) (e.g., all zeros '00 . . . 0').

Figure 27:
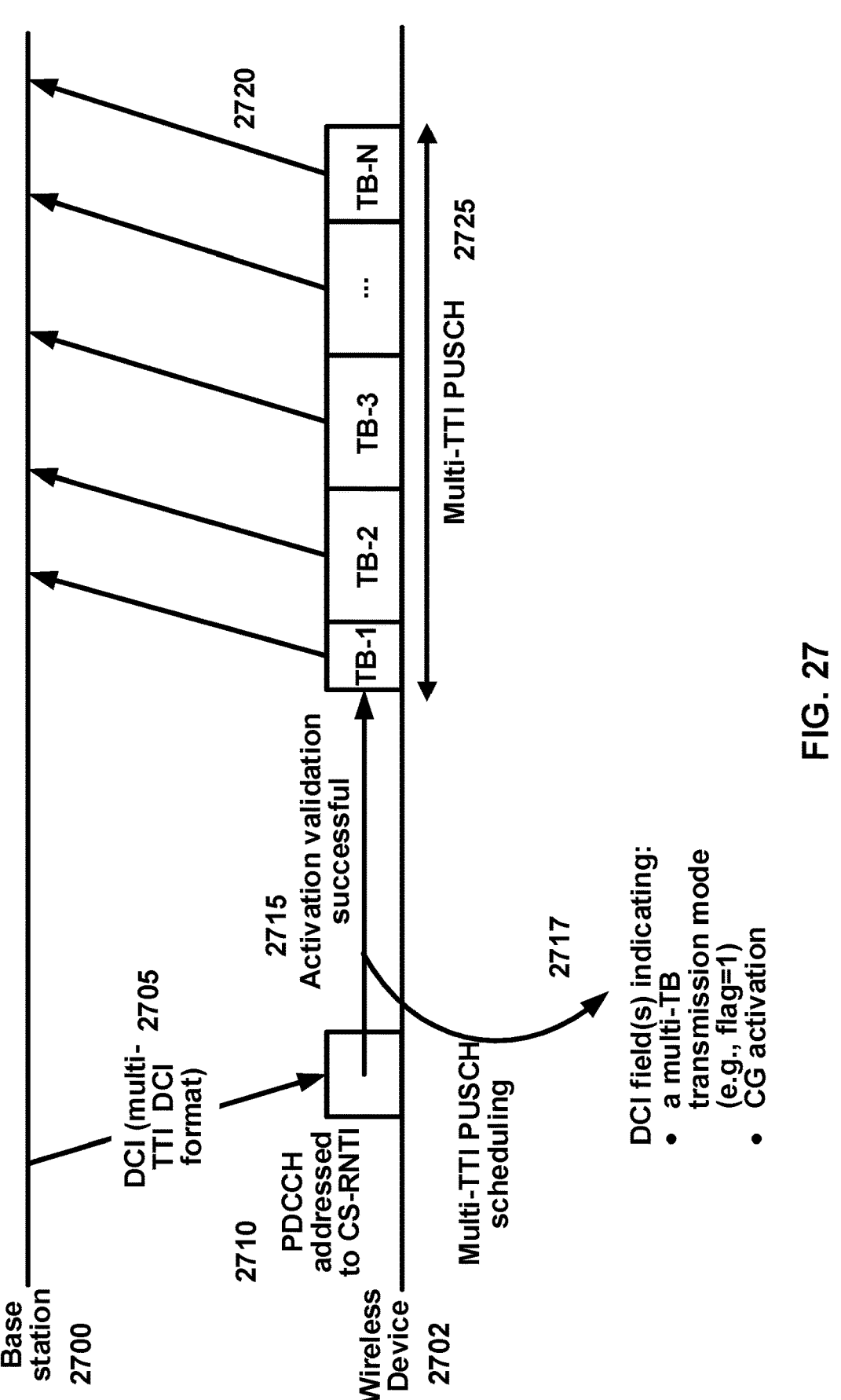
FIG. 27 shows an example of multi-TTI scheduling for multiple TB transmission based on configured grant (CG) activation scheduled by a multi-TTI DCI.

FIG. 27 shows an example of multi-TTI scheduling for multiple TB transmission based on CG activation scheduled by a multi-TTI DCI. The multi-TTI DCI may be scrambled by/addressed to a CS-RNTI. A wireless device 2702 may receive, from a base station 2700, DCI 2705 comprising a multi-TTI DCI format from one or more PDCCHs 2710. The DCI 2705 may be scrambled by/addressed to an RNTI (e.g., CS-RNTI) associated with the wireless device. The DCI 2705 may comprise information for scheduling multi-TTI PUSCH transmissions. The DCI 2705 may comprise fields 2717 that may indicate, for example, a multi-TB transmission mode (e.g., flag=1) or configured grant (CG) activation. The wireless device 2702 may determine a DCI type to be a CG activation DCI, for example, based on one or more information fields of the DCI (e.g., NDI field). The wireless device 2702 may determine a transmission mode based on, for example, a transmission mode field of the DCI and/or one or more information fields of the DCI. The wireless device 2702 may determine a multi-TB transmission mode. The wireless device 2702 may determine multiple continuous PUSCH transmissions scheduled in consecutive TTIs (or any other time duration). The wireless device 2702 may determine to transmit/send the multi-TTI PUSCH transmissions 2725, for example, based on an activation, and/or based on validation of an activation. The wireless device

2702 may determine to transmit/send the multi-TTI PUSCH 2725 via one or more uplink transmissions 2720. The multi-TTI PUSCHs 2725 may comprise a first TB (e.g., TB_1) in a first PUSCH transmission/resource, a second TB (e.g., TB_2) in a second PUSCH transmission/resource, a third TB (e.g., TB_3) in a third PUSCH transmission/ resource, and/or an N-th TB (e.g., TB_N) in an N-th PUSCH transmission/resource (e.g., wherein N may be any integer). The first, second, third, . . . , and/or the N-th PUSCH transmission/resource may be scheduled in the first, second, third, . . . , and/or N-th continuous TTIs, respectively.

Figure 28:
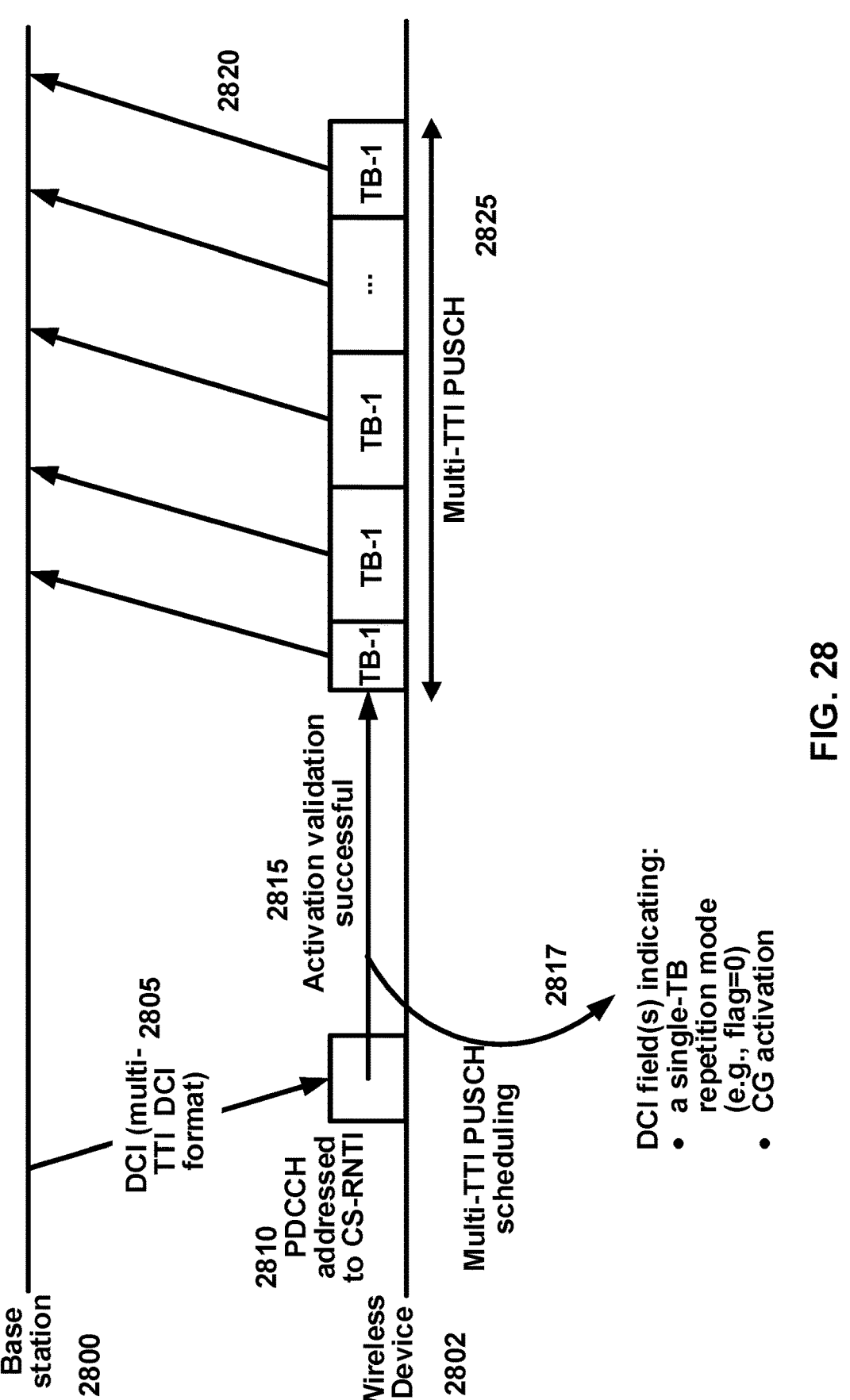
FIG. 28 shows an example of multi-TTI scheduling for single-TB repetition based on CG activation scheduled by a multi-TTI DCI.

FIG. 28 shows an example of multi-TTI scheduling for single-TB repetition based on CG activation scheduled by a multi-TTI DCI. The multi-TTI DCI may be scrambled by/addressed to a CS-RNTI. A wireless device 2802 may receive, from a base station 2800, DCI 2805, comprising a multi-TTI DCI format. The wireless device 2802 may receive the DCI 2805 from one or more PDCCHs 2810. The DCI 2805 may be scrambled by/addressed to a CS-RNTI associated with the wireless device 2802. The DCI 2805 may comprise information for scheduling multi-TTI PUSCH transmissions/resources. The DCI 2805 may comprise fields 2817 that may indicate, for example, a single-TB repetition mode (e.g., flag=0) and/or configured grant (CG) activation. The wireless device 2802 may determine a DCI type to be a CG activation DCI, for example, based on one or more fields of the DCI 2805 (e.g., NDI field). The wireless device 2802 may determine a transmission mode based on, for example, a transmission mode field of the DCI and/or one or more information fields of the DCI. The wireless device 2802 may determine a same (single)-TB repetition mode (e.g., flag=0). The wireless device 2802 may determine that multiple continuous PUSCH transmissions/resources are scheduled in consecutive TTIs 2825 (or any other time durations). The wireless device 2802 may determine to transmit/send the multi-TTI PUSCH 2825 via one or more uplink transmissions 2820. The multi-TTI PUSCHs 2825 may comprise a TB (e.g., TB_1) in a first PUSCH transmission/resource and the TB (e.g., TB_1) repeated in: a second PUSCH transmission/resource, a PUSCH transmission/resource and/or a last PUSCH transmission/resource. The first, second, third, . . . , and/or the last PUSCH transmission/resource may be scheduled in the first, second, third, . . . , and/or the last continuous TTIs, respectively.

Figure 29:
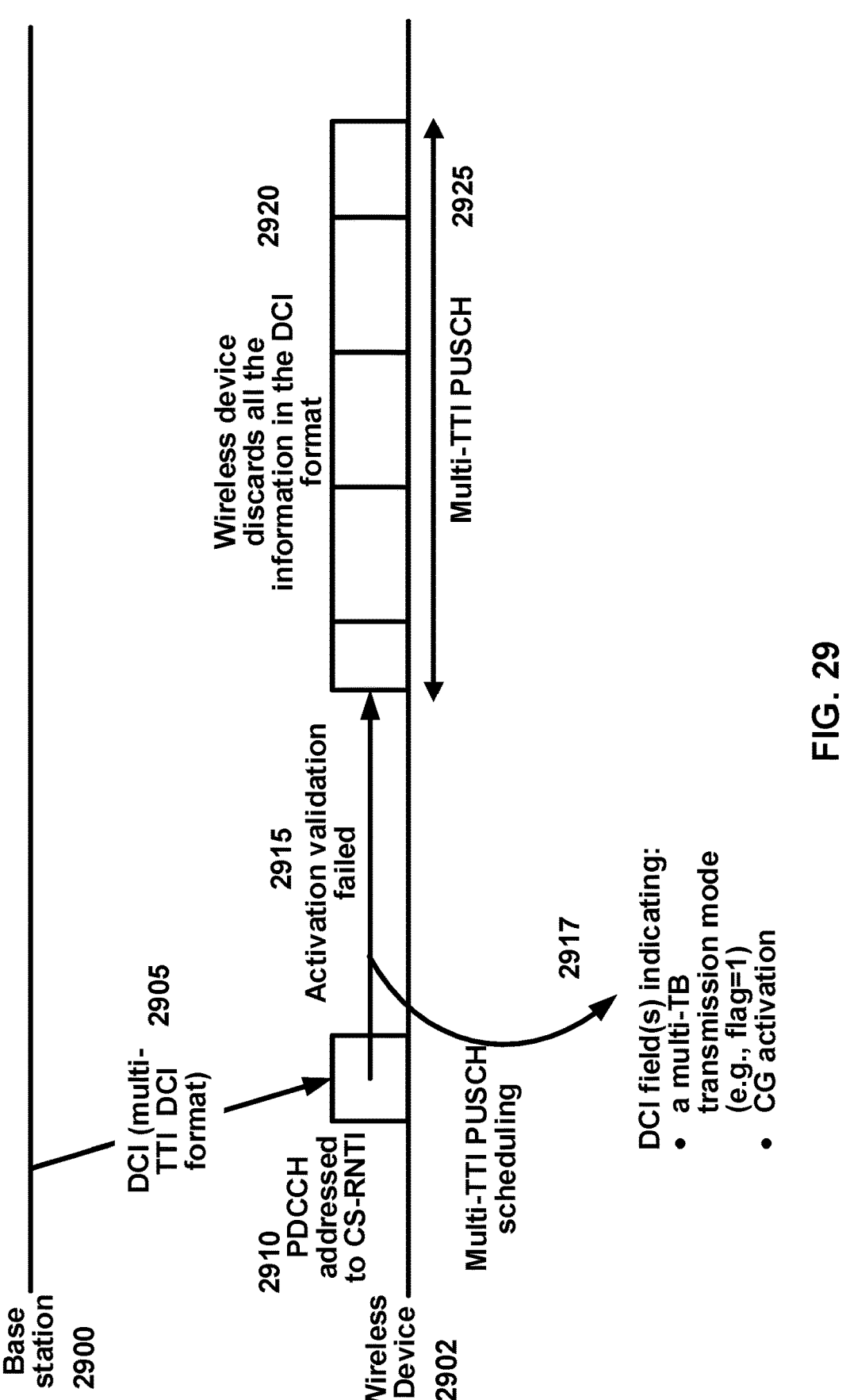
FIG. 29 shows an example of failed CG activation validation.

FIG. 29 shows an example of failed CG activation validation. The failed CG activation validation may be associated with multi-TTI scheduling for TB repetition. A wireless device 2902 may receive, from a base station 2900, DCI 2905. The DCI 2905 may comprise a multi-TTI DCI format. The wireless device 2902 may receive the DCI 2905 from one or more PDCCHs 2910. The DCI 2905 may be scrambled by/addressed to a CS-RNTI associated with the wireless device 2902. The DCI 2905 may comprise information for scheduling multi-TTI PUSCH transmissions/ resources. The DCI 2905 may comprise one or more fields 2917 that may indicate, for example, a multi-TB transmission mode (e.g., flag=1) and/or configured grant (CG) activation. The wireless device 2902 may determine a DCI type that is not a CG retransmission DCI, for example, based on one or more fields of the DCI (e.g., NDI field). The wireless device may fail to validate the DCI type as an activation/ release DCI format 2915. The wireless device may discard the information 2920 in the DCI, for example, based on a failure to validate activation. The wireless device 2902 may discard multiple continuous PUSCH transmission/resources 2925 that may be scheduled by the DCI, for example, based on a failure to validate activation.

Figure 30:
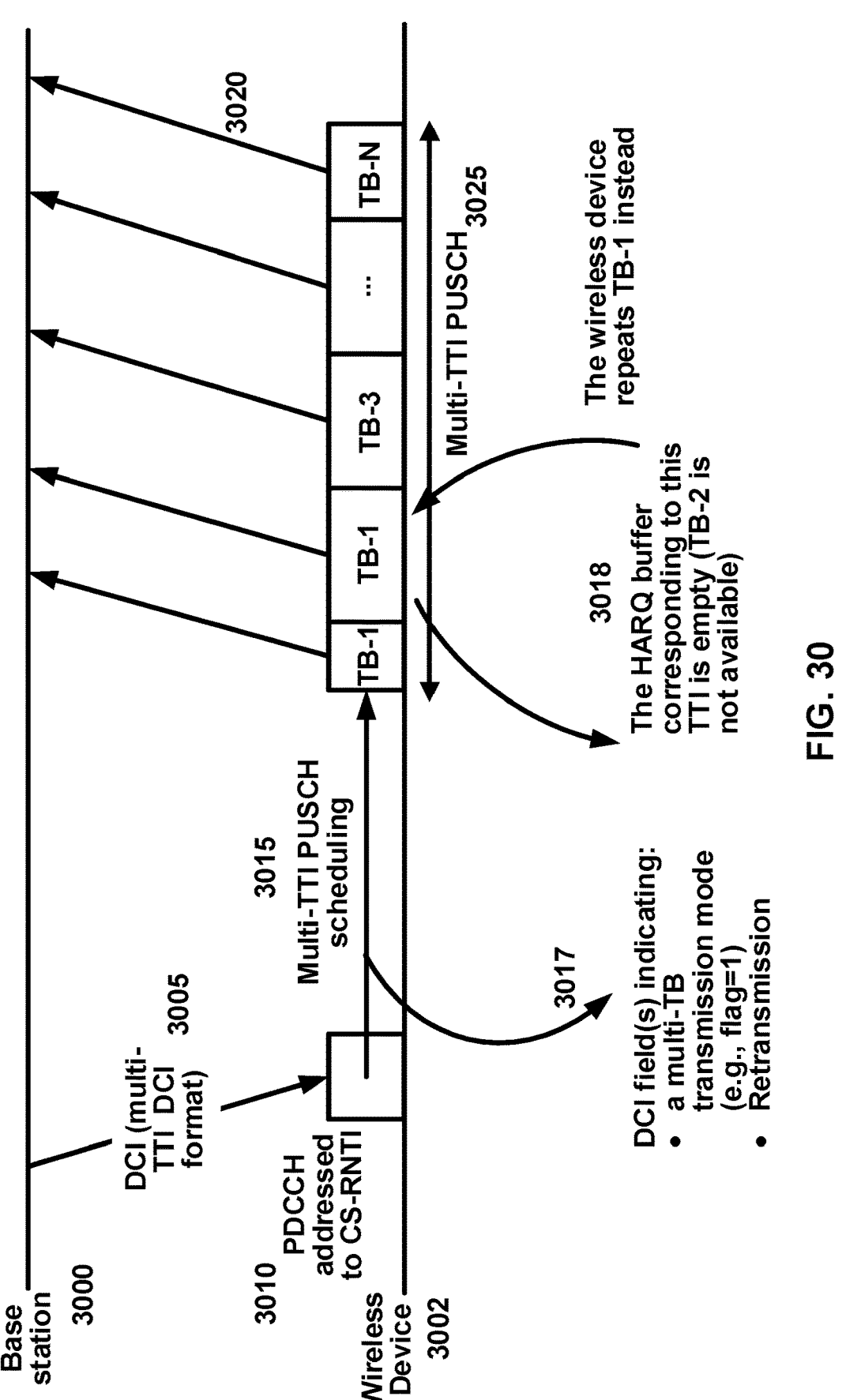
FIG. 30 shows an example of multi-TTI scheduling for multi-TB transmission based on CG retransmission scheduled by a multi-TTI DCI.

FIG. 30 shows an example of multi-TTI scheduling for multi-TB transmission based on CG retransmission scheduled by a multi-TTI DCI. The multi-TTI DCI may be scrambled by/addressed to a CS-RNTI. A wireless device 3002 may receive, from a base station 3000, DCI 3005. The DCI 3005 may comprise a multi-TTI DCI format. The wireless device 3002 may receive the DCI 3005 from one or more PDCCHs 3010. The DCI may be scrambled by/addressed to a CS-RNTI associated with the wireless device. The wireless device 3002 may determine a DCI type to be a configured grant retransmission DCI, for example, based on one or more fields 3017 of the DCI (e.g., NDI field). The wireless device 3002 may determine a transmission mode based on, for example, a transmission mode field of the DCI and/or one or more information fields of the DCI. The wireless device 3002 may determine a multi-TB transmission mode. The wireless device 3002 may determine multiple continuous PUSCH transmissions/resources are scheduled 3015. The wireless device 3002 may determine multiple continuous PUSCH transmissions/resources are scheduled in consecutive TTIs, for example, as a multi-TTI PUSCH transmission 3025. The wireless device 3002 may send/transmit the multi-TTI PUSCH transmission 3025 via one or more uplink transmissions 3020. The wireless device 3002 may determine to transmit/send a first TB (e.g., TB_1) in a first PUSCH transmission/resource. The wireless device 3002 may determine to transmit/send a second TB (e.g., TB_2 associated with HARQ ID_2) in a second PUSCH. The wireless device may determine that a HARQ buffer associated with the second TB (e.g., HARQ ID_2) is empty and/or that the second TB (e.g., the TB_2) is not available (e.g., at 3018). The wireless device 3002 may repeat transmitting a previous TB, such as the first TB (e.g., TB_1) via the second PUSCH in the second TTI, for example, based on determining the HARQ buffer associated with the second TB is empty and/or based on determining that the second TB is not available. The wireless device 3002 may discard the entire multi-TTI PUSCHs 3025, for example, based on determining the HARQ buffer associated with the second TB is empty and/or based on determining that the second TB is not available. The wireless device 3002 may skip the second PUSCH transmission, for example, based on determining the HARQ buffer associated with the second TB is empty and/or based on determining that the second TB is not available. The wireless device 3002 may transmit/send a third TB (e.g., TB-3) associated with a third HARQ process via the second PUSCH transmission/resource, for example, based on determining the HARQ buffer associated with the second TB is empty and/or based on determining that the second TB is not available. The wireless device 3002 may transmit any quantity of TBs, for example, up to N-TBs (e.g., up to TB-N) in the one or more uplink transmissions 3020.

Figure 31:
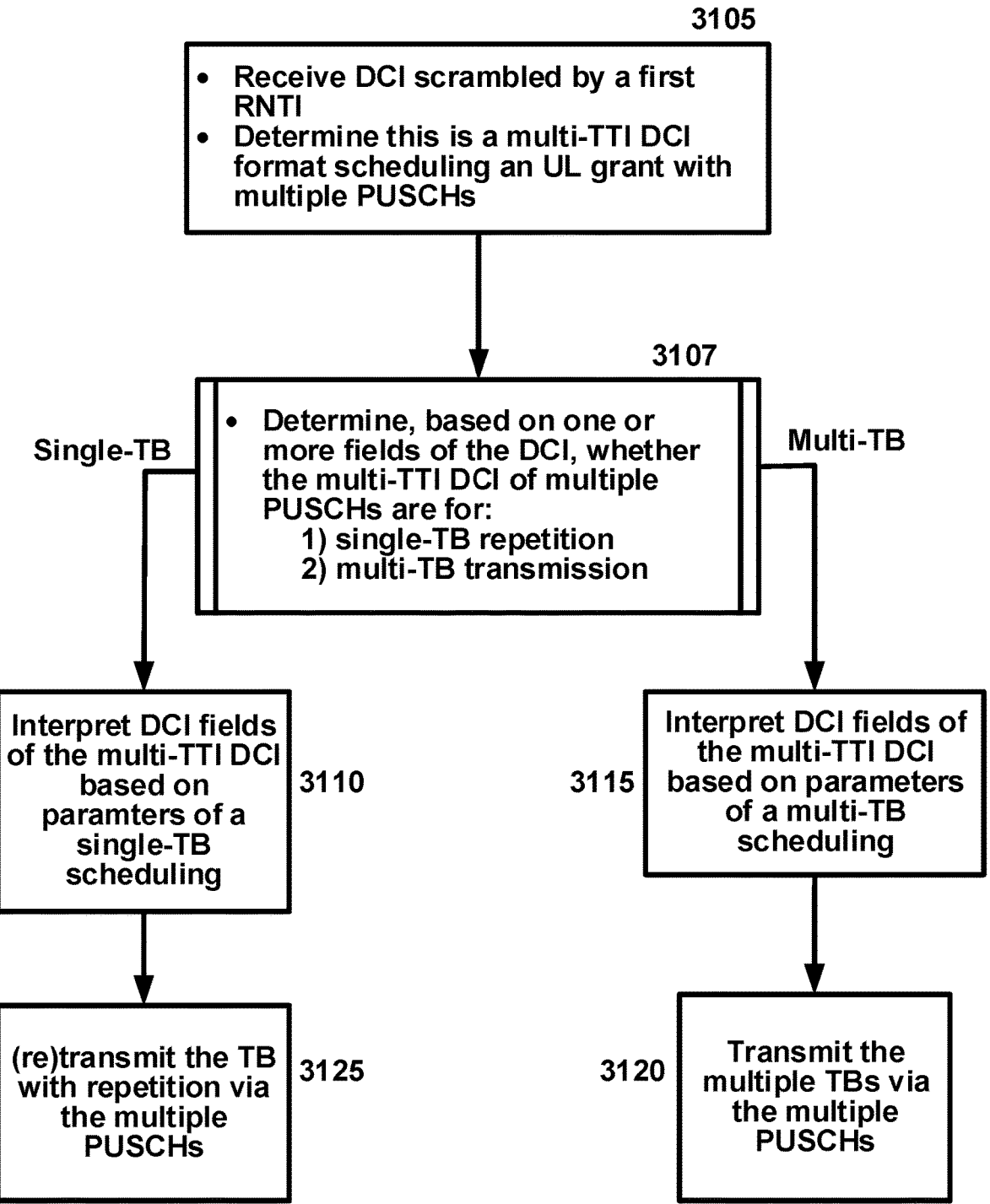
FIG. 31 shows an example method for determining a transmission mode of a multi-TTI DCI.

FIG. 31 shows an example method for determining a transmission mode of a multi-TTI DCI. The method may be performed by a wireless device. A wireless device may determine a transmission mode/scheduling type of a multi-TTI DCI based on an RNTI with which the multi-TTI DCI may be scrambled and/or based on one or more fields of the DCI. At step 3105, a wireless device may receive DCI. The DCI may be scrambled by/address to a first RNTI (e.g. C-RNTI). The wireless device may determine that the DCI comprises a multi-TTI DCI format for scheduling an uplink grant for multiple PUSCH transmissions/resources. At step 3107, the wireless device may determine, based on one or more fields of the DCI, whether the multi-TTI DCI PUSCH transmissions/resources are for at least one of: a single-TB repetition, or multi-TB transmission. At step 3110, the wireless device may determine/interpret the one or more fields of the multi-TTI DCI, for example, based on parameters of the single-TB scheduling (e.g., if the wireless device determines that the DCI format indicates single TB repetition). At step 3125, the wireless device sends/transmits (or resends/retransmits) the TB using repetition via the multiple PUSCH transmissions/resources. At step 3115, the wireless device determines/interprets the one or more fields of the multi-TTI DCI, for example, based on parameters of a multi-TB scheduling (e.g., if the wireless device determines that the DCI format indicates multi-TB transmission). At step 3120, the wireless device sends/transmits the multiple TBs via the multiple PUSCH transmissions/resources.

Figure 32:
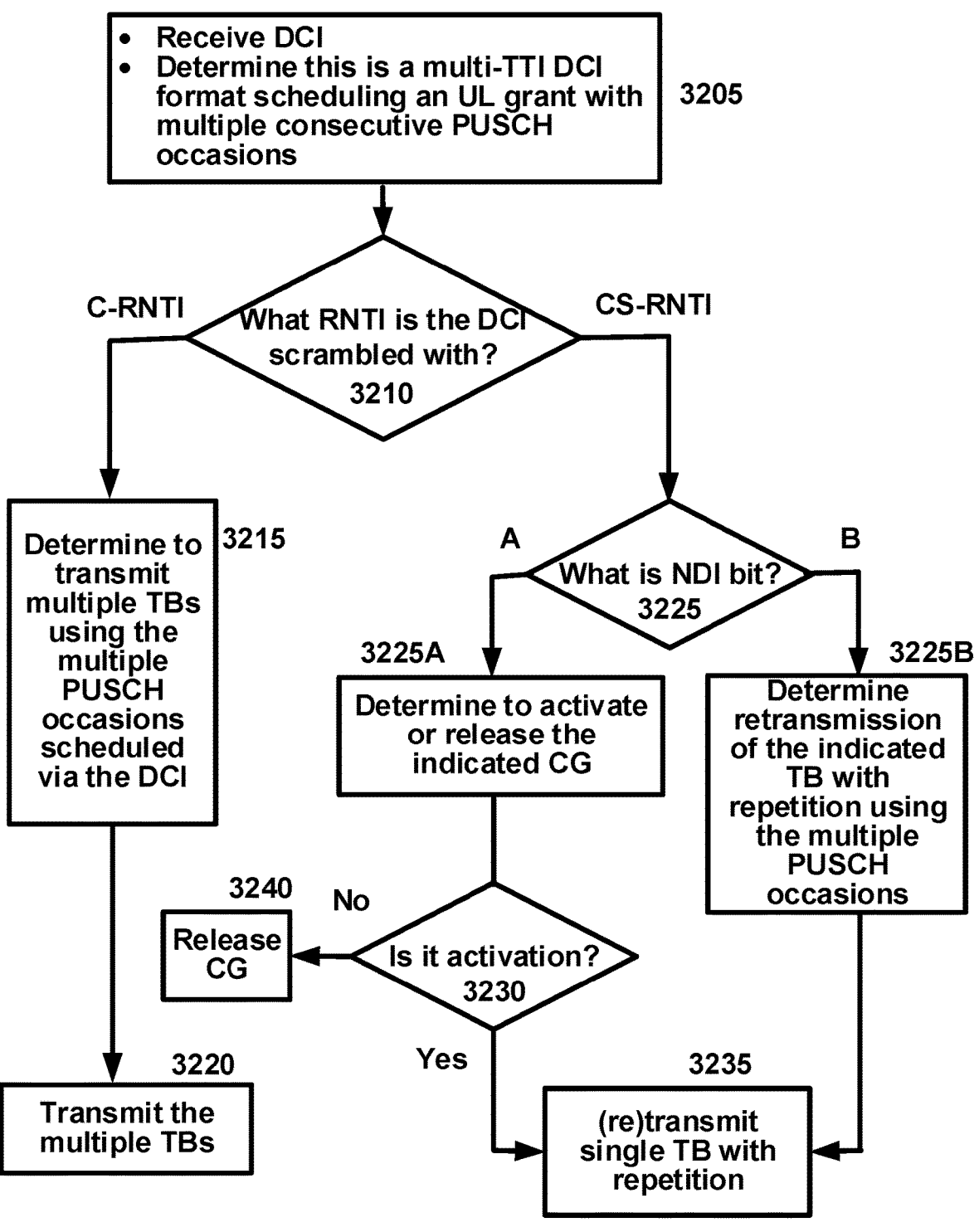
FIG. 32 shows an example method for determining a transmission mode of a multi-TTI DCI.

FIG. 32 shows an example method for determining a transmission mode (and/or scheduling type) of a multi-TTI DCI. The method may be performed by a wireless device. The wireless device may determine the transmission mode based on an RNTI. At step 3205, the wireless device may receive DCI (e.g., from a base station). The wireless device may determine whether the DCI is a multi-TTI DCI format scheduling an uplink grant with multiple consecutive PUSCH occasions. At step 3210, the wireless device may determine by what RNTI the DCI may be scrambled. The DCI may be scrambled by an RNTI. The RNTI may be a cell-RNTI (C-RNTI), a configured scheduling RNTI (CS-RNTI), or any other RNTI. At step 3215, the wireless device may determine to transmit/send multiple TBs using the multiple PUSCH occasions scheduled via the DCI (e.g., if the wireless device determines that the DCI format is scrambled using a first RNTI (e.g., C-RNTI)). The wireless device may determine a multi-TB transmission mode, for example, based on receiving the multi-TTI DCI addressed to a first RNTI (e.g., C-RNTI). The base station may dynamically schedule an uplink grant with multiple PUSCH transmissions/resources for different TBs. The different TBs may have relatively low/reduced latency requirements and/or relatively high data rate requirements (e.g., for an eMBB service and/or any other service). At step 3220, the wireless device may send/transmit the multiple TBs. At step 3225, the wireless device may determine what is the value of a new data indicator (NDI) bit (e.g., if the wireless device determines that the DCI is scrambled using a second/configured scheduling RNTI (e.g., CS-RNTI)). At step 3225A, the wireless device may determine to activate or release the indicated configured grant (e.g., based on an NDI bit value indicated as "B" or any other indication, such as any combination of 0 and/or 1). At step 3230, the wireless device may determine to activate the indicated CG. Otherwise, the wireless device may release the indicated covered grant at step 3240. The wireless device may send/transmit (or resend/retransmit) a single TB with repetition (e.g., based on the wireless device determining to activate the indicated CG). The wireless device may determine a single-TB repetition mode, for example, based on receiving the multi-TTI DCI addressed to the second RNTI (e.g., CS-RNTI). The base station may configure CG activation/retransmission with multiple PUSCH transmissions/resources for repetitions of a specific TB (e.g., same TB) with enhanced reliability requirement(s). At step 3225B, the wireless device may determine to send/transmit (or resend/retransmit) the indicated TB with repetition using the multiple PUSCH occasions (e.g., based on the NDI bit value indicated as "A" or any other indication, such as any combination of 0 and/or 1). At step 3235, the wireless device may send/transmit (or resend/retransmit) a single TB with repetition.

Figure 33:
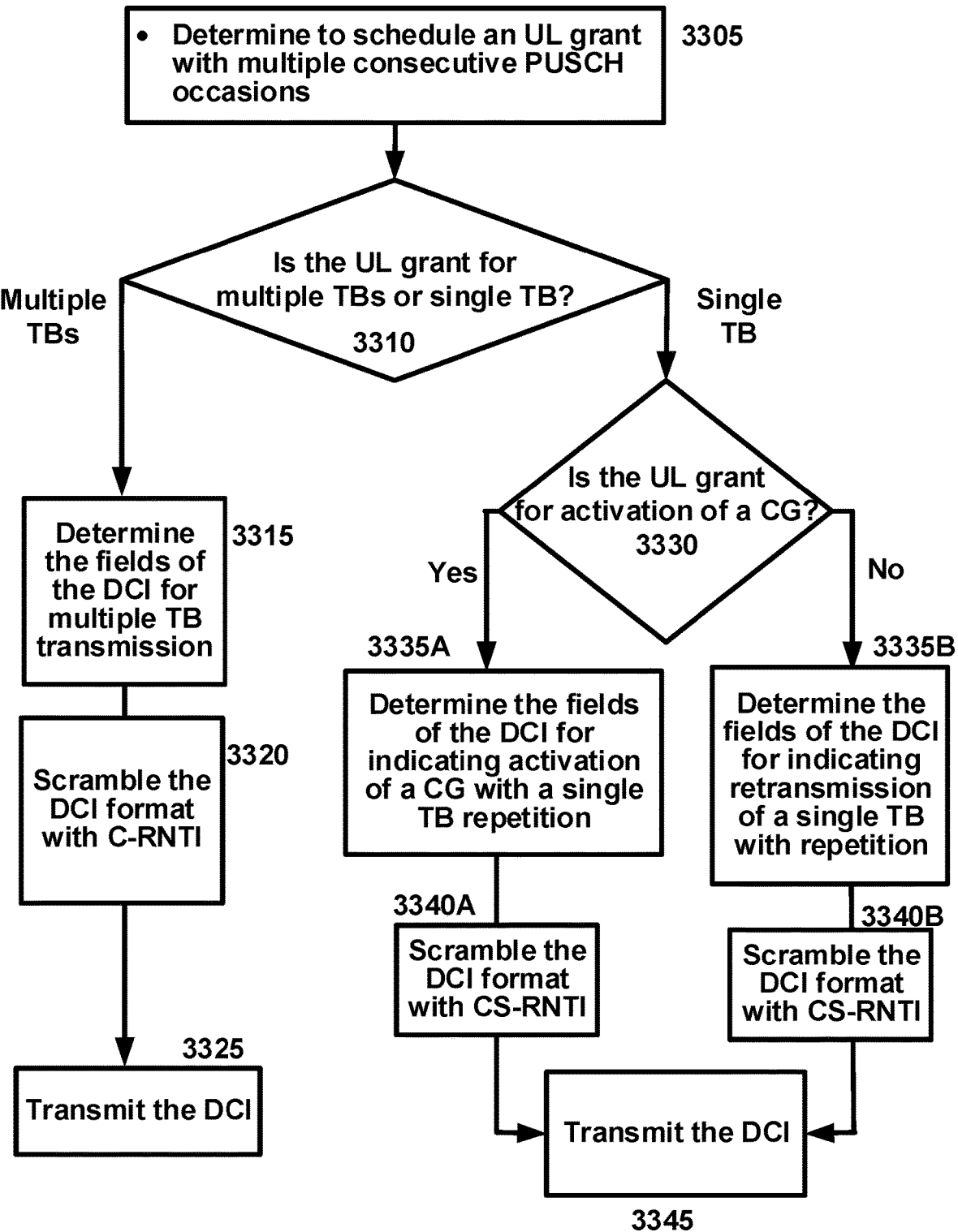
FIG. 33 shows an example method for determining a transmission mode of a multi-TTI DCI.

FIG. 33 shows an example method for determining a transmission mode of a multi-TTI DCI. The method may be performed by a base station. A base station may schedule an uplink grant for multiple consecutive PUSCH transmissions/ resources. At step 3305, the base station may determine to schedule an uplink grant with multiple consecutive PUSCH occasions. At step 3310, the base station may determine whether the uplink grant is for multiple transport blocks or a single transport block. At step 3315, the base station may determine the fields of the DCI for multiple TB transmission (e.g., if base station determines that the uplink grant is for multiple transport blocks). At step 3320, the base station may scramble the DCI with a C-RNTI. At step 3325, the base station may send/transmit, to a wireless device, the DCI indicating multiple TB transmission. At step 3330, the base station may determine whether the uplink grant is for activation of a CG (e.g., if the base station determines that the uplink grant is for single-TB repetition). At step 3335A, the base station may determine/generate an appropriate DCI format (e.g., if the base station determines that the UL grant requires activation). The base station may determine the fields of the DCI format for indicating activation of a CG with a single TB with repetition. At step 3340A, the base station may scramble the DCI with a CS-RNTI. At step 3345, the base station may send/transmit, to a wireless device, the scrambled DCI indicating activation of a CG with a single TB repetition. At step 3335B, the base station may determine the fields of the DCI for indicating retransmission of a single TB with repetition (e.g., based on determining that the uplink grant is not for activation of a CG). At step 3340B, the base station may scramble the DCI with a CS-RNTI. At step 3345, the base station may send/transmit, to the wireless device, the scrambled DCI indicating retransmission of a single TB with repetition.

A wireless device may receive, via one or more downlink control channels, DCI indicating: an uplink grant of a plurality of TTIs; and/or a transmission mode scheduling type. The wireless device may send/transmit, for example, based on the transmission mode indicating a first transmission mode, a single TB repeatedly (e.g., with one or more repetitions) via the plurality of TTIs. The wireless device may send/transmit, for example, based on the transmission mode indicating a second transmission mode, a plurality of TBs via the plurality of TTIs (e.g., wherein a TB of the plurality of TBs is sent/transmitted via a TTI of the plurality of TTIs).

A wireless device may monitor one or more PDCCHs for a DCI scrambled by a first RNTI. The DCI may indicate one or more uplink transmissions via a plurality of transmission time intervals (TTIs). The DCI may comprise one or more fields indicating that the one or more uplink transmissions via the plurality of TTIs are for at least one of: a single TB with repetition (e.g., based on the one or more fields indicating a first value); and/or a plurality of TBs (e.g., wherein a TB of the plurality of TB is mapped to a TTI of the plurality of TTIs, based on the one or more fields indicating a second value). The wireless device may receive the DCI and perform, based on the one or more fields in the DCI, the one or more uplink transmissions via the plurality of TTIs.

A wireless device may receive via one or more downlink control channels, DCI scrambled by a first RNTI (e.g., steps 3205-3215). The DCI may indicate one or more uplink transmissions via a plurality of TTIs. The wireless device may determine, based on one or more fields in the DCI, whether the DCI indicates that the one or more uplink transmissions via the plurality of TTIs are for at least one of:

a single TB with repetition (e.g., based on the one or more fields indicating a first value); or a plurality of TBs (e.g., based on the one or more fields indicating a second value). The wireless device may determine/interpret a first number/ quantity of bits in the DCI as reserved and/or as transmission parameters of the plurality of TBs.

A wireless device may determine that a transmission mode indicates a first transmission mode or a second transmission mode (e.g., steps 3210-3235). The DCI may be scrambled by a first RNTI. The first RNTI may be a C-RNTI, a CS-RNTI, or any other type of RNTI. Each of the plurality of TTIs may comprise at least one of: one or more slots, and/or one or more mini-slots. The plurality of TTIs may comprise a plurality of consecutive OFDM symbols. The DCI may comprise one or more first fields indicating the uplink grant. The one or more first fields may indicate at least one of: a frequency domain resource assignment comprising one or more resource blocks; a time domain resource assignment indicating the plurality of TTIs; a transmit power control command for the transmitting via the plurality of TTIs; a modulation and coding scheme for the transmitting via the plurality of TTIs; one or more new data indicators; one or more redundancy versions; and/or a HARQ process number. The DCI may comprise one or more second fields indicating the transmission mode. The one or more second fields may indicate at least one of: a first value of a time domain resource assignment field; a second value of a modulation and coding field; a third value of a new data indicator field; and/or a fourth value of a redundancy version field. The DCI may indicate the transmission mode based on a transmission mode indicator. The transmission mode may comprise the first transmission mode, for example, based on the transmission mode indicator having a first value. The transmission mode may comprise the second transmission mode, for example, based on the transmission mode indicator having a second value. The first transmission mode may comprise sending/transmitting a single TB with the one or more repetitions using one or more redundancy versions (RVs) via the plurality of TTIs (e.g., step 3235). The DCI may comprise a field indicating a HARQ process number associated with a single TB. The wireless device may determine/select a HARQ process number associated with the single TB. The DCI may comprise a field indicating a first RV of the one or more RVs for a first repetition of the one or more repetitions of the single TB. An RRC message may indicate an RV pattern of the one or more RVs to be applied to the one or more repetitions of the single TB. The wireless device may determine/select at least one of the one or more RVs. The sending/transmitting may comprise a retransmission with the one or more repetitions. Sending/ transmitting the single TB may be based on an NDI field (e.g. step 3225). The single TB may comprise a new TB, for example, based on the NDI field indicating a first value. The single TB may comprise a pending TB, for example, based on the NDI field indicating a second value. The second transmission mode may comprise sending/transmitting the plurality of TBs via the plurality of TTIs. Each of the plurality of TBs may be sent/transmitted via each of the plurality of TTIs. The DCI may comprise a field indicating a HARQ process number associated with a first TB of the plurality of TBs, associated with a first TTI of the plurality of TTIs. The wireless device may determine HARQ process numbers associated with one or more TBs of the plurality of TBs, for example, based on the HARQ process number associated with the first TB, by sequentially incrementing the HARQ process numbers for each of the plurality of TBs associated with each of the plurality of TTIs. The wireless device may determine/select one or more HARQ process numbers associated with the plurality of TBs. The DCI may comprise a field indicating one or more RVs for the sending/transmitting the plurality of TBs per each of the plurality of TTIs. The sending/transmitting the plurality of TB s may comprise at least one retransmission of a first TB of the plurality of TBs. The sending/transmitting the plurality of TBs may be based on an NDI field. The NDI field may comprise a plurality of NDI bits per each of the plurality of TBs. A first TB of the different TBs may be a new TB, for example, based on a first NDI bit of the plurality of NDI bits associated with the first TB indicating a first value. The first TB of the different TBs may be a pending TB, for example, based on a first NDI bit of the plurality of NDI bits associated with the first TB indicating a second value. The DCI may indicate the transmission mode, for example, based on an NDI field. The transmission mode may comprise the first transmission mode, for example, based on the NDI field comprising one or more NDI bits indicating a first value. The transmission mode may comprise the second transmission mode, for example, based on the NDI field comprising one or more NDI bits indicating a second value. A wireless device may determine/interpret a first number/quantity of bits in the DCI as reserved or as transmission parameters of the plurality of TBs. The wireless device may determine an activation of a configured grant, for example, based on one or more first information fields of the DCI indicating a first value. The wireless device may validate a format of the DCI for scheduling the activation of the configured grant, for example, based on one or more second information fields of the DCI indicating a second value. The wireless device may determine a release of a configured grant based on one or more first information fields of the DCI indicating a third value. The wireless device may validate a format of the DCI for scheduling the release of the configured grant, for example, based on one or more second information fields of the DCI indicating a fourth value. Sending/transmitting the single TB may comprise sending/transmitting two TBs multiplexed in a spatial domain via two or more antenna-ports, and/or via a TTI of the plurality of TTIs.

A wireless device may perform a method comprising multiple operations. The wireless device may receive a downlink control information (DCI). The DCI may comprise at least one first field indicating one or more resource assignments for uplink transmission; and at least one second field indicating at least one of a second field indicating a scheduling wherein the scheduling comprises: a first scheduling mode for uplink transmission of a single transport block (TB) repetition; or a second scheduling mode for uplink transmission of different transport blocks (TBs). The wireless device may determine, based on the at least one second field, a scheduling mode (e.g., a transmission scheduling mode) comprising the first scheduling mode or the second scheduling mode. The wireless device may transmit/send via the one or more resource assignments and based on the scheduling mode: a TB and one or more repetitions of the TB; or a plurality of different TB s. Receiving the DCI may comprise descrambling the DCI using a radio network temporary identifier (RNTI). Determining the scheduling mode may be based on the RNTI. Determining the scheduling mode may be based on the at least one second field, that the one or more resource assignments are for uplink transmission of a single TB repetition. Transmitting/sending may comprise transmitting the TB and the one or more repetitions of the TB in consecutive time durations. Determining the scheduling mode may be based on the at least one second field, that the one or more resource assignments are for uplink transmission of a plurality of different TBs. Transmitting/sending the different TB s may comprise: transmitting a first TB, of the plurality of different TBs, during a first time duration; and transmitting at least one second TB, of the plurality of different TBs, during at least one second time duration. The first time duration and the at least one second time duration may be consecutive time durations. The scheduling mode may be associated with a type of service comprising at least one of: an ultra reliable low-latency communications (URLLC) service corresponding to the first scheduling mode; or an enhanced mobile broadband (eMBB) service corresponding to the second scheduling mode. The DCI may comprise a first DCI. The first DCI may comprise the at least one first field and the at least one second field. The at least one second field of the first DCI may indicate the first scheduling mode. The described method further may comprise receiving second DCI. The second DCI may comprise the at least one first field and the at least one second field. The second field of the second DCI may indicate the second scheduling mode. The second DCI and the first DCI may comprise a same size and/or format. The at least one first field may comprise at least one of: a frequency domain resource assignment indicating one or more resource blocks; a time domain resource assignment indicating a plurality of transmission time intervals (TTIs); a transmit power control command for uplink transmission; a modulation and coding scheme for uplink transmission; and/or a hybrid automatic repeat request (HARQ) process number. The at least one second field may comprise at least one of: a time domain resource assignment field; a modulation and coding field; a new data indicator field; and/or a redundancy version field. The wireless device may determine, based on the at least one second field, that the scheduling mode is the first scheduling mode, or the second scheduling mode. The DCI may indicate that the scheduling mode is based on a new data indicator (NDI) field. The wireless device may further determine an activation of a configured grant based on one or more first information fields of the DCI indicating a first value. The wireless device may validate a format of the DCI for scheduling the activation of the configured grant based on one or more second information fields of the DCI indicating a second value. The DCI may be scrambled by a first radio network temporary identifier (RNTI), and the RNTI may be one of: a cell-RNTI (C-RNTI), or a configured scheduling RNTI (CS-RNTI). A wireless device may comprise one or more processors; and memory storing instructions that when executed by the one or more processors, cause the wireless device to perform the described method. A system may comprise a wireless device configured to perform the described method; and a base station configured to send the DCI. A computer-readable medium may store instructions that, when executed, cause performance of the described method.

A wireless device may perform a method comprising multiple operations. The wireless device may receive downlink control information (DCI) indicated by (and/or scrambled by) a radio network temporary identifier (RNTI), wherein the DCI may indicate one or more resource assignments for uplink transmission. The wireless device may determine, based on the RNTI, a scheduling mode. The transmission mode scheduling may comprise: a first scheduling mode for a single transport block (TB) repetition; and/or a second scheduling mode for transmission of different transport blocks (TBs). The wireless device may transmit/send via the one or more resource assignments and based on the scheduling mode: a single TB and one or more repetitions of the TB; and/or a plurality of different TBs. The DCI may comprise: at least one first field indicating the one or more resource assignments for uplink transmission; and/or at least one second field indicating the first scheduling mode or the second scheduling mode. Determining the scheduling mode may be based on the at least one second field. The wireless device may determine that the one or more resource assignments are for uplink transmission of a single TB repetition. Transmitting/sending the single TB repetition may comprise transmitting/sending the TB and the one or more repetitions of the TB in consecutive time durations. The wireless device may determine, based on the RNTI, that the one or more resource assignments are for uplink transmission of a plurality of different TB s. Transmitting/sending the plurality of different TB s may comprise: transmitting/sending a first TB, of the plurality of different TBs, during a first time duration; and/or transmitting/sending at least one second TB, of the plurality of different TBs, during at least one second time duration. The first time duration and the at least one second time duration may be consecutive time durations. The scheduling mode may be associated with a type of service. The service may comprise at least one of: an ultra reliable low-latency communications (URLLC) service corresponding to the first scheduling mode; or an enhanced mobile broadband (eMBB) service corresponding to the second scheduling mode. The wireless device may determine the scheduling mode by determining, based on the RNTI comprising a first type of RNTI, the first scheduling mode as the scheduling mode. The wireless device may determine the scheduling mode by determining, based on the RNTI comprising a second type of RNTI, the second scheduling mode as the scheduling mode. The first type of RNTI may comprise at least one of a cell RNTI (C-RNTI) or a configured scheduling RNTI (CS-RNTI). The second type of RNTI may be different from the first type of RNTI and/or may comprise at least one of a C-RNTI or a CS-RNTI. A wireless device may comprise one or more processors; and memory storing instructions that when executed by the one or more processors, cause the wireless device to perform the described method. A system may comprise a wireless device configured to perform the described method; and a base station configured to send the DCI. A computer-readable medium may store instructions that, when executed, cause performance of the described method.

A wireless device may perform a method comprising multiple operations. The wireless device may receive downlink control information (DCI). The DCI may comprise an indication of one or more resource assignments for uplink transmission. The wireless device may determine, based on the DCI, that the uplink transmission relates to multiple transport blocks (TBs) in consecutive time durations. The wireless device may determine, based on the DCI, whether the multiple TBs comprise a single transport block (TB) repetition or different TBs. The wireless device may transmit/send via the one or more resource assignments: a TB and one or more repetitions of the TB, based on a first scheduling mode; and/or a plurality of different TBs, based on a second scheduling mode. The wireless device may determine whether the multiple TBs comprise a single TB repetition or different TBs. The multiple TBs may comprise at least one of: a DCI scrambled with a first type of radio network temporary identifier (RNTI) associated with the first scheduling mode or a second type of RNTI associated with the second scheduling mode; and/or a field in the DCI that comprises a first value associated with the first scheduling mode or a second value associated with the second scheduling mode. The wireless device may determine that the one or more resource assignments are for uplink transmission of a single TB repetition. The transmitting/sending of a single TB repetition may comprise transmitting/sending the TB and the one or more repetitions of the TB in consecutive time durations. The wireless device may determine that the one or more resource assignments are for uplink transmission of a plurality of different TBs. The transmitting/sending of a plurality of different TBs may comprise: transmitting/sending a first TB, of the plurality of different TB s, during a first time duration; and/or transmitting/sending at least one second TB, of the plurality of different TB s, during at least one second time duration. The first time duration and the at least one second time duration may be consecutive time durations. A scheduling mode for transmitting/sending TBs may be associated with a type of service comprising at least one of: an ultra reliable low-latency communications (URLLC) service corresponding to the first scheduling mode; or an enhanced mobile broadband (eMBB) service corresponding to the second scheduling mode. The wireless device may determine that the uplink transmission is for multiple TBs in consecutive time durations comprises at least one of: determining that a field in the DCI comprises a predefined value; and/or determining that the DCI comprises a predefined format. A wireless device may comprise one or more processors; and memory storing instructions that when executed by the one or more processors, cause the wireless device to perform the described method. A system may comprise a wireless device configured to perform the described method; and a base station configured to send the DCI. A computer-readable medium may store instructions that, when executed, cause performance of the described method.

A wireless device may perform a method comprising multiple operations. The wireless device may receive, via one or more downlink control channels, downlink control information (DCI). The DCI may comprise at least one first field indicating resource assignment for a plurality of physical uplink shared channels (PUSCHs) in a cell; and at least one second field indicating a scheduling mode. The scheduling mode may be one of: a first scheduling mode for a single transport block (TB) repetition; and/or a second scheduling mode for a plurality of TBs transmission. The wireless device transmitting may be based on the at least one second field: a single TB with repetitions via the plurality of PUSCHs; and/or a plurality of TBs via the plurality of PUSCHs. The resource assignment may comprise: frequency domain resource assignment; and time domain resource assignment. The plurality of PUSCHs may be scheduled in a plurality of transmission time intervals (TTIs) of the cell. The plurality of TTIs may be consecutive and/or non-overlapping. The at least one first field may indicate a number/quantity of the plurality of TTIs for the plurality of PUSCHs. Each of the plurality of PUSCHs may be scheduled in one of the plurality of TTIs. Each of the plurality of TTIs may comprise at least one of: one or more slots; and one or more mini-slots. Each of the one or more mini-slots may comprise one or more consecutive OFDM symbols. Each of the one or more slots may comprise one or more consecutive OFDM symbols, such as 14 OFDM symbols. The plurality of TTIs may comprise a plurality of consecutive OFDM symbols. The at least one first field may indicate at least one of the following for the plurality of PUSCHs: the frequency domain resource assignment indicating one or more resource blocks; the time domain resource assignment indicating the plurality of TTIs; a transmit power control command for the transmitting via the plurality of PUSCHs;

a modulation and coding scheme for the transmitting via the plurality of PUSCHs; one or more new data indicators; one or more redundancy versions; and/or a hybrid automatic repeat request (HARQ) process number. The at least one second field may indicate at least one of the following or a combination thereof: a first value of a time domain resource assignment field; a second value of a modulation and coding field; a third value of a new data indicator field; and/or a fourth value of a redundancy version field. The wireless device may receive DCI that may comprise a scheduling mode indicator field, indicating the scheduling mode. The scheduling mode may be the first scheduling mode based on the scheduling mode indicator field having a first value. The scheduling mode may be the second scheduling mode based on to the scheduling mode indicator field having a second value. The scheduling mode may comprise, based on the at least one second field, the wireless device determines that the scheduling mode is the first scheduling mode or the second scheduling mode. The wireless device, based on determining the scheduling mode, may interpret a first number/quantity of bits in the DCI as reserved, and/or as scheduling parameters of the plurality of TBs.

The wireless device may include/perform/use a first scheduling mode that may comprise transmitting/sending the single TB with repetitions using one or more redundancy versions (RVs) via the plurality of PUSCHs. The wireless device may receive DCI that may comprise a field indicating a HARQ process number associated with the single TB. The wireless device may select a HARQ process number associated with the single TB. The DCI may comprise a field indicating a first RV of the one or more RVs for a first repetition of the repetitions of the single TB. A radio resource control (RRC) message may indicate an RV pattern of the one or more RVs to be applied to the repetitions of the single TB. The wireless device may select at least one of the one or more RVs. The wireless device transmitting/sending single TBs may comprise a retransmission with the repetitions.

The wireless device operation may include/perform/use a second scheduling mode. The second scheduling mode may comprise transmitting/sending the plurality of TBs via the plurality of PUSCHs. The wireless device may receive DCI that comprises a field indicating HARQ process number associated with a first TB of the plurality of TBs, associated with a first TTI of the plurality of TTIs. The wireless device may determine HARQ process numbers associated with one or more TBs of the plurality of TBs, based on the HARQ process number associated with the first TB, by sequentially incrementing the HARQ process numbers for each of the plurality of TBs associated with each of the plurality of TTIs. The HARQ process numbers may also be associated with the plurality of TBs. The DCI may comprise a field indicating one or more RVs for the transmitting the plurality of TBs. A radio resource control (RRC) message may indicate an RV pattern of one or more RVs to be applied to the transmitting the plurality of TBs. The wireless device may determine/select at least one of one or more RVs to be applied to transmitting/sending the plurality of TB s. Transmitting/sending the plurality of TB s may comprise at least one retransmission of a first TB of the plurality of TBs. Transmitting/sending the plurality of TBs may be based on a new data indicator (NDI) field. The NDI field may comprise a plurality of NDI bits per each of the plurality of TBs. The DCI may indicate the scheduling mode based on a new data indicator (NDI) field. The scheduling mode be the first scheduling mode based on the NDI field indicating a first value. The scheduling mode may be the second scheduling mode based on the NDI field indicating a second value. The wireless device may interpret, based on the determining, a first number of bits in the DCI as reserved or as scheduling parameters of the plurality of TBs.

The wireless device operation may comprise determining an activation of a configured grant based on one or more first information fields of the DCI indicating a first value. Based on determining the activation of a configured grant, the wireless device may validate a format of the DCI for scheduling the activation of the configured grant based on one or more second information fields of the DCI indicating a second value. The wireless device operation may comprise determining a release of a configured grant based on one or more first information fields of the DCI indicating a third value. Based on determining the release of a configured grant, the wireless device may validate a format of the DCI for scheduling the release of the configured grant based on one or more second information fields of the DCI indicating a fourth value. The wireless device may transmit/send the single TB by transmitting/sending two TBs multiplexed in spatial domain via two or more antenna-ports, via a TTI of the plurality of TTIs. The DCI may be scrambled by a first radio network temporary identifier (RNTI). The RNTI may be a cell-RNTI (C-RNTI), or a configured scheduling RNTI (CS-RNTI). A wireless device may comprise one or more processors; and memory storing instructions that when executed by the one or more processors, cause the wireless device to perform the described method. A system may comprise a wireless device configured to perform the described method; and a base station configured to send the DCI. A computer-readable medium may store instructions that, when executed, cause performance of the described method.

A wireless device may perform a method comprising multiple operations. The wireless device receives via one or more downlink control channels, downlink control information (DCI). The DCI may be scrambled by a radio network temporary identifier (RNTI). The DCI may also indicate an uplink grant for a plurality of physical uplink shared channels (PUSCHs). The wireless device may determine, based on the RNTI, a scheduling mode. Based on the scheduling mode indicating a first scheduling mode, the wireless device may transmit/send a single transport block (TB) with one or more repetitions via the plurality of PUSCHs. Based on the scheduling mode indicating a second scheduling mode, the wireless device may transmit/send a plurality of TBs via the plurality of PUSCHs. A wireless device may comprise one or more processors; and memory storing instructions that when executed by the one or more processors, cause the wireless device to perform the described method. A system may comprise a wireless device configured to perform the described method; and a base station configured to send the DCI. A computer-readable medium may store instructions that, when executed, cause performance of the described method.

A wireless device may perform a method comprising multiple operations. The wireless device may receive via one or more downlink control channels, downlink control information (DCI) indicating an uplink grant for a plurality of physical uplink shared channels (PUSCHs). The wireless device may determine, based on the DCI, a scheduling mode. Based on the scheduling mode indicating a first scheduling mode, the wireless device may transmit/send a single transport block (TB) with one or more repetitions via the plurality of PUSCHs. Based on the scheduling mode indicating a second scheduling mode, the wireless device may transmit/send a plurality of TBs via the plurality of PUSCHs. A wireless device may comprise one or more processors; and memory storing instructions that when executed by the one or more processors, cause the wireless device to perform the described method. A system may comprise a wireless device configured to perform the described method; and a base station configured to send DCI. A computer-readable medium may store instructions that, when executed, cause performance of the described method.

A wireless device may perform a method comprising multiple operations. The wireless device may receive downlink control information (DCI). The DCI may comprise a resource assignment for physical uplink shared channels (PUSCHs) resources; and/or at least one field indicating one of: a single transport block (TB) repetition; and/or TBs transmission. Based on the at least one field, the wireless device may transmit/send a single TB with repetitions via the PUSCHs; and/or TBs via the PUSCHs. A wireless device may comprise one or more processors; and memory storing instructions that when executed by the one or more processors, cause the wireless device to perform the described method. A system may comprise a wireless device configured to perform the described method; and a base station configured to send the DCI. A computer-readable medium may store instructions that, when executed, cause performance of the described method.

A wireless device may perform a method comprising multiple operations. The wireless device may receive, via one or more downlink control channels, downlink control information (DCI) with a first DCI format scrambled by a first radio network temporary identifier (RNTI). The DCI may indicate one or more uplink transmissions via a plurality of transmission time intervals (TTIs). The wireless device may determine, based on one or more fields in the DCI, the DCI indication. The DCI may indicate that the one or more uplink transmissions via the plurality of TTIs are directed to: a single transport block (TB) with repetition based on the one or more fields indicating a first value; and/or a plurality of TB s based on the one or more fields indicating a second value. Based on the determination and indication, the wireless device may interpret a first number of bits in the DCI as reserved, and/or as transmission parameters of the plurality of TBs. A wireless device may comprise one or more processors; and memory storing instructions that when executed by the one or more processors, cause the wireless device to perform the described method. A system may comprise a wireless device configured to perform the described method; and a base station configured to send the DCI. A computer-readable medium may store instructions that, when executed, cause performance of the described method.

A base station may perform a method comprising multiple operations. The base station may send to a wireless device downlink control information (DCI) format. The DCI format may comprise at least one first field indicating one or more resource assignments for uplink transmission. The DCI format may comprise at least one second field. The second field may indicate a first scheduling mode, if the uplink transmission is directed to a single transport block (TB) repetition; and/or a second scheduling mode, if the uplink transmission is directed to the transmission of different transport blocks (TBs). The least one second field may comprise a scheduling mode (e.g., a transmission scheduling mode) that may comprise the first scheduling mode or the second scheduling mode. The base station may receive from the wireless device a plurality of uplink transmissions and determines, based on the at least one second field, whether the plurality of uplink transmission comprise a single TB repetition, or different TBs. Sending the DCI format may comprise scrambling the DCI using a radio network temporary identifier (RNTI). The scheduling mode may be based on the RNTI. A base station may comprise one or more processors; and memory storing instructions that when executed by the one or more processors, cause the base station to perform the described method. A system may comprise a base station configured to perform the described method; and a wireless device station configured to receive the DCI. A computer-readable medium storing instructions that, when executed, cause performance of the described method.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:

receiving, by a wireless device, downlink control information (DCI) that:

comprises information indicating a plurality of resource assignments associated with a plurality of different time durations for uplink transmission; and is scrambled with a radio network temporary identifier (RNTI); and transmitting one or more transport blocks (TBs) via the resource assignments and using a transmission mode that is selected based on a type of the RNTI, wherein for the selection of the transmission mode:

a first type of RNTI is associated with a TB repetition transmission mode in which at least one repetition of a TB is transmitted; and a second type of RNTI is associated with a multi-TB transmission mode in which different TBs are transmitted wherein the transmitting comprises transmitting:

a TB and one or more corresponding repetitions of the TB; or a plurality of different TBs.

2. The method of claim 1, further comprising:

descrambling the DCI using the RNTI; and determining, based on the type of the RNTI, that consecutive physical uplink shared channel (PUSCH) opportunities are configured for the TB repetition transmission mode.

3. The method of claim 1, further comprising:

determining, based on a second field in the DCI, that consecutive physical uplink shared channel (PUSCH) opportunities are configured for the multi-TB transmission mode.

4. The method of claim 1, wherein the resource assignments are associated with an ultra reliable low-latency communications (URLLC) service.

5. The method of claim 1, wherein the DCI comprises first DCI, and wherein the method further comprises:

receiving second DCI comprising field, wherein the field of the second DCI indicates that second resource assignments are configured for the multi-TB transmission mode, and wherein the second DCI and the first DCI comprise a same size.

6. The method of claim 1, wherein the DCI comprises at least one of:

a frequency domain resource assignment indicating one or more resource blocks;

a time domain resource assignment indicating a plurality of transmission time intervals (TTIs);

a transmit power control command for uplink transmission;

a modulation and coding scheme for uplink transmission; or a hybrid automatic repeat request (HARQ) process number.

7. The method of claim 1, wherein the DCI comprises at least one of:

a time domain resource assignment field;

a modulation and coding field;

a new data indicator field; or a redundancy version field.

8. The method of claim 1, wherein:

an RNTI of type cell RNTI (C-RNTI) is associated with the TB repetition transmission mode; and an RNTI of type configured scheduling RNTI (CS-RNTI) is associated the multi-TB transmission mode.

9. A method comprising:

receiving, by a wireless device, downlink control information (DCI) scrambled by a radio network temporary identifier (RNTI), wherein the DCI indicates a plurality of resource assignments for a plurality of different physical uplink shared channel (PUSCH) opportunities;

selecting, based on a type of the RNTI, between:

using the PUSCH opportunities for transmission of a single transport block (TB) repetition; or using the PUSCH opportunities for transmission of different TBS; and transmitting, via the PUSCH opportunities and based on the selecting:

a first TB and one or more repetitions of the first TB; or a plurality of different TBs.

10. The method of claim 9, further comprising:

selecting, based on the type of the RNTI, to use the PUSCH opportunities for uplink transmission of thea single TB repetition, wherein the transmitting comprises transmitting the TB and the one or more repetitions of the TB in consecutive time durations.

11. The method of claim 9, further comprising:

selecting, based on the type of the RNTI, to use the PUSCH opportunities for uplink transmission of different TBs, wherein the transmitting comprises:

transmitting the first TB during a first time duration; and transmitting at least one second TB during at least one second time duration, wherein the first time duration and the at least one second time duration are consecutive time durations.

12. The method of claim 9, wherein using the PUSCH opportunities for transmission of the single TB repetition is associated with an ultra reliable low-latency communications (URLLC) service, and wherein using the PUSCH opportunities for transmission of different TBs is associated with an enhanced mobile broadband (eMBB) service.

13. The method of claim 9:

wherein the selecting comprises associating a cell RNTI (C-RNTI) with using the PUSCH opportunities for TB repetitions, and associating configured scheduling RNTI (CS-RNTI) with using the PUSCH opportunities for non-repetition TB transmissions.

14. A method comprising:

receiving, by a wireless device, downlink control information (DCI) comprising an indication of a plurality of resource assignments for uplink transmission;

determining, based on a field ina type of radio network temporary identifier (RNTI) used with the DCI, whether the resource assignments are to be used for transmitting TB repetitions, or for transmitting different TBs:

a first type of RNTI is associated with a first scheduling mode for transmitting TB repetitions, and a second type of RNTI is associated with a second scheduling mode for transmitting different TBS; and transmitting via the plurality of resource assignments:

a TB and one or more repetitions of the TB, based on the first scheduling mode; or a plurality of different TBs, based on the second scheduling mode.

15. The method of claim 14, further comprising:

determining that the plurality of resource assignments are for transmitting TB repetitions, wherein the transmitting comprises transmitting the TB and the one or more repetitions of the TB in the consecutive time durations.

16. The method of claim 14, further comprising:

determining that the plurality of resource assignments are for transmitting different TBs, wherein the transmitting comprises:

transmitting a first TB during a first time duration; and transmitting at least one second TB during at least one second time duration, wherein the first time duration and the at least one second time duration are consecutive time durations.

17. The method of claim 14, wherein the first scheduling mode is associated with an ultra reliable low-latency communications (URLLC) service, and wherein the second scheduling mode is associated with an enhanced mobile broadband (eMBB) service.

18. The method of claim 14, wherein:

an RNTI of type cell RNTI (C-RNTI) is associated with the first scheduling mode for transmitting TB repetitions; and an RNTI of type configured scheduling RNTI (CS-RNTI) is associated the second scheduling mode for transmitting different TBS.

* * * * *